(12) United States Patent
Doshi

(10) Patent No.: US 12,039,033 B2
(45) Date of Patent: Jul. 16, 2024

(54) CRYPTOGRAPHIC ENFORCEMENT OF BORROW CHECKING ACROSS GROUPS OF POINTERS

(71) Applicant: Intel Corporation, Santa Clara, CA (US)

(72) Inventor: Kshitij Arun Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 17/696,226

(22) Filed: Mar. 16, 2022

(65) Prior Publication Data

US 2022/0207133 A1    Jun. 30, 2022

(51) Int. Cl.
  *H04L 29/06* (2006.01)
  *G06F 21/52* (2013.01)

(52) U.S. Cl.
  CPC ........ *G06F 21/52* (2013.01); *G06F 2221/033* (2013.01)

(58) Field of Classification Search
  CPC ............................ G06F 21/52; G06F 2221/033
  See application file for complete search history.

(56) References Cited

U.S. PATENT DOCUMENTS

| | | | |
|---|---|---|---|
| 10,339,299 B1 * | 7/2019 | Magnuson | G06F 21/52 |
| 2019/0042116 A1 | 2/2019 | Hu et al. | |
| 2020/0125501 A1 | 4/2020 | Durham et al. | |
| 2020/0201789 A1 | 6/2020 | Durham et al. | |
| 2020/0379902 A1 | 12/2020 | Durham et al. | |
| 2021/0200546 A1 | 7/2021 | LeMay et al. | |
| 2021/0405896 A1 | 12/2021 | Durham et al. | |
| 2022/0269784 A1 * | 8/2022 | Oetken | G06N 7/01 |
| 2022/0368656 A1 * | 11/2022 | Liao | H04L 51/56 |

OTHER PUBLICATIONS

Aaron Weiss et al., "Oxide: The Essence of Rust," Oct. 19, 2021, 126 pages.
Boqin Qin et al., "Understanding Memory and Thread Safety Practices and Issues in Real-World Rust Programs," PLDI '20, Jun. 15-20, 2020, pp. 763-779, ACM.
Github, "ELF x86-64-ABI psABI," 2022, 3 pages, Retrieved from the Internet on Jan. 9, 2022 at URL: https://gitlab.com/x86-psABIs/x86-64-ABI.
Klabnik et al., "The Rust Programming Language," 2022, 9 pages, Retrieved from the Internet on Jan. 19, 2022 at URL: https://doc.rust-lang.org/book/ch04-03-slices.html.

(Continued)

*Primary Examiner* — Evans Desrosiers
(74) *Attorney, Agent, or Firm* — Nicholson De Vos Webster & Elliott LLP

(57) ABSTRACT

Techniques for borrow checking in hardware are described. The technology includes a memory to store a plurality of allocated objects, an allocated object referenced by a pointer; and a processor to execute a join instruction to create a group of pointers, by creating a group record for the group referenced by a group pointer and setting a group bit and ownership identifier (ID) of pointers of the group; and execute a transfer group ownership instruction to transfer ownership of the group, including pointers of the group, by verifying validity of the group and setting the ownership ID of pointers of the group when the group is valid.

23 Claims, 39 Drawing Sheets

(56) References Cited

OTHER PUBLICATIONS

Matt Miller, "Trends, Challenges, and Strategic Shifts in the Software Vulnerability Mitigation Landscape," PowerPoint Presentation, Feb. 7, 2019, 32 pages, Microsoft, BlueHat IL.

Robert N.M. Watson et al., "An Introduction to CHERI," University of Cambridge Technical Report, Sep. 2019, 43 pages, No. 941, University of Cambridge, Cambridge, UK.

Robert N.M. Watson et al., "Capability Hardware Enhanced RISC Instructions (CHERI)," 2022, 3 pages, Retrieved from the Internet on Jan. 19, 2022 at URL: www.cl.cam.ac.uk/research/security/ctsrd/cheri.

Robert N.M. Watson et al., "Capability Hardware Enhanced RISC Instructions: CHERI Instruction-Set Architecture (Version 8)," University of Cambridge Technical Report, Oct. 2020, 590 pages, No. 951, University of Cambridge, Cambridge, UK.

Robert N.M. Watson et al., "CHERI C/C++ Programming Guide," University of Cambridge Technical Report, Jun. 2020, 33 pages, No. 947, University of Cambridge, Cambridge, UK.

European Search Report, EP App. No. 23154715.9, Jul. 21, 2023, 5 pages.

Office Action, EP App. No. 23154715.9, Mar. 4, 2024, 04 pages.

\* cited by examiner

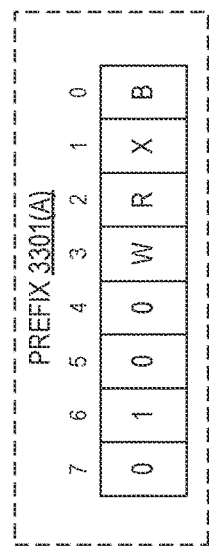
FIG. 35
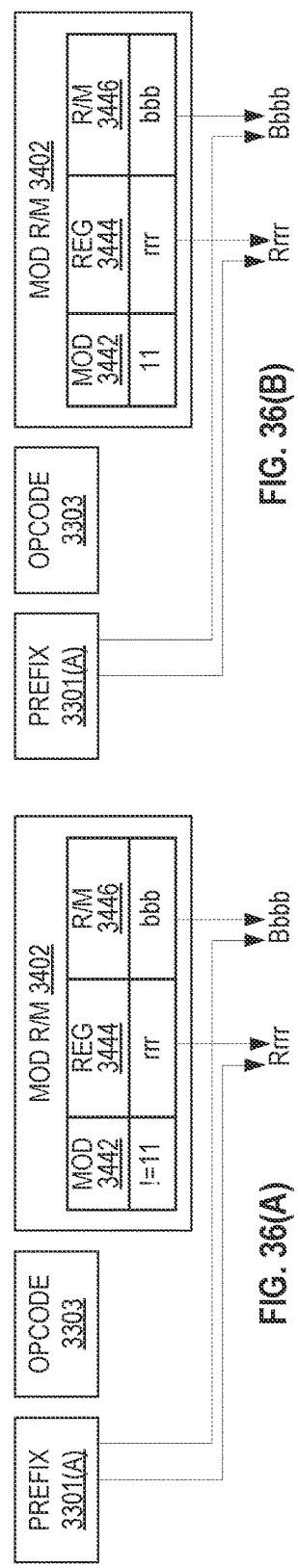
FIG. 36(A)
FIG. 36(B)
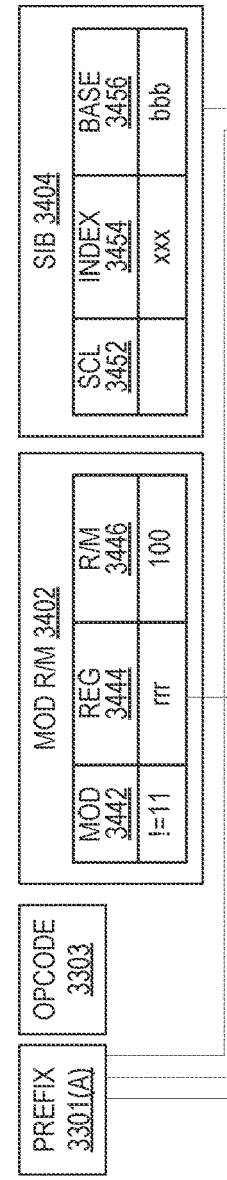
FIG. 36(C)
FIG. 36(D)

CRYPTOGRAPHIC ENFORCEMENT OF BORROW CHECKING ACROSS GROUPS OF POINTERS

BACKGROUND

Embodiments described herein generally relate to type checking in computing systems. In particular, embodiments described herein relate to cryptographic enforcement of borrow checking in executing programs by computing hardware.

Memory safety and concurrency errors have afflicted computer systems for decades, with no sign of sustained improvement. This has motivated the development of programming languages with strict checking of type systems that mitigate those concerns. Some programming languages strictly enforce a type system based on "borrow-checking" that draws on linear typing, ownership typing, and region-based memory management. Briefly, in programming languages that enforce strict ownership, a function can 'borrow' a reference to an object that the function doesn't own, and the type system constrains how a borrowed reference may be used. The type system typically enforces two rules: 1) Only one valid pointer can be used to modify an object in memory (exclusive mutability); and 2) Objects must live longer than all the references that point to the objects (no dangling pointers).

Borrow-checking is currently performed in software using instrumentation generated by a compiler. Security of software-based borrow checking depends on several assumptions. These assumptions include compiler correctness; correctness of system software including libraries, the Operating System (OS) kernel, and the virtual machine manager (VMM); absence of physical attacks; and absence of bit flips (e.g., due to radiation). These assumptions may not be reasonable in certain computing environments.

BRIEF DESCRIPTION OF DRAWINGS

Various examples in accordance with the present disclosure will be described with reference to the drawings.

FIG. 35 illustrates examples of a first prefix.

FIGS. 36(A)-(D) illustrate examples of how the R, X, and B fields of the first prefix are used.

DETAILED DESCRIPTION

Figure 1:
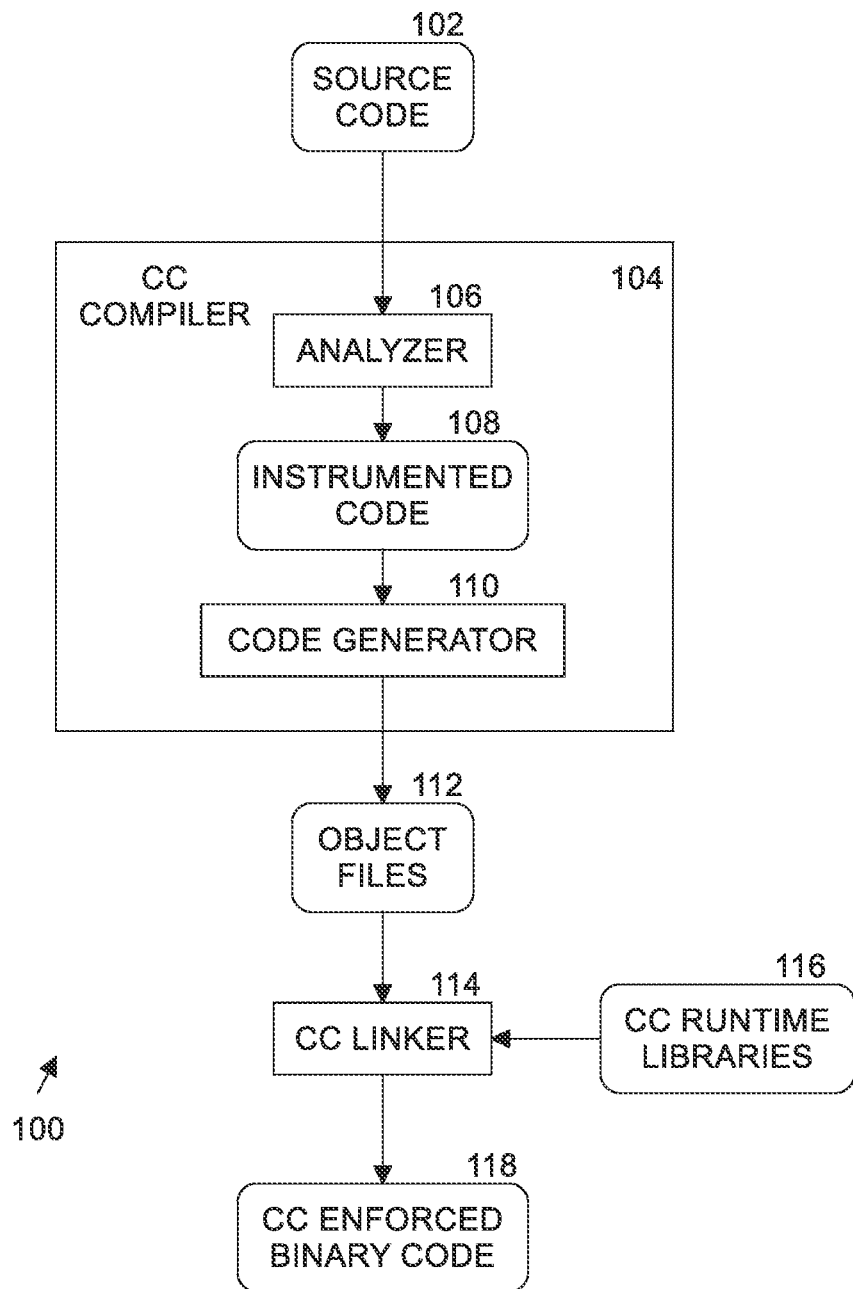
FIG. 1 illustrates an example software system according to one implementation.

The present disclosure relates to methods, apparatus, systems, and non-transitory computer-readable storage media for enforcing borrow checking in computing hardware of programs having groups of pointers to provide resilience when one or more assumptions are violated. The technology described herein maintains metadata necessary for performing borrow checking inline with memory allocations and checks this metadata automatically in computing hardware against corresponding metadata embedded in pointers when memory is accessed. This technology also introduces new instructions in the instruction set architecture (ISA) of the computing hardware for updating that metadata and compiler techniques for inserting those instructions at necessary points in a program.

In the following description, numerous specific details are set forth. However, embodiments may be practiced without these specific details. In other instances, well-known circuits, structures and techniques have not been shown in detail to avoid obscuring the understanding of the description.

Memory safety is a top priority for customers hardening the security of their software. Strictly typed languages such as Rust are an increasingly popular tool for achieving memory safety. The technology described herein enforces a strict, borrow-checking type system, like that used by Rust, in computing hardware. This provides in-depth defense and support for stronger threat mitigation models, including support for enforcing borrow-checking, even in unsafe code.

Some examples described herein discuss the Rust programming language. Rust is a multi-paradigm, general-purpose programming language, developed by the Rust Foundation, designed for performance and safety, especially safe concurrency. Rust is syntactically similar to C++ but can guarantee memory safety by using a borrow checker to validate references. Rust achieves memory safety without garbage collection, and reference counting is optional. Although discussed with reference to Rust, one or more implementations described herein may also be adapted for use with other type checking programming languages.

Rust's type system eliminates spatial safety errors (e.g., Out-Of-Bounds (OOB) accesses) by checking bounds of memory objects. Rust also eliminates temporal safety errors. The error called "Use After Free" (UAF) is prevented by tracking all references to each object so that the object is only freed after the object is no longer referenced. Uninitialized use is avoided directly by refusing to compile programs with objects that are not initialized prior to use. Type confusion is mitigated by strict type checking. Data races are avoided by only permitting a single reference to each mutable object to be active at any given point in time.

Table 1 shows an example of code that does not pass type checking due to an invalid ownership transfer. This code is rejected by the Rust compiler for attempting to create multiple, simultaneously active references to a mutable object.

TABLE 1

```
fn main( ) {
  let mut x = vec![5, 6];
  let mut y = x; // ownership transfer
  let mut z = x; // ownership transfer
  y[0] += 1;
  z[1] += 1;
  println!("{:?}", z);
}
```

TABLE 1-continued

```
Compilation error:
error[E0382]: use of moved value: 'x'
--> src/main.rs:4:17
  |
2 |   let mut x = vec![5, 6];
  |   ----- move occurs because 'x' has type 'std::vec::Vec<i32>', which
does not implement the 'Copy' trait
3 |   let mut y = x; // ownership transfer
  |       - value moved here
4 |   let mut z = x; // ownership transfer
  |       ^ value used here after move
```

The Rust compiler statically determines the lifetimes of many objects, sometimes with assistance from program developers in the form of annotations (e.g., to indicate the lifetime of a reference-typed return value from a function that accepts multiple input references). Rust also provides support for dynamic reference counting when necessary. Rust's type system avoids the need for garbage collection since Rust destroys objects as soon as they are no longer referenced.

However, Rust permits the use of unsafe code that bypasses type safety checks as well as linkage with code written in languages other than Rust, since Rust adheres to the Application Binary Interface (ABI) that is also used by languages such as C and C++. ABIs specify how functions interact with each other (e.g., to save and restore register values, pass parameters, and return data). The term "unsafe code" is used herein to cover both unsafe code in Rust and all code written in other languages. Unsafe code even appears within the Rust standard library. These interactions with unsafe code have led to a variety of bugs in Rust-based software stacks. Even for safe Rust code, security depends on the assumptions listed above.

The technology described herein prevents unsafe code from undermining safe code with an enhanced ABI that enforces borrow-checking in computing hardware, referred to herein as the borrow-checking ABI, or BC-ABI. The BC-ABI may be used within unsafe code to extend borrow-checking to a subset of unsafe, non-Rust code that is compatible with the constraints of borrow-checking. Furthermore, BC-ABI interoperates with other unsafe code that does not adhere to the constraints of borrow-checking. The effect of compiler bugs within safe code can be contained by enforcing the BC-ABI in computing hardware even within safe code. BC-ABI can likewise contain the effects of other threats, e.g., from incorrect system software including libraries, a compromised OS kernel or virtual machine manager (VMM); physical attacks; and bit flips (e.g., due to radiation).

Some unsafe code may legitimately need to bypass borrow-checking, so overrides are supported when necessary. For example, a keyword may indicate "dyn_safe" (for "dynamically-checked safe") sections of code, in addition to unsafe sections, so that "dyn_safe" may be used when the expectation is that the type system will not actually be violated, but Rust is unable to statically verify it. The "unsafe" code may be reserved for situations in which the program developer actually needs to bypass the type system. The technology herein also describes how a cryptographic implementation of the BC-ABI satisfies the requirements to mitigate risks from lower layers of the system enumerated in one or more of the assumptions of correctness of system software including libraries, the OS kernel, and the VMM;

absence of physical attacks; and absence of bit flips with high efficiency and minimal hardware and software touchpoints. The increased static type information that is available in strictly typed languages such as Rust can also create opportunities for optimizing dynamic type checking.

In one implementation, the BC-ABI is an interoperable extension of the x86-64 ABI, so the BC-ABI adopts the same conventions as the x86-64 ABI (e.g., which registers are used for selected numbered parameters, how extra parameters are arranged on the stack, and which registers are caller- vs. callee-saved) and includes additional hardening operations. The characteristics of each operation are highlighted below since there may be multiple ways to implement them based on different underlying hardware mechanisms. In one implementation, the hardening operations may be implemented using Cryptographic Computing (CC) 216 of FIG. 2, as described, for example, in "Cryptographic Computing Using Encrypted Base Addresses and Used in Multi-Tenant Environments", United States Patent Publication Number US20200201789A1, published on Jun. 25, 2020, incorporated herein by reference.

FIG. 1 illustrates an example software system 100 according to one implementation. A program developer writes a computer program represented as source code 102. In one example, the source code is written in the Rust programming language, although other programming languages may also be used. A compiler adapted as described herein to perform compilation in a manner using cryptographic computing (CC), called CC compiler 104, analyzes source code 102 with analyzer 106 to generate instrumented code 108, which interacts with CC and linear inline metadata (LIM) capabilities during execution. Instrumented code 108 is input to code generator 110, which produces one or more objects files 112 as the output of CC compiler 104. CC linker 114 links the one or more object files 112 with one or more CC runtime libraries 116 to produce CC enforced binary code 118. CC enforced binary code 118 may then be executed by computing hardware (including one or more processors or processing cores). During execution, the CC enforced binary code 118 uses an implementation of CC 216 and LIM (218 of FIG. 2) to ensure that borrow checking rules are not violated. In one implementation, this is accomplished by encoding a most recent ownership ID (OID) of an object into pointers and object metadata, as described in further detail below.

Figure 2:
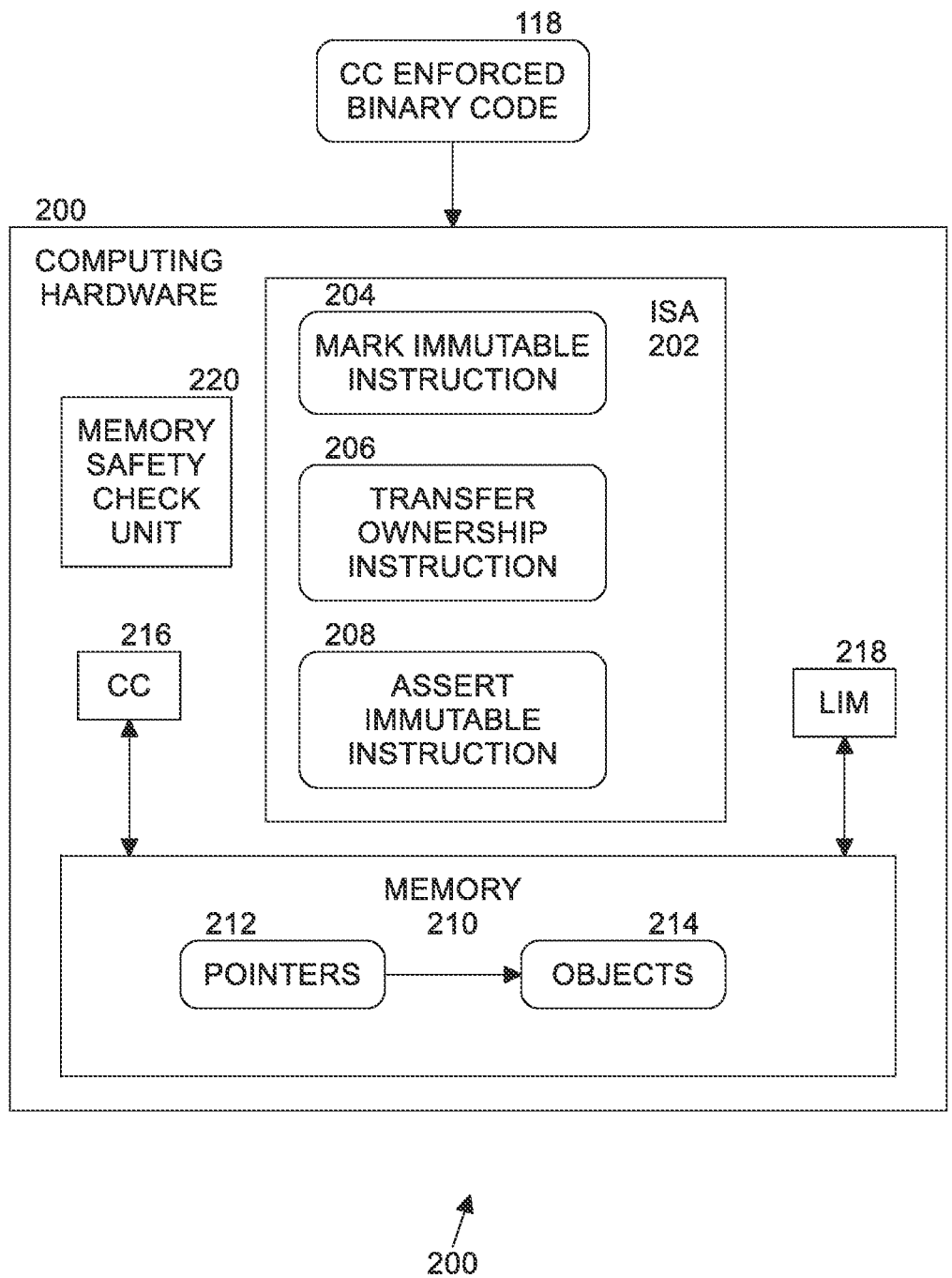
FIG. 2 illustrates example computing hardware according to one implementation.

FIG. 2 illustrates example computing hardware 200 according to one implementation. Computing hardware 200 may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to perform cryptographic enforcement of borrow checking as described herein.

In general, computing hardware 200 may include processing cores, caches, registers, translation lookaside buffers (TLBs), memory management units (MMUs), other processor hardware, input/output (I/O) devices, main memory, secondary memory, other system-level hardware, and other hardware found in processors and computer systems (e.g., as shown in the other processors and computer systems disclosed below). In particular, computing hardware 200 includes an instruction set architecture (ISA) 202. As extended herein, ISA 202 includes mark immutable instruction 204, transfer ownership instruction 206, and assert immutable instruction 208. CC compiler 104 generates these instructions by code generator 110 as needed. CC 216 includes circuitry as described, for example, in "Cryptographic Computing Using Encrypted Base Addresses and Used in Multi-Tenant Environments", United States Patent Publication Number US20200201789A1, published on Jun. 25, 2020, and incorporated herein by reference. LIM 218 includes circuitry as described, for example, in "Data Relocation for Inline Metadata", US Patent Publication US20210405896, published Dec. 30, 2021, and incorporated herein by reference. Computing hardware 200 also includes circuitry as described in "Pointer Based Data Encryption", US Patent Publication No. 20200125501A1, published Apr. 23, 2020, and incorporated herein by reference.

Memory 210 includes a plurality of objects 214 allocated as a result of executing CC enforced binary code 118. Objects 214 are referenced by a plurality of pointers 212, respectively.

In one implementation, memory check safety unit 220 implements borrow checking in computing hardware 200, as described below in FIG. 15.

To be able to enforce the BC-ABI in computing hardware 200, the design must move beyond representing a pointer as a reference into an undifferentiated, flat memory space. The architecture of computing hardware 200 uniquely identifies each object as well as the object's current owner, which is the sole variable through which the object can be referenced at that time in the program if the object is mutable. If the object is immutable, the object still has an owner, but one or more additional references may exist that can be used to read from the object.

Figure 3:
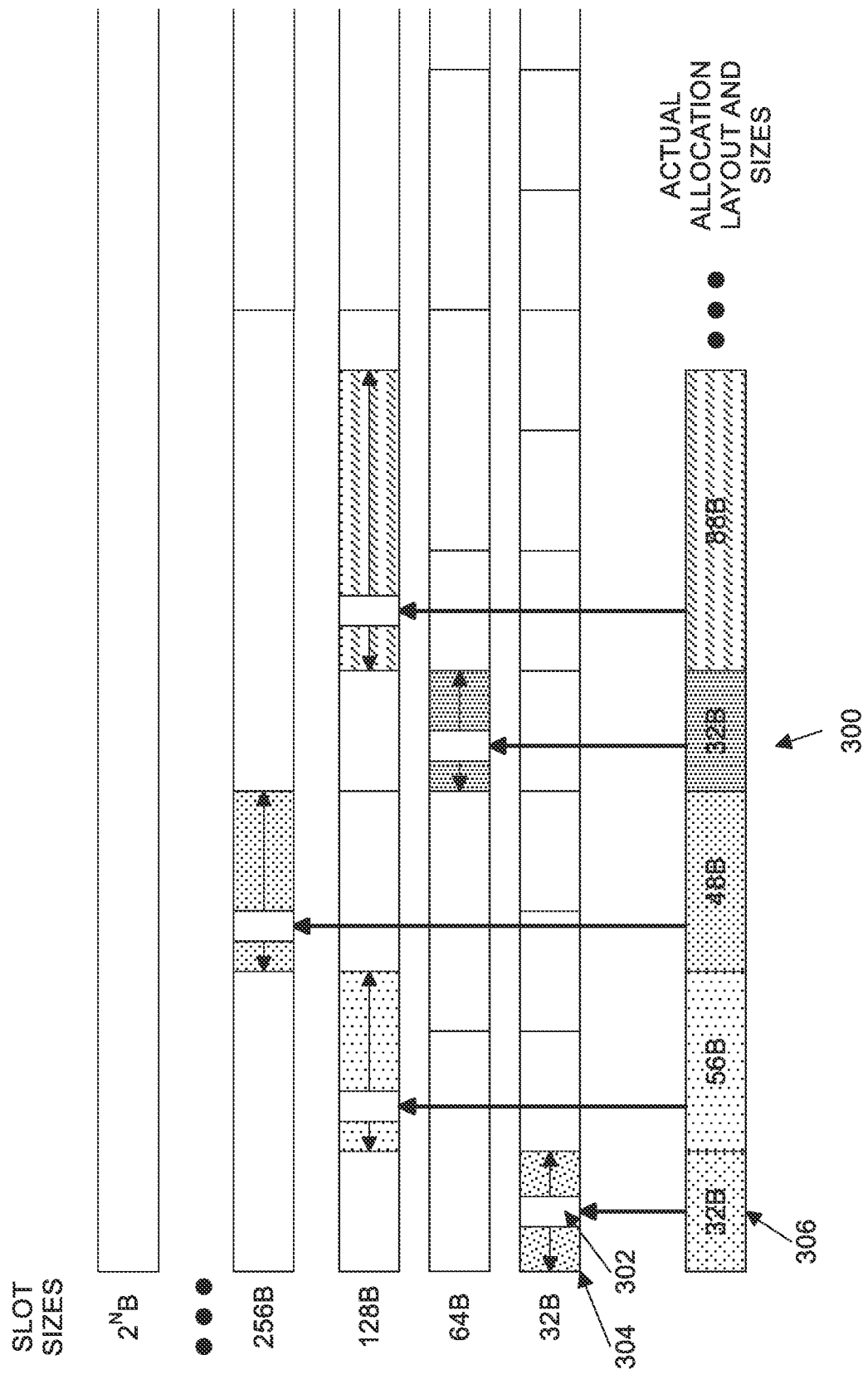
FIG. 3 illustrates assigning memory allocations to best-fitting, power-of-two aligned slots according to one implementation.

FIG. 3 illustrates assigning memory allocations 300 to best-fitting, power-of-two aligned slots according to one implementation. CC 216 assigns each object to a power-of-two-aligned slot that fits the object best, as illustrated in FIG. 3, and binds the encryption of that object to the object's unique slot. One implementation of CC is described in United States Patent Publication Number US20200201789A1. Further details may be found in "Security Check Systems and Methods for Memory Allocations" US Patent Publication Number US20200379902A1, published Dec. 3, 2020, which is incorporated herein by reference. The slot for an object is encoded into a 64-bit pointer using a compact representation, and the pointer is partially encrypted to mitigate pointer forgery. Data encryption is bound to the encrypted pointer. Any misuse of a pointer to reference a different object will result in incorrect encryption or decryption of that other object. This directly mitigates spatial safety vulnerabilities, and it can also mitigate UAF. If a slot is reused while a dangling pointer still references that exact slot, then UAF may still occur, but a memory allocator can seek to maximize the interval between reuse of a particular slot. Temporarily quarantining a slot does not imply quarantining the underlying memory, which may still be used by assigning the object to a different slot. In one implementation, additional mitigation options for both spatial safety and UAF can be layered on these cryptographic protections to meet language requirements and enhance hardening. For example, the compiler may emit code that performs byte-granular bounds checks and invokes registered code within the program in the event of a bounds check violation. CC encodes pointers to identify their assigned slots.

FIG. 3 shows the assignment of each memory allocation to its best-fitting, power-of-two-aligned slot, and storing metadata inline with allocations. For example, metadata 302 of memory slot 304 for storage of object 306 stores information for assisting in performing borrow checking in one implementation. In this implementation, metadata 302 is extended to store ownership IDs. Note that allocations are not necessarily assigned to the next larger slot size than the allocation size, since they may cross power-of-two alignment boundaries for some of the next possible slot sizes. Each allocation needs to be assigned a slot size that entirely fits the allocation at its particular location in memory without the allocation crossing any slot boundaries at that assigned size. Smaller slots than illustrated here could also be supported similarly. In FIG. 3, the arrows within a memory slot indicate bounds specified in the metadata.

To represent ownership using CC 216, an ownership ID is inserted into unused bits within each pointer. The processor can check the ownership ID of a pointer against the current ownership ID for the object being referenced.

One option for storing an ownership ID is to use Linear Inline Metadata (LIM) 218 (as disclosed in US Patent Publication US20210405896), which stores metadata inline within each object. Specifically, since every object crosses the midpoint of the slot that fits it best, that midpoint is a convenient location to store metadata such as an ownership ID. The compact pointer encoding only specifies the slot containing the object, not the precise bounds of the object. Thus, even though it is infeasible to store metadata at more obvious locations, such as at the beginning or end of an allocation, a processor of computing hardware 200 can locate metadata in constant time at the midpoint of the slot. Bounds can also be stored in that manner to support byte-granular bounds checks with synchronous exception reporting as required by languages such as Rust. Tags can be stored as well to mitigate spatial safety vulnerabilities that may be missed by bounds checks. The ownership ID and tag checks together also support generating synchronous exceptions for UAF exploits, and the tag is also incorporated into the pointer encryption, which in turn binds the data encryption to the tag.

Figure 4:
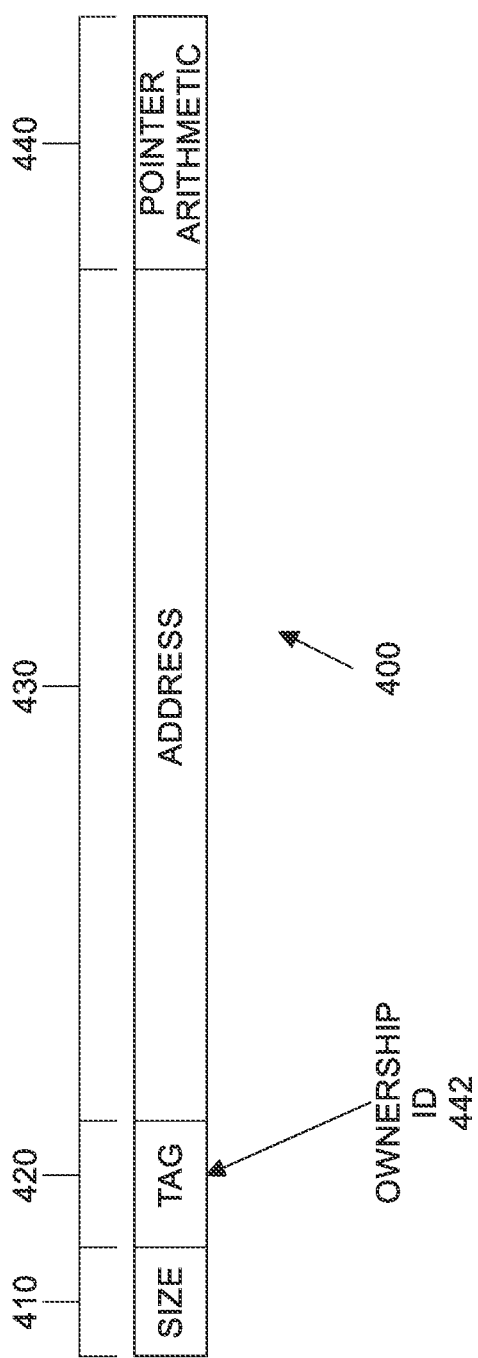
FIG. 4 illustrates using a tag in a pointer to store an ownership identifier (ID) using linear inline metadata (LIM) technology according to one implementation.

FIG. 4 illustrates using a tag 420 in a pointer 400 to encode an ownership ID 442 using linear inline metadata (LIM) according to one implementation. Tag 420 may be used to track an ownership ID. FIG. 4 is a schematic diagram of an illustrative encoded pointer 400 architecture in which the encoded pointer includes a multi-bit memory allocation size field 410, a multi-bit tag 420 data field, a multi-bit address field 430, and a multi-bit pointer arithmetic field 440, in accordance with at least one implementation. As depicted in FIG. 4, the encoded pointer 400 may include an x86 architecture 64-bit pointer. In other implementations, the encoded pointer 400 may include a greater (e.g., 128-bits) or lesser (e.g., 16-bits, 32-bits) number of bits. The number of bits used in the address field 430 may be based on the size of the respective memory allocation. For example, a larger memory allocation requires a greater number of address bits than a smaller memory allocation. The address field 430 may include any number of bits. For example, the address field 430 may accommodate memory addresses having: 8-bits or more; 16-bits or more, 32-bits or more; 48-bits or more; or 64-bits or more.

In various implementations, the size data field 410 may include any number of bits. For example, the size data may include: 2-bits or more; 4-bits or more; 6-bits or more; or 8-bits or more. The size data field 410 provides an indication of the size of the memory allocation. The tag 420 data field may include any number of bits. For example, the tag 420 data field may include: 4-bits or more, 6-bits or more; 8-bits or more, 16-bits or more, or 32-bits or more. The encoded pointer 400 also includes a pointer arithmetic field 440. The pointer arithmetic field 440 may include any number of bits. For example, the pointer arithmetic field 440 may include: 4-bits or more, 6-bits or more; 8-bits or more, 16-bits or more, or 32-bits or more.

As depicted in FIG. 4, upon execution of an instruction that includes a memory operation, processor circuitry and/or memory controller circuitry of computing hardware 200 compares the tag data included in the tag data field of a pointer to an object with the tag data stored at the middle address of the memory allocation. If the tag data encoded in the tag 420 data field matches the tag data stored at the middle address of the naturally aligned power-of-two slot containing the memory allocation, processor circuitry and/or memory controller circuitry completes the requested memory operation in the system memory circuitry. If the tag data encoded in the tag 420 data field fails to match the tag data stored at the middle address of the naturally aligned power-of-two slot containing the memory allocation, memory controller circuitry reports an error, fault, or exception, to the processor circuitry. In some implementations, allocation bounds metadata may be included in metadata. In such implementations, the memory controller circuitry may also check whether the memory access is within the specified bounds.

One property that is to be ensured by the technology described herein is exclusive mutability. This is achieved by updating the ownership ID of an object whenever a dataflow is observed dynamically between two references (that is, p=&mut q). In this way, the transferred reference (on the right-hand side of the expression) loses the ownership of the object and is not allowed to be used to modify the object since the ownership ID will be mismatched. The destination of the dataflow (on the left-hand side of the expression), however, will hold the most recent ownership ID, which is the same ID as encoded in the object metadata, and thus becomes the only valid reference to access the object.

The technology described herein relies, in one implementation, on LIM 218 to encode ownership ID in both pointer and object metadata. When the borrow is transferred (when a dataflow between two references are detected), the metadata of the object is updated and only the destination reference's metadata is updated accordingly, thus invalidating the previous reference after the transfer. Later, LIM 218 relies on computing hardware 200 to locate the inline metadata in constant time and compare tags between pointers and objects to raise exceptions when mismatches are found.

In one implementation, an ownership transfer operation is implemented by randomizing the ownership ID metadata for an object and generating a new pointer with the updated ownership ID, after checking that the supplied input pointer has an ownership ID and tag matching that of the referenced object. For example, the ownership transfer operation may be implemented in a new instruction such as transfer ownership instruction 206.

Table 2 shows an end-to-end example of unsafe coding containing a bug. This sample code violates the borrow checking rules in Rust. An existing compiler would accept this code even though the code's runtime behavior violated the borrow checking rules. The technology described herein, including BC-ABI, mitigates this violation.

TABLE 2

```
static mut PREV_X_PTR: *mut i32 = 0 as *mut i32;
unsafe fn f(x_ref: &mut i32) {
    *x_ref += 1;
    // The pointer within x_ref will be saved even after the lifetime of the
borrowed x_ref ends when f returns:
    PREV_X_PTR = x_ref as *mut i32;
}
unsafe fn g( ) {
    // bug that updates object through pointer previously saved by f:
    *PREV_X_PTR *= 2;
}
fn main( ) {
    // Box::new allocates the object on the heap:
    let mut x = Box::new(5);
    // Waypoint A
    println!("initial value of x: { }", *x);
    unsafe {
        // Waypoint B
        f(x.as_mut( ));
        // Waypoint C
        g( );
    }
    println!("final value of x: { }", *x);
}
```

Figure 5:
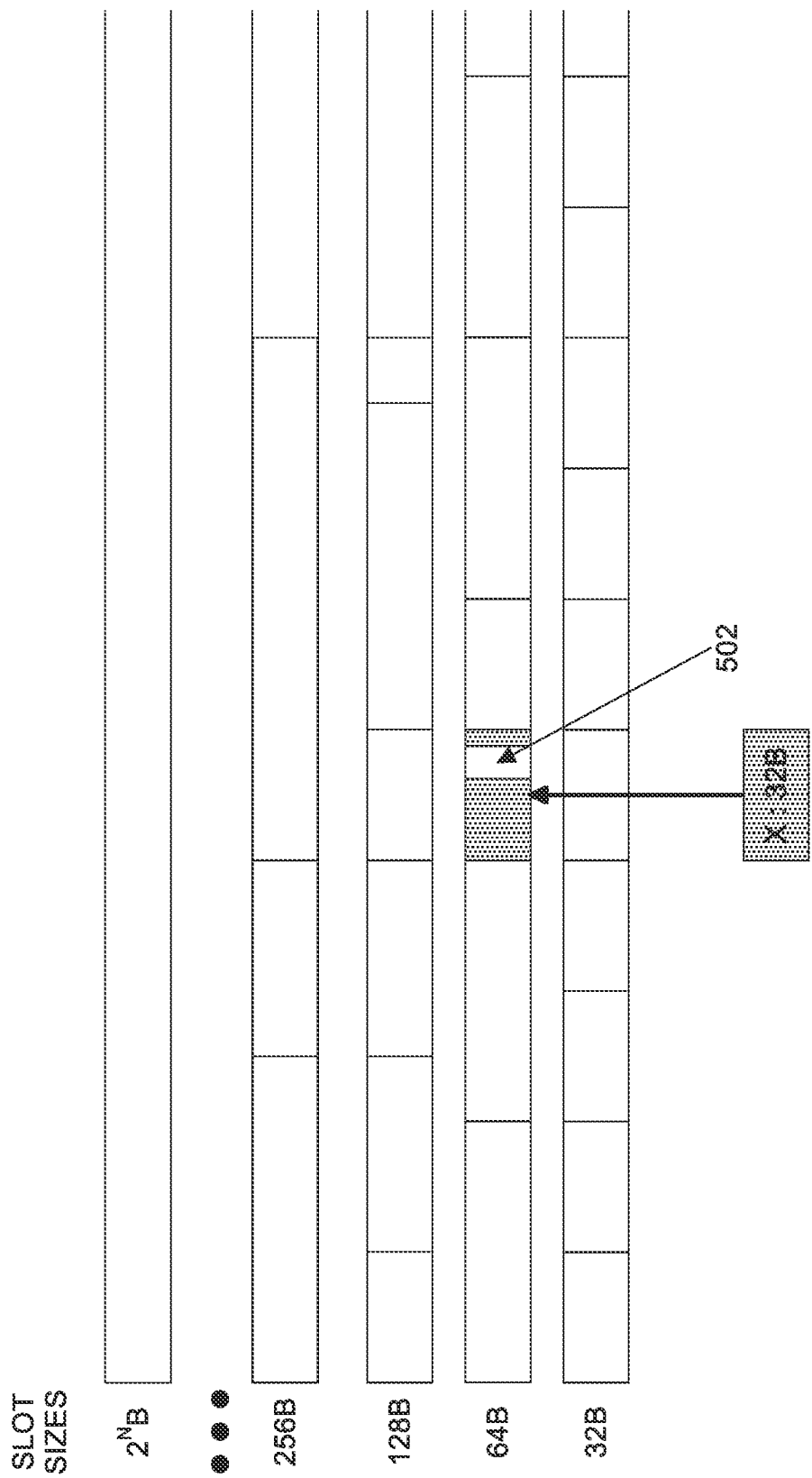
FIG. 5 illustrates an example heap memory layout for a variable according to one implementation.

FIG. 5 illustrates an example heap memory layout for variable x from the sample code of Table 2 according to one implementation. FIG. 5 illustrates the location of the metadata 502 (including the ownership ID). The update of the ownership ID occurs in the metadata 502. In this example, the memory is represented as a heap but in other examples the memory could be represented as a stack.

Figure 6:
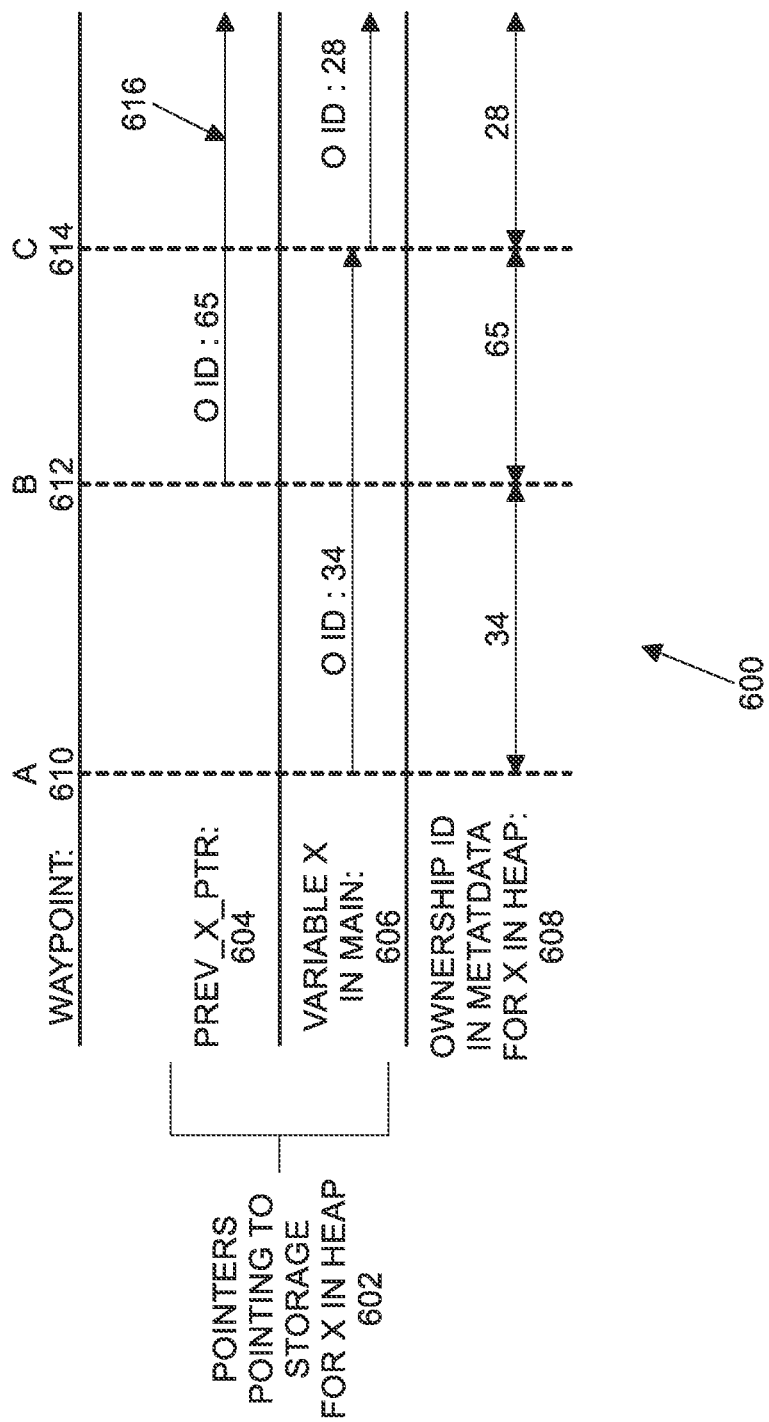
FIG. 6 illustrates ownership IDs in pointers and updates of ownership IDs according to one implementation.

FIG. 6 illustrates ownership IDs in pointers and updates of ownership IDs 600 according to one implementation. The sequence of updates to the ownership ID in the metadata are shown as well as the ownership IDs in the pointers referencing x at various points during the sample program's runtime, as indicated by the waypoints A 610, B 612, and C 614. Pointers pointing to storage for x in the heap 602 include a previous x pointer (prev_x_ptr) 604, and variable x in the main program 606. Prev_x_ptr 604 receives ownership ID (OID) of 65 at waypoint B 612 in this example. Variable x 606 receives ownership ID of 34 at waypoint A 610 and 28 at waypoint C 614 (in this example). The attempt to access variable x in the unsafe function g via the raw pointer value that was previously stored by function f is blocked, because the ownership ID in the stored raw pointer differs from the current ownership ID in the metadata for x at the time the invalid access is attempted (at 616). In one implementation, the ownership IDs are randomly generated.

The dynamic error indication generated by enforcement of BC-ABI highlights the presence of the bug to the program developer (e.g., by CC compiler 104). The program developer could correct the program as shown in Table 3 so that the program will be executed without error with BC-ABI enforcement in effect.

TABLE 3

```
unsafe fn f(x_ref: &mut i32) {
    *x_ref += 1;
}
unsafe fn g(x_ref: &mut i32) {
    *x_ref *= 2;
}
```

TABLE 3-continued

```
fn main( ) {
    // Box::new allocates the object on the heap:
    let mut x = Box::new(5);
    // Waypoint A
    println!("initial value of x: { }", *x);
    // Waypoint B
    f(x.as_mut( ));
    // Waypoint C
    g(x.as_mut( ));
    // Waypoint D
    println!("final value of x: { }", *x);
}
```

Figure 7:
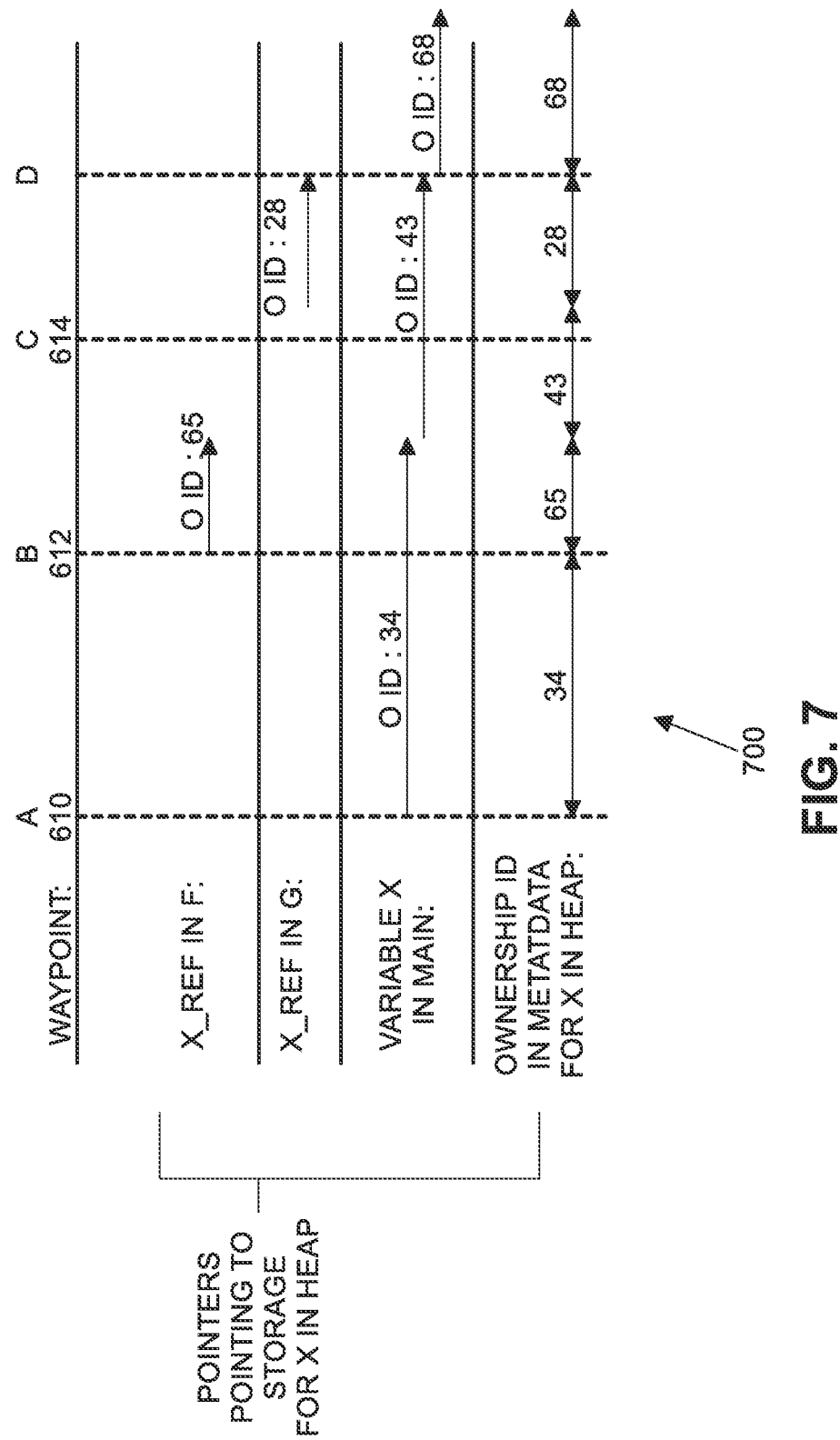
FIG. 7 illustrates updates of ownership IDs for a corrected program according to one implementation.

FIG. 7 illustrates updates of ownership IDs 700 for the corrected program according to one implementation.

Rust defines separate ownership transfers and bounds checking for fields within structures as shown in the example in Table 4, so it is necessary to store separate metadata for each field individually to which a reference may be generated.

TABLE 4

```
fn main( ) {
    #[derive(Debug)]
    struct Pair { a: i32, b: i32 };
    let mut x = Pair { a: 5, b: 6 };
    let mut y = &mut x.a;
    let mut z = &mut x.b;
    *y += 1;
    *z += 1;
    println!("{:?}", x);
}
```

In Table 4, ownership is tracked separately for distinct fields within a structure. The ampersand operator borrows a reference to its operand, and the "mut" modifier is used to borrow a mutable reference. References to be dereferenced use the asterisk operator.

Figure 8:
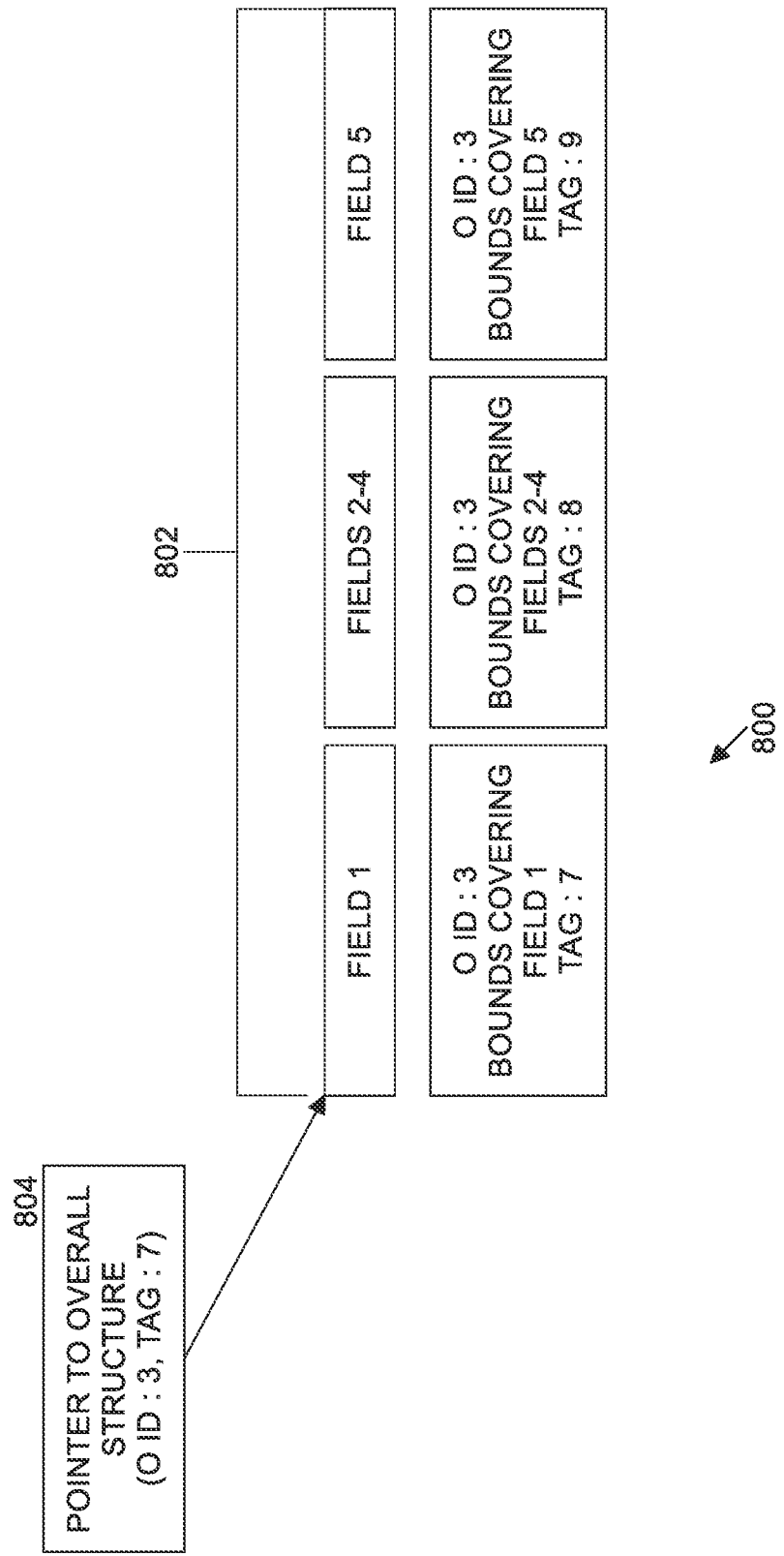
FIG. 8 illustrates treating pointer fields as separate memory allocations to architecturally enforce borrow-checking (BC) application binary interface (ABI) typing rules according to one implementation.
Figure 9:
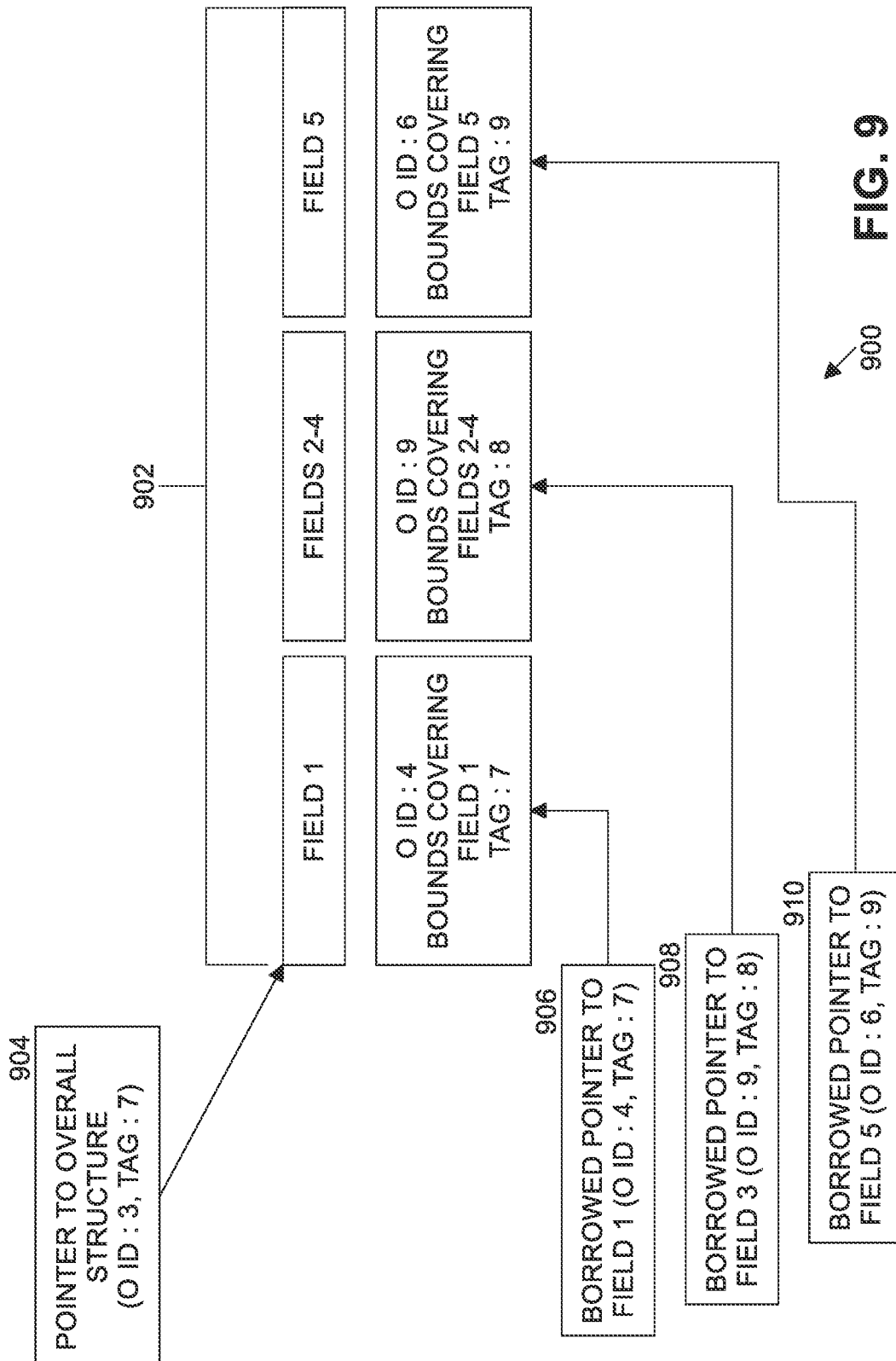
FIG. 9 illustrates separately borrowing fields within a single pointer structure according to one implementation.

The CC compiler 104 generates pointers both to overall structures as well as to individual fields within structures (e.g., as illustrated in FIGS. 8 and 9). Borrowing rules require that even if individual fields are borrowed from within a structure that is itself borrowed, ownership of all fields within the structure must be returned prior to transferring ownership of the overall structure. Thus, the CC compiler 104 must reach a point at which the CC compiler simultaneously knows all the ownership IDs for all the fields within the structure, and that point will be prior to when the ownership of the overall structure needs to be transferred. Note that the CC compiler may need to invoke dynamic code when transferring ownership of polymorphic objects (such as those referenced using a "dyn" type in Rust) to identify the complete set of fields within the object at runtime.

FIG. 8 illustrates treating pointer 802 fields as separate memory allocations to architecturally enforce borrow-checking (BC) application binary interface (ABI) typing rules according to one implementation. Pointer to overall structure 804 may be represented as a pointer to a first field within the pointer 802 structure, from which other pointers to other fields can be derived due to CC compiler knowledge of the object layout and the cross-field tag generation processing. In one implementation, it may be possible for the CC compiler 104 to treat multiple fields as a single allocation when it can be determined via static analysis that no access to those fields can violate BC-ABI typing rules.

Ownership ID fields may be set for fields in an object structure and then reset after a borrow.

FIG. 9 illustrates in arrangement 900 separately borrowing fields within a single pointer structure 902 according to one implementation. Pointer to overall structure 904 is not usable to access the first field nor to generate pointers 906, 908, 910 to other fields that are borrowed. After borrows are complete, the ownership ID in each field is resynchronized and a new pointer generated to the overall structure with the synchronized ownership ID.

This provides the CC compiler 104 with an opportunity to synchronize the ownership IDs within all the fields (e.g., set them all to the same value) so that a pointer to any field can be generated from a pointer to the first field within the structure. For example, this may be implemented using an instruction that accepts a specified next ownership ID rather than a random next ownership ID such that the same ID can be used across multiple fields. This may be used whenever transferring ownership of the overall structure, even if not immediately preceded by operations that establish separate ownership of distinct fields.

It may also be necessary to set the tag/version values across all the fields such that a pointer to any of them can be generated from a pointer to the first field. To help enforce spatial safety, different tag values may be used for different fields, but their relationship needs to be predictable (e.g., strictly incrementing for each consecutive field) to permit generating pointers to fields from the pointer to the first field.

BC-ABI can enforce per-field borrow-checking in unsafe code. The example code is shown in Table 5.

TABLE 5

```
static mut PREV_X_A_PTR: *mut [i32; 7] = 0 as *mut [i32; 7];
struct S {
   a: [i32; 7],
   b: [i32; 7],
}
unsafe fn f(a_ref: &mut [i32; 7], b_ref: &mut [i32; 7]) {
   //Waypoint C
   // The pointer within x_ref will be saved even after the lifetime of the
borrowed x_ref ends when f returns:
   PREV_X_A_PTR = a_ref as *mut [i32; 7];
   (*b_ref)[1] += 1;
}
unsafe fn g( ) {
   // bug that updates object through pointer previously saved by f:
   (*PREV_X_A_PTR)[1] += 1;
}
fn main( ) {
   // Box::new allocates the object on the heap:
   let mut x = Box::new(S { a: [5; 7], b: [2; 7] });
   // Waypoint A
   unsafe {
      let x_ref = x.as_mut( );
      // Waypoint B
      f(&mut x_ref.a, &mut x_ref.b);
      // Waypoint D
      g( );
   }
   // Waypoint E
   x.b[1] += 1;
   println!("{ } { }", x.a[1], x.b[1]);
}
```

Figure 10:
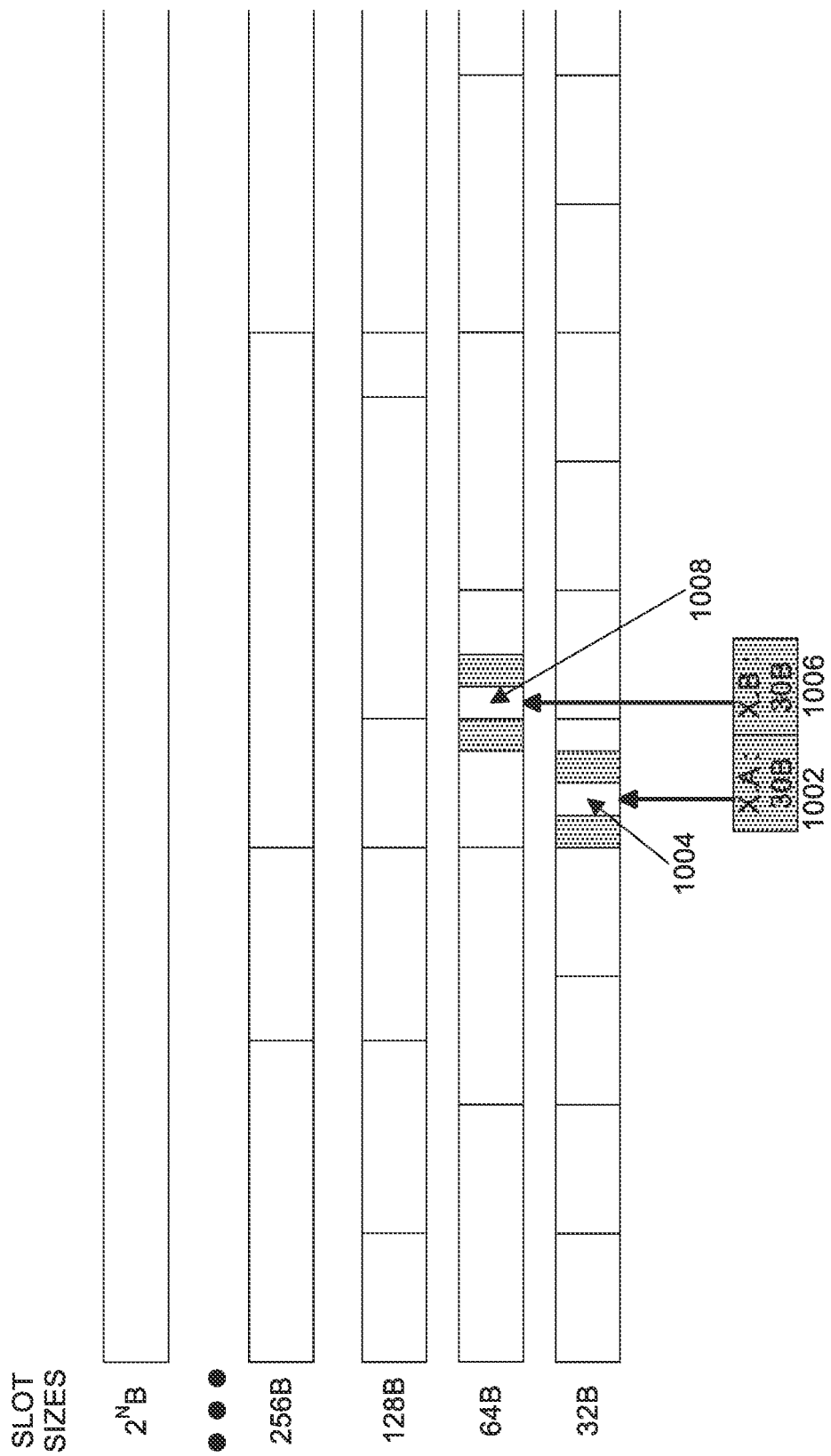
FIG. 10 illustrates an example heap memory layout for two fields of a variable according to one implementation.

FIG. 10 illustrates an example heap memory layout for two fields (A and B) of a variable X according to one implementation. Note that each field has a separate metadata. In this example, field A 1002 has metadata 1004 and field B 1006 has metadata 1008. Assume that 32B and 64B slots each require two bytes of metadata, thus increasing the sizes of the A and B fields to 30 bytes each (in this example).

Figure 11:
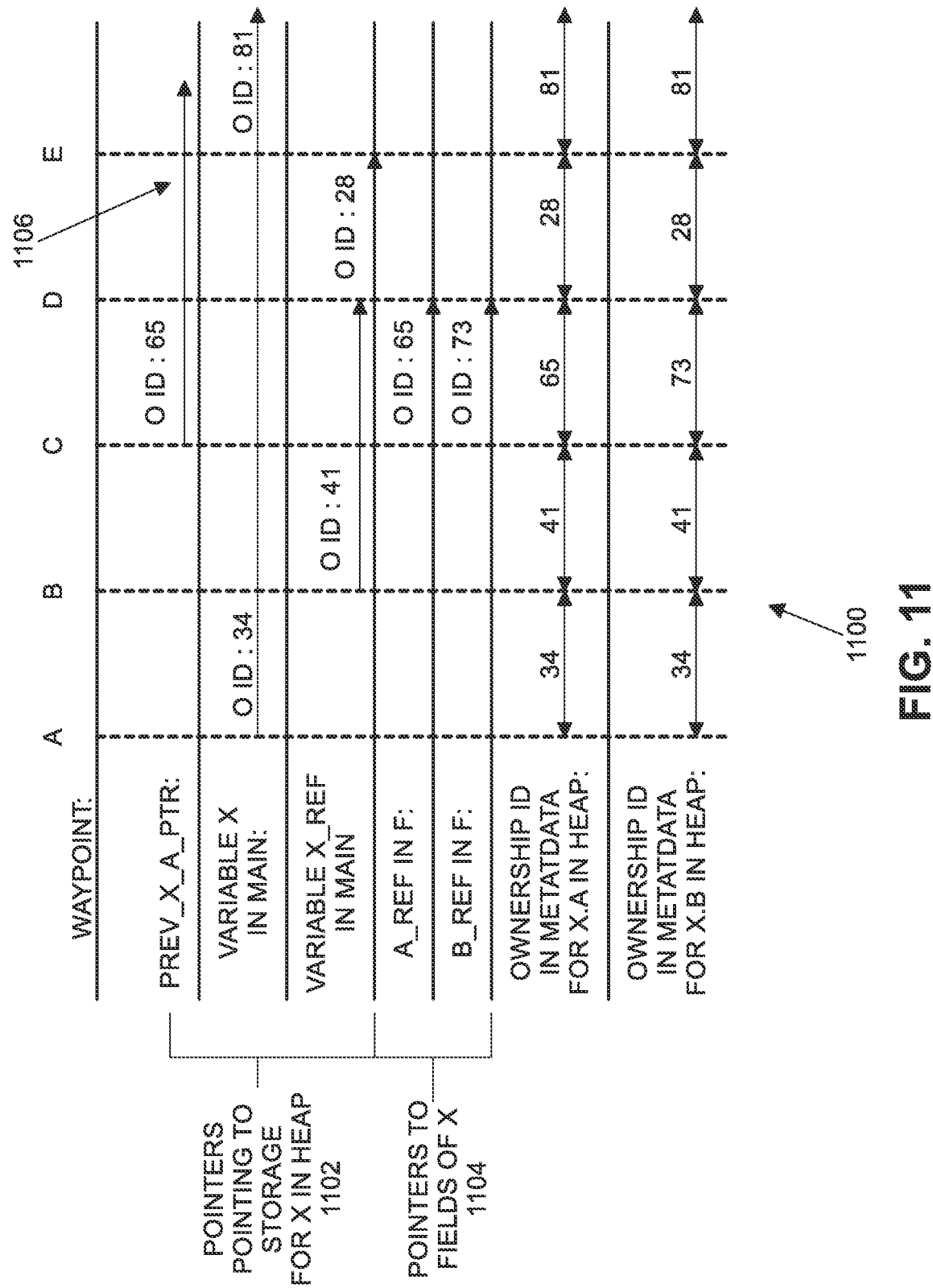
FIG. 11 illustrates updates in ownership IDs for separate fields of a variable as a program executes according to one implementation.

FIG. 11 illustrates changes in ownership IDs for separate fields of a variable as a program executes over time according to one implementation. Two sets of pointers are shown in the example of FIG. 11: 1) pointers pointing to storage for variable X in heap 1102, and 2) pointers to fields of variable X 1104. At point 1106, a buggy access is attempted and is blocked due to an ownership ID mismatch.

When performing a move operation from one variable to another, ownership of the referenced data transfers from the source variable to the destination variable, and the ownership will not be returned after that point.

When borrowing a mutable reference to data, the ownership of the data is first transferred to the destination variable, and the ownership is later transferred back to the source variable.

When borrowing immutable references to data (there may be multiple that are simultaneously active), the ownership of the data remains with the source variable, since the original variable may still be used to read the data even while other immutable references exist. However, the data is not permitted to be updated while any immutable references exist.

In one implementation, three additional instructions are added to the instruction set architecture (ISA) of computing hardware 200: 1) Mark Immutable instruction 204; 2) Transfer Ownership instruction 206; and 3) Assert Immutable instruction 208. Each of these instructions are generated by CC compiler 104 as needed. Each of these instructions accepts a pointer as an operand.

A new Mark Immutable instruction 204 should be used to mark an object as immutable in the object's associated metadata the first time an immutable reference is generated after the data was referenced mutably. The object is referenced by a pointer as an operand to the Mark Immutable instruction 204.

Figure 12:
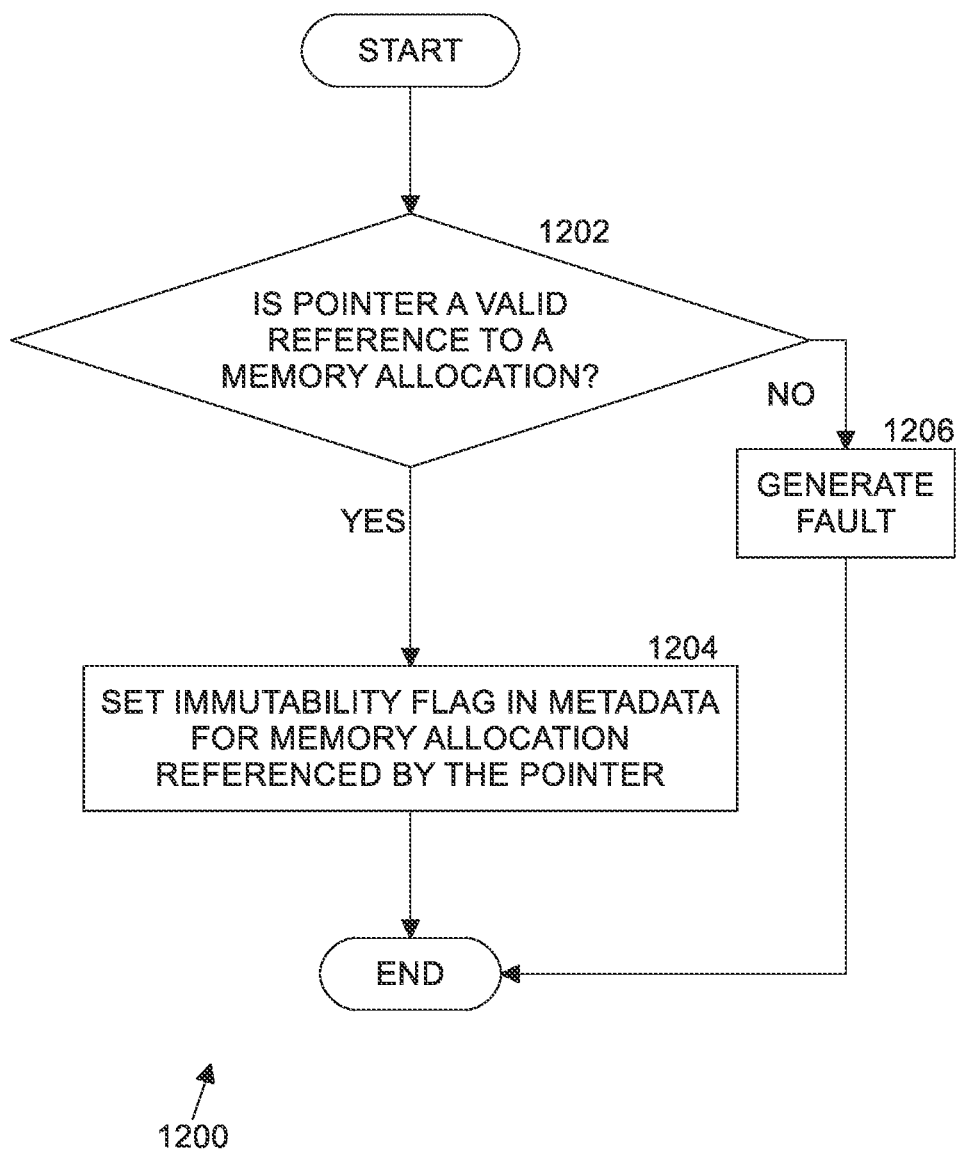
FIG. 12 is a flow diagram of mark immutable instruction processing according to one implementation.

FIG. 12 is a flow diagram of mark immutable instruction processing 1200 according to one implementation. At block 1202, if the pointer is not a valid reference to a memory allocation (e.g., tag matches, ownership ID matches, and within bounds), then at block 1206 computing hardware 200 generates a fault. At block 1202, if the pointer is a valid reference to a memory allocation, then at block 1204 computing hardware 200 sets an immutability flag in metadata for the memory allocation referenced by the pointer.

The same ownership ID as was used for the mutable reference can be used for all the simultaneously valid immutable references. The only way to clear the immutability marking is to transfer ownership, which will invalidate previous pointers (by randomizing the object's ownership ID) to prevent undetected use of mutated data via immutable references. This may be accomplished by the Transfer Ownership instruction 206. The object is referenced by a pointer as an operand to the Transfer Ownership instruction 206. An ownership ID may be supplied as an optional parameter. The Transfer Ownership instruction 206 may be used for a move or a borrow of a pointer reference.

Figure 13:
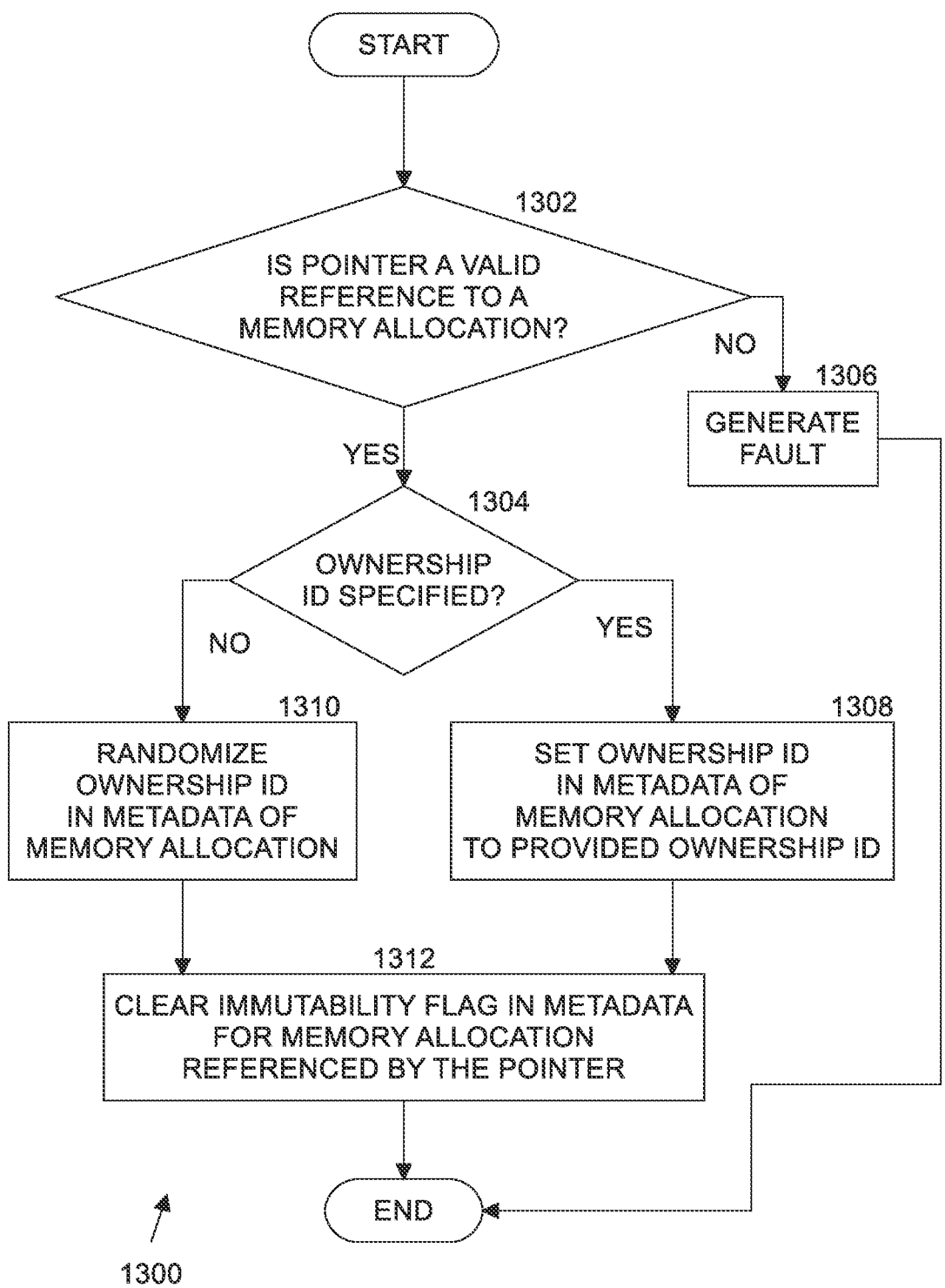
FIG. 13 is a flow diagram of transfer ownership instruction processing according to one implementation.

FIG. 13 is a flow diagram of transfer ownership instruction processing 1300 according to one implementation. At block 1302, if the pointer is not a valid reference to a memory allocation (e.g., tag matches, ownership ID matches, and within bounds), then at block 1306 computing hardware 200 generates a fault. At block 1302, if the pointer is a valid reference to a memory allocation, then at block 1304 computing hardware 200 determines if the optional ownership ID is specified (e.g., as an additional operand to the Transfer Ownership instruction 206). If the ownership ID is provided, then at block 1308 computing hardware sets the ownership ID in metadata of the memory allocation to the provided ownership ID. If the ownership ID is not provided, then at block 1310 computing hardware 200 randomizes an ownership ID in the metadata of the memory allocation. In either case, at block 1312, computing hardware 200 clears an immutability flag in the metadata for the memory allocation referenced by the pointer.

A new Assert Immutable instruction 204 may be used to generate a fault if the supplied reference is to a mutable object. The CC compiler 104 may insert such instructions when accessing immutable references supplied by untrusted code to ensure that the code marked the data as immutable, or the CC compiler can intersperse them throughout code to provide defense-in-depth. The object is referenced by a pointer as an operand to the Assert Immutable instruction 204.

Figure 14:
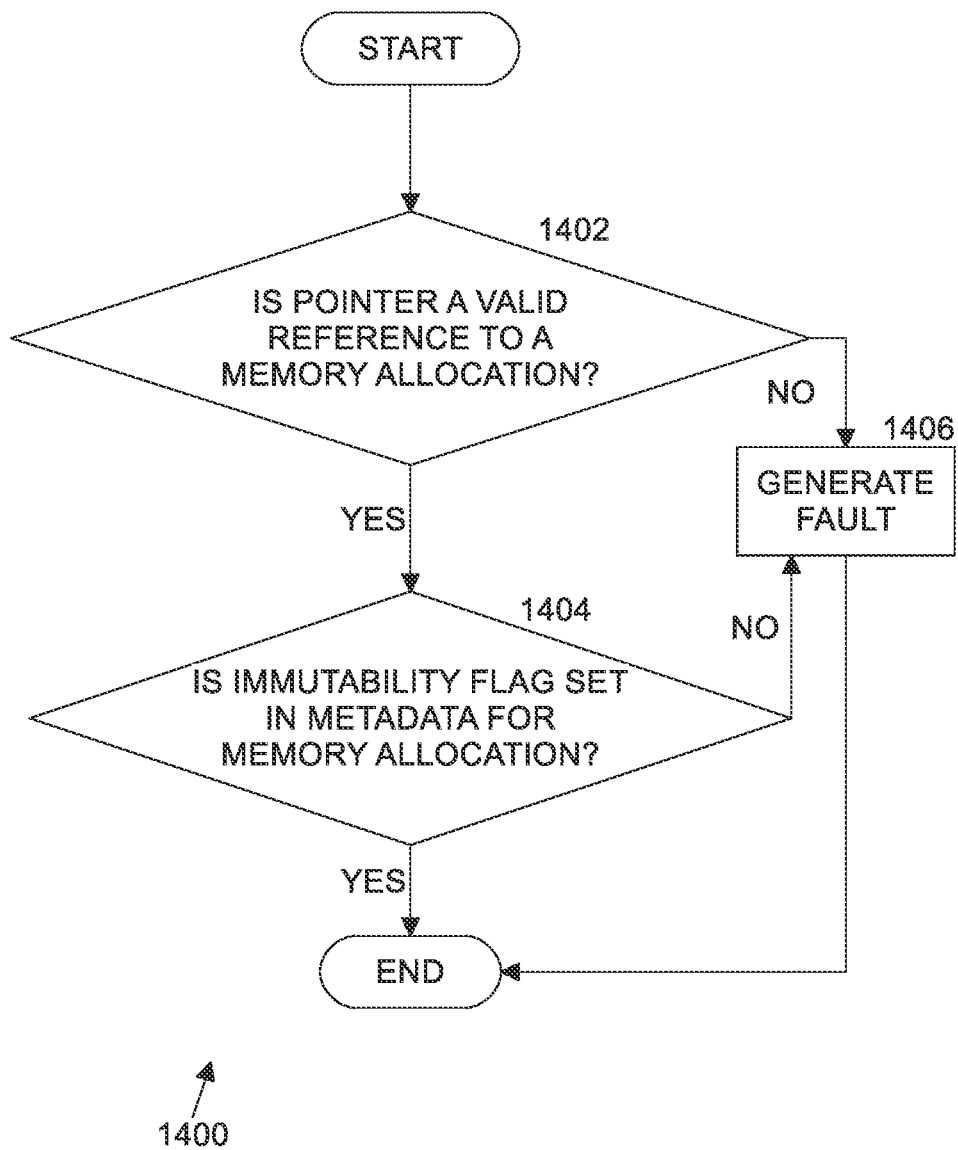
FIG. 14 is a flow diagram of assert immutable instruction processing according to one implementation.

FIG. 14 is a flow diagram of assert immutable instruction processing 1400 according to one implementation. At block 1402, if the pointer is not a valid reference to a memory allocation (e.g., tag matches, ownership ID matches, and within bounds), then at block 1406 computing hardware 200 generates a fault. At block 1402, if the pointer is a valid reference to a memory allocation, then at block 1404 computing hardware 200 determines if the immutability flag is set for the memory allocation referenced by the pointer. If the immutability flag is not set, then at block 1406 a fault is generated. In one implementation, the immutability flag may be stored alongside the ownership ID in the metadata.

In one implementation, another protection that can be provided by CC hardening for Rust is to ensure access rights of a pointer in Rust programs dynamically by allowing only mutable references that can modify the memory and no reference can modify an immutable object. This may be implemented by adding an extra bit in the metadata to indicate whether the object is mutable (when allocated). The writable bit of an object is determined when the object is allocated (let mut o=1) and cannot be altered later. While the writable bit encoded in the pointer can be altered, the bit can only be switched from writable to read only (i.e., 1→0 if 1 represents writable, and 0 represents read only). This also follows Rust typing rules which allows a mutable reference to be safely cast to an immutable reference but not vice versa.

Move and borrow operations may need to be performed for an entire hierarchy of objects referenced from an initial object to mitigate attempts to save pointers to interior objects and use them later after ownership of a higher-level object has already been transferred. Thus, CC compiler 104 may generate code to walk object hierarchies and perform those updates.

For each parameter moved into or mutably borrowed by a callee, the callee must perform that operation to avoid the requirement for the callee to trust the caller to transfer ownership. For each parameter immutably borrowed by a callee, the caller must mark that object as immutable to avoid the requirement for the caller to trust the callee to not mutate the object.

Ownership of data returned by a reference needs to be transferred from the callee to the caller such that subsequent references to the original pointer that may have been saved by the callee are disallowed.

The BC-ABI caller should transfer ownership back to itself for each pointer that is returned from a callee. The caller should not trust the callee to perform the transfer, since the callee may omit the transfer and save a pointer with a valid ownership ID that could be used later without authorization.

Some languages already include constructs embodying ownership transfer, e.g., unique_ptr in C++. Other languages could be extended similarly. Such constructs may be extended to be hardened using CC analogously to how the similar constructs in Rust can be hardened.

The base ABI entrusts the callee with saving and restoring certain register values, which may be undesirable in some cases, e.g., when calling a function in an untrusted library. One risk is that the values of those registers may be used by the callee in an unauthorized manner, and a second risk is that the callee may corrupt the values of registers upon return with an intent to corrupt the operation of the caller. Such interfaces between functions that are not in the same trust domain (e.g., different tenants) may avoid treating any registers as callee-saved. Furthermore, the general-purpose registers other than those containing function parameters may be sanitized (e.g., zeroed) prior to invoking the untrusted callee.

Untrusted code may attempt to forge arbitrary pointers to bypass BC-ABI restrictions. To mitigate this, mechanisms are needed to constrain memory accesses from untrusted code. These controls do not need to be so precise as those on references to objects that are subject to borrow-checking (except for accesses from unsafe code to borrow-checked objects), but they should be sufficiently strict to block unauthorized access to borrow-checked memory regions. For example, CC encrypts data, and unencrypted pointers do not provide plaintext access to encrypted data. CC cryptographically mitigates attempts to forge encrypted pointers.

An access from unsafe code should only be permitted if the access satisfies one of the following rules. 1) The access is specifically authorized via a pointer with associated per-object security metadata. The object may be in any region of memory (e.g., heap, stack, or global). Pointer encryption mitigates attempted pointer forgeries granting unauthorized access. 2) The access is to a limited range of register: stack pointer (RSP)- or register: instruction pointer (RIP)-relative offsets that a static code validator determines does not violate security policy, (stays within the current stack frame and the portion of the preceding stack frame containing on-stack arguments or within the bounds of an authorized global variable). There may be tradeoffs between compatibility with unsafe code and enforcing these checks, so administrators may be responsible for making those tradeoffs when deciding which code to run. For example, some unsafe code may include complex memory accesses that are infeasible to analyze statically. 3) The access is to a range of memory in which sensitive data is cryptographically protected such that an unauthorized access does not result in information disclosure or adversary-controlled data corruption, that is, the data would at least be garbled in ways that are unpredictable to the adversary. This obviates the need for a static validator to check the code and hence avoids the tradeoffs between code compatibility and security mentioned above. 4) The access is authorized via a pointer with associated region-specific security metadata (e.g., to restrict the access to a particular stack frame). This supports dynamic enforcement to avoid the compatibility limitations of static code validation as described above, and it may be enforced cryptographically.

Any code pointer that a tenant depends upon should be protected from tampering by any other tenant. For example, return address encryption in combination with stack bounds checks as described above or a shadow stack may be used to protect return addresses. Forward code pointers may also be encrypted.

To further harden boundaries between tenants, separate keys can be used for each of a tenant's objects. However, controlled sharing can still be allowed. The pointer may contain an embedded key ID so that a tenant can generate a pointer authorizing a different tenant to access just that object with the granting tenant's key.

Strictly typed languages such as Rust that provide convenient alternatives to polymorphism, e.g., Rust traits, may have more type information available statically to CC compiler 104 compared to loosely typed languages or those that rely more on polymorphism. This may allow optimizations in which that type information is supplied statically to the processor in computing hardware 200, e.g., using new, typed load and store instructions that accept a type ID operand, so that the type information does not need to be stored separately. The processor could then enforce that the correct type of object is being accessed to mitigate type confusion, even during transient execution, e.g., by comparing the supplied type ID to one stored using LIM or by binding data encryption to the type ID. The latter concept of binding data encryption to the type ID may be implemented as disclosed in US Patent Publication Number US202000201789A1, as part of the Ld/StEP instructions.

Alternatively, when type information cannot be determined statically, it may be stored as dynamic metadata, e.g., using LIM, and new type-checking instructions may assert that the stored metadata for a supplied object is within the set of acceptable types for the method being run on that object. TypeChk and TypeJmp instructions and a design for using them for dynamic type checking are described in "Hardware Apparatuses, Methods, and Systems for Individually Revocable Capabilities for Enforcing Temporal Memory Safety", US Patent Publication Number US20210200546, published, Jul. 1, 2021, and incorporated herein by reference, but the described method specifies that type metadata is stored in a separate table. In contrast, the technology disclosed herein envisions the type metadata being stored in line with allocations.

Enforcing the BC-ABI cryptographically in a way that binds encryption of data and metadata (e.g., bounds, ownership ID, and immutability) to the security context that is relevant for BC-ABI (e.g., object identity, tag/version, and type) helps to ensure that the BC-ABI security policy is enforced even in the presence of attacks or data corruption pertaining to lower layers of the system. For example, a bit flip due to radiation could change unencrypted metadata for an object so that it is incorrectly marked as mutable, but that change could be detected if it occurred to the same location in the ciphertext for encrypted metadata, e.g., using integrity checking. Even without integrity checking, applying a block cipher with diffusion to the metadata will cause corruption to propagate to other bits where it may be detected indirectly, e.g., due to corrupted bounds no longer matching valid accesses. Physical attacks may corrupt even more bits and perform more sophisticated forms of corruption, such as moving or replaying data. Cryptography is useful in these cases as well, especially since cryptographic enforcement of the BC-ABI binds the object's encryption to its location/identity in the linear/virtual address space upon which program semantics are based directly. In combination with additional controls over changes to processor state, e.g., registers, cryptographic enforcement of BC-ABI can also defend against interference from untrusted privileged software.

Figure 15:
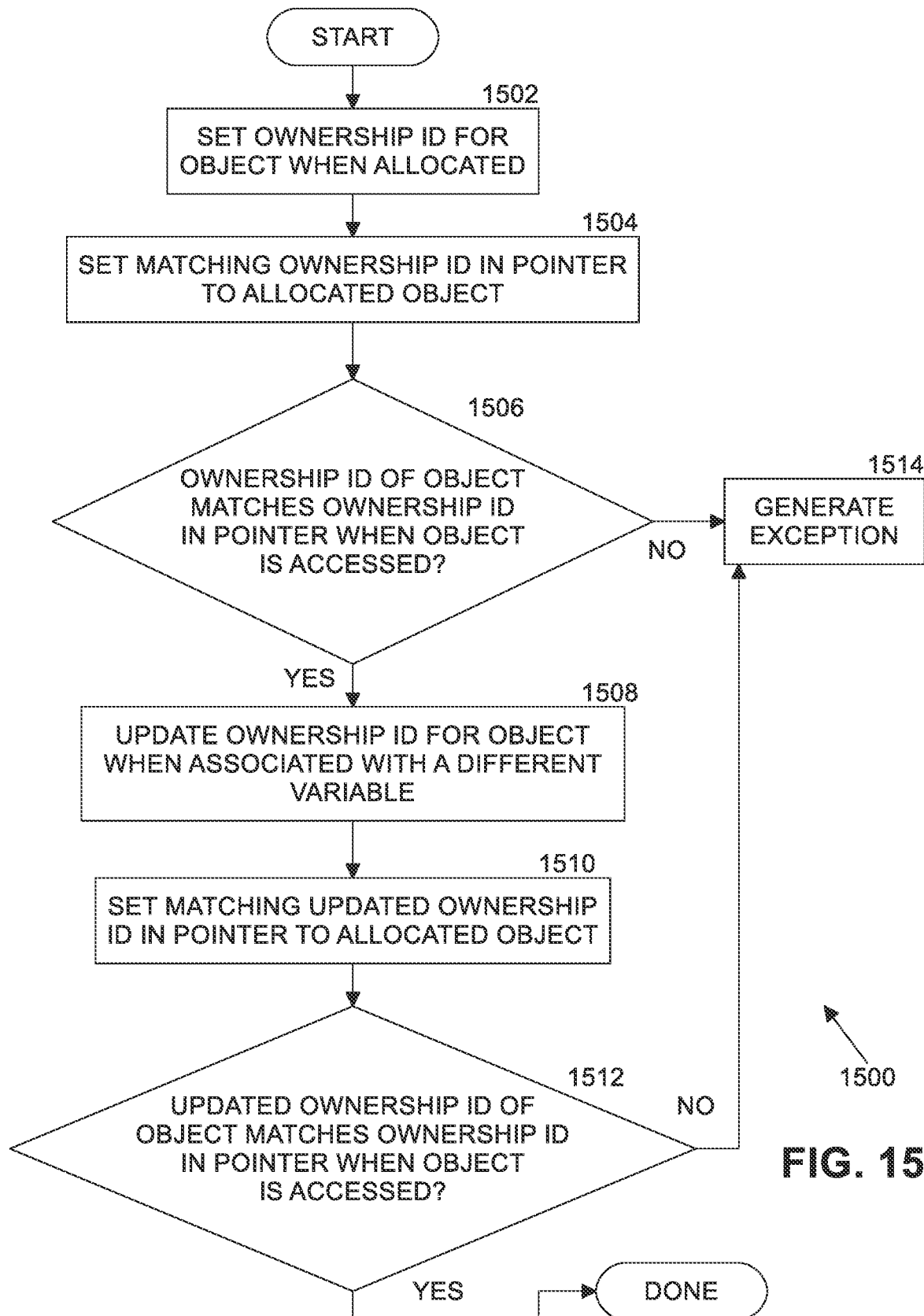
FIG. 15 is a flow diagram of borrow checking processing according to one implementation.

FIG. 15 is a flow diagram of borrow checking processing 1500 according to one implementation. One or more portions of computing hardware 200 performing this borrow checking processing include one or more of memory safety check unit 220, CC 216, ISA 202, LIM 218, and a processing core. During execution of a program that uses borrow checking (e.g., CVC enforced binary code 118), memory safety check unit 220 at block 1502 sets an ownership ID in a memory object when the object is allocated, the allocated object being associated with a first variable in a program. In one implementation, this involves using an unencoded pointer to access a metadata region of the object, with the ownership ID being stored in the metadata region. At block 1504, memory safety check unit 220 sets a matching ownership ID in a pointer to the allocated object. In one implementation, the matching ownership ID 442 is stored in tag 420 of pointer (address field 430) as described above in FIG. 4. In one implementation, the matching ownership ID is set by executing an extended form of an "encrypt pointer" (EncryptPtr) instruction as described in "Pointer Based Data Encryption", US Patent Publication No. 20200125501A1, published Apr. 23, 2020, and incorporated herein by reference. At block 1506, when the object is accessed, memory safety check unit 220 checks if the ownership ID of the object (e.g., one of the objects 214, as stored in memory 210) matches the ownership ID of the pointer (e.g., one of the pointers 212, as stored in the tag field). If the ownership IDs do not match, then an exception is generated at block 1514. If the ownership IDs do match, then processing continues with further processing of the program.

At some point during execution of the program, if an object is associated with a different variable, then at block 1508 memory safety check unit 220 updates the ownership ID in the metadata for the object (e.g., to reflect the "borrowing"). In one implementation, updating the ownership ID in the metadata for the object is accomplished by executing a Transfer Ownership instruction 206 as described above. At block 1510, memory safety check unit 220 sets the matching updated ownership ID in the pointer to the allocated object. In one implementation, updating the ownership ID in the pointer is accomplished by executing a Transfer Ownership instruction 206 as described above. Next, at block 1512, if the updated ownership ID of the object does not match the ownership ID in the pointer when the object is accessed, then an exception is generated at block 1514. Otherwise, this processing completes. The actions described in FIG. 15 may be repeated for a plurality of objects and a plurality of associations during execution of the program.

In CC 216 hardened for Rust (CC-Rust), most of the analyses are done at Mid-level intermediate representation (IR) (MIR) level. This is because while Rust MIR is relatively close to low level virtual machine (LLVM) IR, Rust MIR contains much richer type information of the compiled program (e.g., lifetime of references) that are essential for analyzing a Rust program but are lost after being translated into LLVM IR. Herein, two analyses used by CC-Rust are introduced, which are borrow expire analysis (to analyze when a certain borrow expires) and borrow transfer analysis (to analyze the set of borrows that has not been transferred thus might need to be expired at each program point).

The purpose of borrow expire analysis is to infer a set of possible locations that a given borrow expires. Invalidating the borrow at correct expiration locations ensures CC-Rust guarantees avoidance of temporal errors by preventing the use of dangling pointers dynamically. Meanwhile, the expiration of a certain borrow might revive the previously transferred reference.

Table 6 shows how an expired borrow revives other references.

TABLE 6

```
let x = &mut a;
{
    // transfer x
    let b = &mut (*x);
}
// b expires
// x revives
```

The sample code of Table 6 illustrates how an expired borrow 'b' can revive the references that 'b' reborrowed from. After 'b' goes out the scope, 'x' then again becomes a valid pointer that can be used to access 'a'.

Rust currently uses Non-Lexical Lifetime (NLL) to verify whether the compiling program follows the borrow checking rules. In NLL, the lifetime of a borrow (reference) is represented as a set, which contains all the program points (in MIR) where the borrow is alive. Each program point is a pair of a basic block ID and a statement index, which uniquely identify a statement in MIR. For example, {B, 0} represents the first statement in basic block B.

Conceptually, the borrow expire analysis works by performing a depth-first search on a control-flow graph followed by the items in the lifetime. The traversal terminates at every invalid program point (which are not included in the lifetime).

Figure 16:
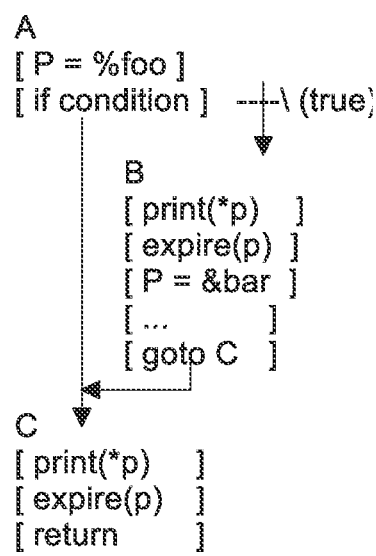
FIG. 16 shows an example on which the borrow expire analysis is performed.

FIG. 16 shows an example on which the borrow expire analysis is performed. After the lifetime of 'foo is inferred, the borrow expire analysis then traverses the MIR and breaks at {B, 1} and {C, 1} which are not included in the lifetime.

Figure 17:
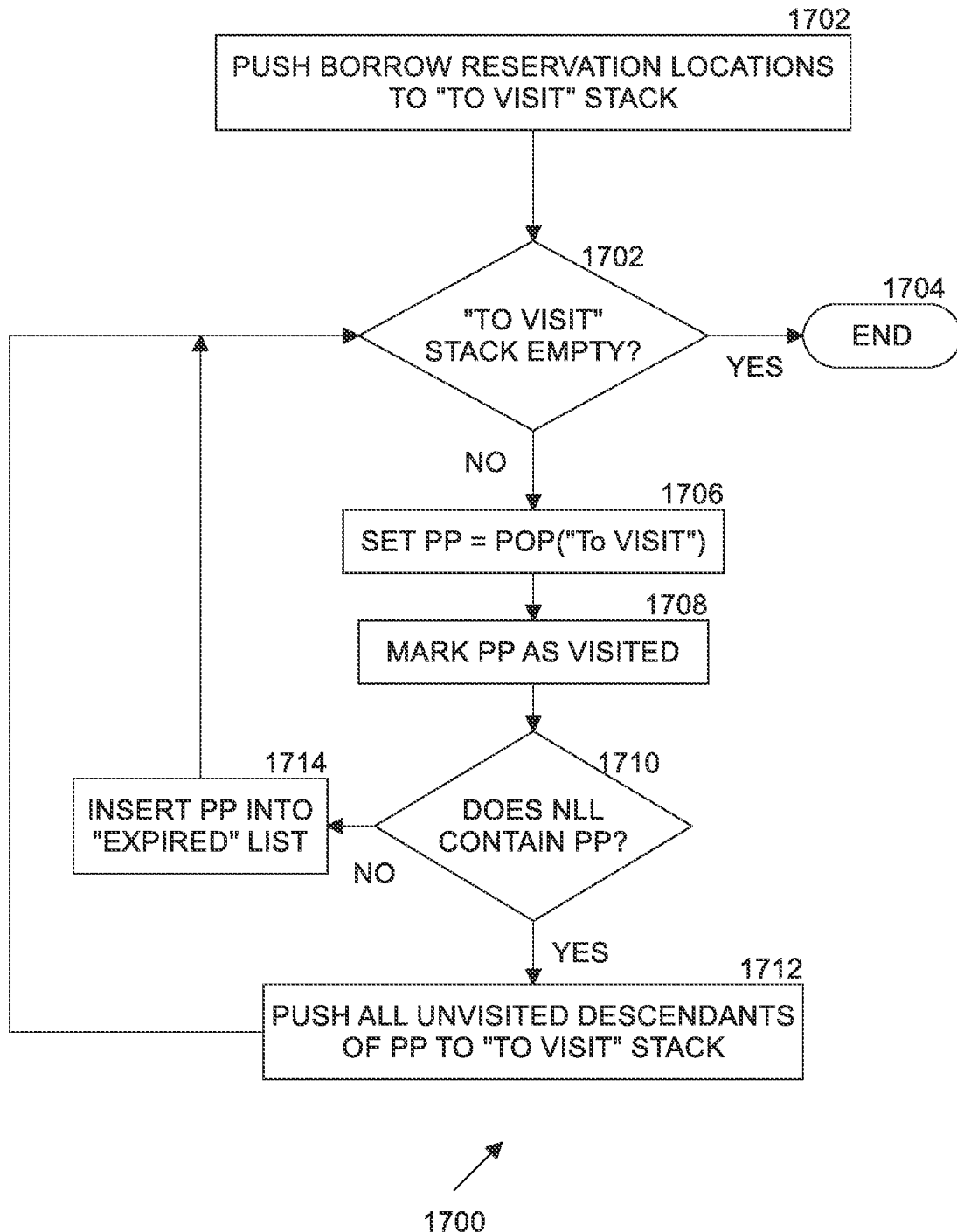
FIG. 17 is a flow diagram of borrow expire analysis processing according to one implementation.

FIG. 17 is a flow diagram of borrow expire analysis processing 1700 according to one implementation. At block 1702, analyzer 106 of CC compiler 104 pushes all relevant borrow reservation locations to a "to visit" stack. At block 1702, if the "to visit" stack is empty, processing moves to end block 1704. If the "to visit" stack is not empty, then at block 1706, analyzer 106 sets a variable PP equal to the contents of the next entry on the stack ("to visit"). At block 1708, the PP is marked as visited. At block 1710, if the NLL contains PP, then push all unvisited descendants of PP to the "to visit" stack. Otherwise, insert PP into an "expired" list and continue with block 1702.

While borrow expire analysis helps CC-Rust to determine when a given borrow expires, it does not compute which borrow need to be expired. As the borrows that are transferred are implicitly invalidated during runtime, they should not be expired again. For this purpose, another analysis called a borrow transfer analysis is run by analyzer 106 to compute a set of expirable borrows that have not been transferred at every program point.

In one implementation, the borrow transfer analysis is a classical Gen/Kill Data flow analysis that can be described by defining a top ($\top$), bottom ($\bot$) and a monotonic transfer function (f) based on kill and gen sets. For borrow transfer analysis, they are defined as following:

Top ($\top$): the set of all variables in the code.
Bottom ($\bot$): the empty set.
Transfer function:
    if statement match 'let p=&mut (*x)':
        kill(x)
        gen(p)
    else if statement match 'let p: &mut o=move x':
        kill(x)
        gen(p)
    else if statement match 'let p: &mut o=foo(&mut x, &mut y, . . . )':
        kill(x), kill(y) . . .
        gen(p)
    . . . .

The final result can then be computed by applying the transfer function to each statement in the MIR repeatedly until a fixed point is reached.

It is possible for a previously transferred reference to revive due to the expiration of the destinated reference. Thus, CC-Rust needs to provide support to revive a desired reference safely. Note that a set of new primitives should not be introduced to revive an arbitrary reference because those primitives are likely to be used by the malicious user to forge a valid pointer. Instead, a strict handoff of ownership should be enforced by computing hardware 200.

Table 7 shows an example on how a reference should be revived after the borrow passed to a function expires.

TABLE 7

```
let mut x = 1;
foo(&mut x);
// x revives, as the borrow passed to foo expires
x = 2;
```

CC-Rust revives 'x' in the example by rewriting the CC-enforced function to follow BC-ABI. BC-ABI transfers within the callee the ownership ID of the parameter passed in before use to ensure that a valid reference is passed in from an untrusted caller. The callee returns extra values to the caller for the transferred parameter, and the caller receives the extra return value and revives a desired reference by transferring from the extra return value. As the result, the example in Table 7 will be rewritten into the code in Table 8.

TABLE 8

```
let mut x = 1;
let ret = foo(&mut x);
// x revives, as the borrow passed to foo expires
x = transfer_from(ret);
x = 2;
```

Apart from function calls, references can also revive due to the expiration of a reborrow. A reborrow takes place using a statement such as let p=&(*q). After the statement, p and q will point to the same object, but q will be invalidated as it is transferred to p and has lost the ownership of the object. In the simple scenario, when the control flow does not diverge, the source and destination of the transfer can be easily determined. As shown in the example code in Table 9, when there is not divergence (no branches), the source and destination of the reborrow can be static determined.

TABLE 9

```
let x = &mut a;
{
    let p = &(*x);
    {
        let q = &(*p);
        {
            ...
        }
    }
    // q expires, p revives
    p = transfer_from(q)
}
// p expires, x revives
x = transfer_from(p)
```

Thus, to revive a reference, CC-Rust simply transfers the ownership from the 'reborrower' back to the previously transferred reference. The nested reborrow of the same object can be handled by maintaining a stack of reborrowed references statically and revive the reference at the top when the current 'reborrower' expires.

Figure 18:
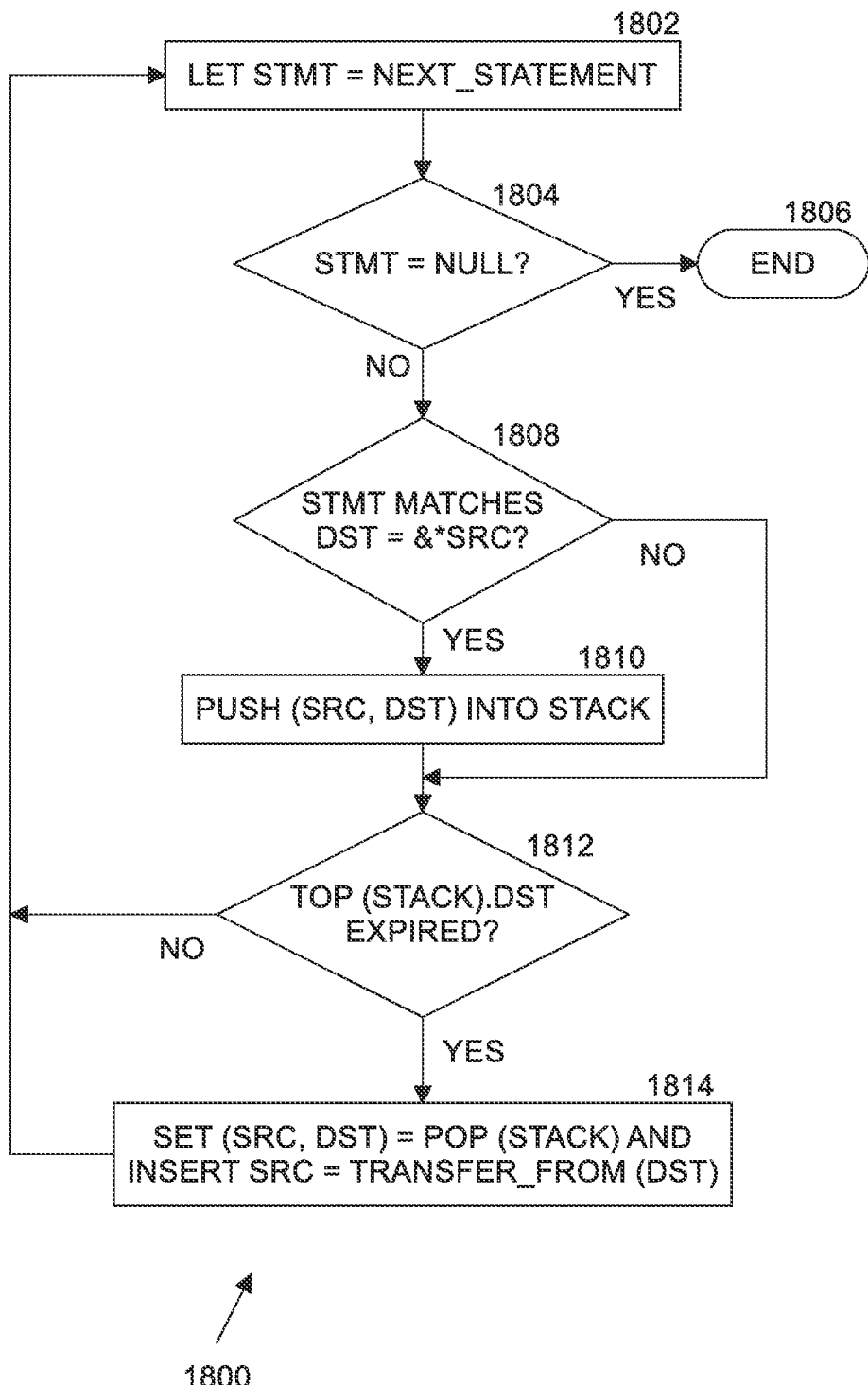
FIG. 18 is a flow diagram of revive reference due to reborrow processing according to one implementation.

FIG. 18 is a flow diagram of revive reference due to reborrow processing 1800 according to one implementation. At block 1802, analyzer 106 lets current statement (STMT) equal to a next statement. At block 1804, if the statement is null, then processing is ended at block 1806. If the statement is not null, then at block 1808 if the statement matches a destination (DST)=&*SRC, then at block 1810 analyzer 106 pushes (SRC, DST) into the stack. At block 1812, analyzer determines if the top entry on the stack.DST is expired. If so, at block 1814, analyzer 106 sets (SRC, DST) equal to POP (Stack) and inserts SRC equal to a transfer from DST.

In more complicated cases, where the control flow diverges and the source and destination of the borrow transfer cannot be uniquely determined, CC-Rust requires more instrumentation to figure out which path has been taken during runtime.

As shown in Table 10, CC-Rust needs to determine which path is taken during runtime to revive the desired reference when there is a control flow divergence.

TABLE 10

```
let x = &mut a;
let y = &mut b;
let p;
if ... {
    p = &mut (*x);
} else {
    p = &mut (*y);
}
if are_alias(p, x) {
    x = transfer_from(p);
} else if are_alias(p, y) {
    y = transfer_from(p);
}
```

The technology described herein also further provides new instructions and implementation of those new instructions for transferring ownership of a group of semantically related pointers.

This is useful for correctly layering code complexity, for modularization of functionality, and for preserving and extending the benefits of cryptographic borrow checking to hierarchies and/or collections of objects. Specifically, the borrow checking operations described above are supplemented such that: a) multiple pointers referring to a set of inter-related objects are transactionally checked in computing hardware 200 for correctness of mutability and transfer at the same time, b) software (e.g., CC compiler 104) controls the semantics of what needs to be transactionally checked, in a top-down manner where each layer is concerned only with the type of data structuring that is within each layer's scope, and c) immutable hierarchies or collections referred to by a software-synthesized pointer do not have to be recursively checked for mutability and transferability (this is useful for increasing the efficiency of the implementation).

This enables software packages, files, libraries, etc., written in higher level memory-safe languages (such as Rust) to be modular in their organization when employing cryptographic borrow checking in computing hardware. This enables software-based borrow checking in one procedure or in one region of source code 102 to be substituted by efficient and more secure cryptographic checking in computing hardware 200, while remaining agnostic of the hardware-based enforcement of mutability in other procedures or regions of source code 102.

This provision of structured transfers of semantically related pointers is an extension of computing hardware enabled safety checking for borrowing of pointers described above. This extension permits structured transfers of capabilities and for permitting only grouped transferring of ownership or borrowability of semantically related objects in memory.

The technology described herein provides mechanisms for controlling grouped transfers of ownerships of objects. This capability may have multiple use cases. The primary use case is where safe code or trusted code calls into unsafe code but wants to ensure that there is no escape of references across a group of semantically related objects, and that this is something to be achieved with the support of computing hardware 200. To provide for this semantic, the programmer of source code 102 collects two or more valid pointers and treats them as a group from the standpoint of ownership transfer, and computing hardware 200 automatically implements a compound check: the check both ensures that a pointer used for accessing any object in the group is a valid pointer and that ownership of the object is not being individually changed by a call to a Transfer Ownership instruction or that its mutability is not being individually changed (e.g., mutable to immutable or vice versa) for the duration of time that the pointer is part of the group.

Figure 19:
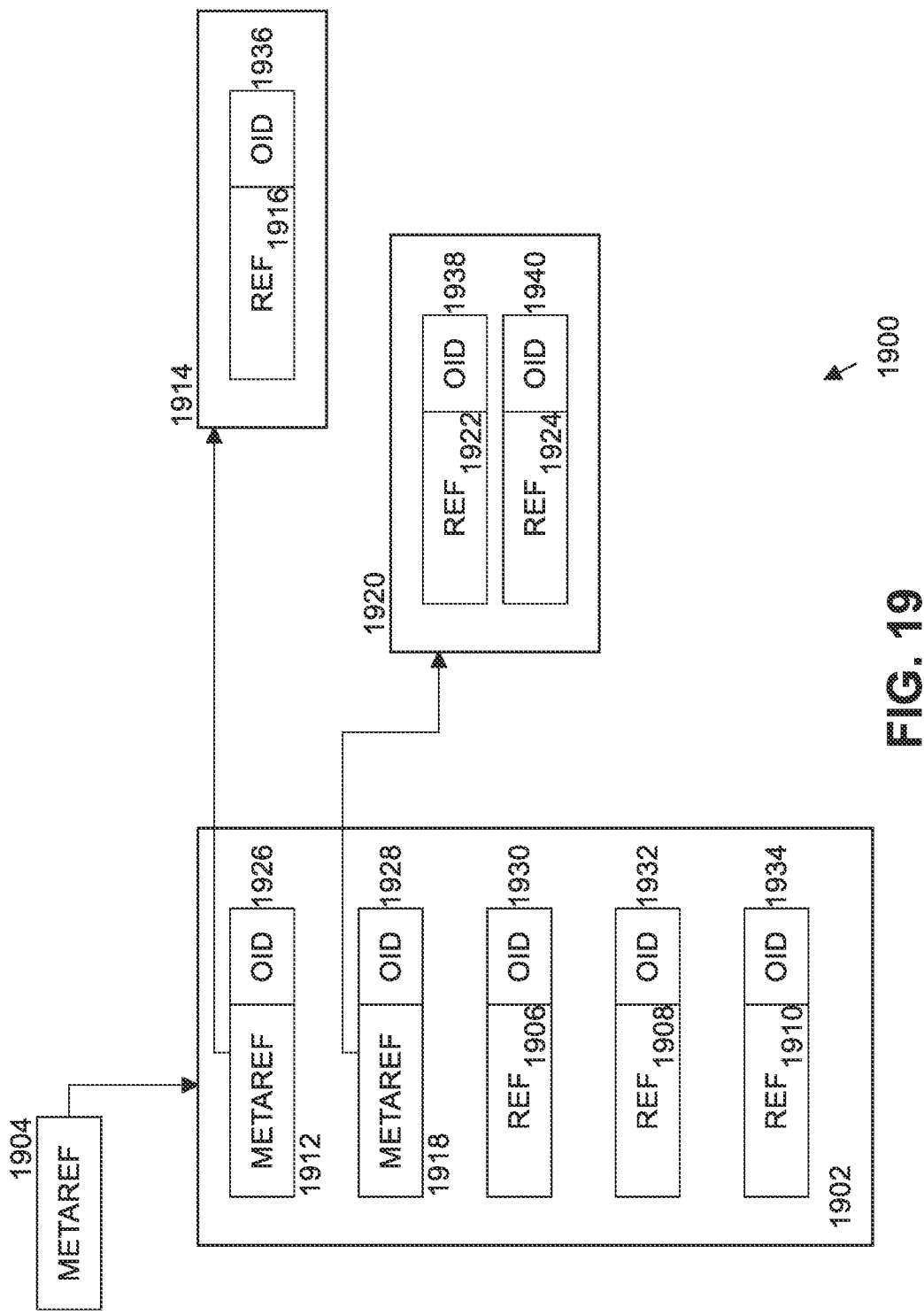
FIG. 19 illustrates an arrangement of a group of pointers according to one implementation.

FIG. 19 illustrates an arrangement 1900 of a group 1902 of pointers according to one implementation. As described herein, there is a provision for tying together a set of related pieces of information (e.g., data stored in memory objects referenced by pointers), temporarily or not, into a group 1902. The data items do not necessarily come from the same data structure, nor are they linearly contiguous. A group 1902 is referred to by a meta reference 1904 (metaref) which is a pointer, reference, etc., to an array of pointers that are being placed in a collective transfer relationship. The terms pointers, addresses, and references are used interchangeably herein. Metaref 1904 serves as a "meta" capability to a memory structure (e.g., the group) that may include within it nested metareferences and ordinary references. For example, group 1902 includes metaref 1912 pointing to pointer data structure 1914, metaref 1918 pointing to pointer data structure 1920, reference(ref) 1906, ref 1908, and ref 1910. Pointer data structure 1914 includes one ref 1916.

Pointer data structure 1920 includes two refs 1922, 1924. A metaref pointing to a group of pointers may also be referred to as a group pointer.

Each reference is associated with a set of optional ownership metadata. Thus, metaref 1912 may include ownership ID (OID) 1926, ref 1916 may include OID 1936, metaref 1918 may include OID 1928, ref 1922 may include OID 1938, ref 1924 may include OID 1940, ref 1906 may include OID 1930, ref 1908 may include OID 1932, and ref 1910 may include OID 1934. The structure of a group may include any number of levels in a hierarchy. In one implementation, an OID may be included in a metaref or ref, as described above.

Automatic checking of capabilities is done by computing hardware 200 at the leaf level of references, while use of the joint transfer structure (e.g., the group 1902) ensures that the entire group of capabilities cannot be borrowed or returned except at the highest level where the references are tied together.

Figure 20:
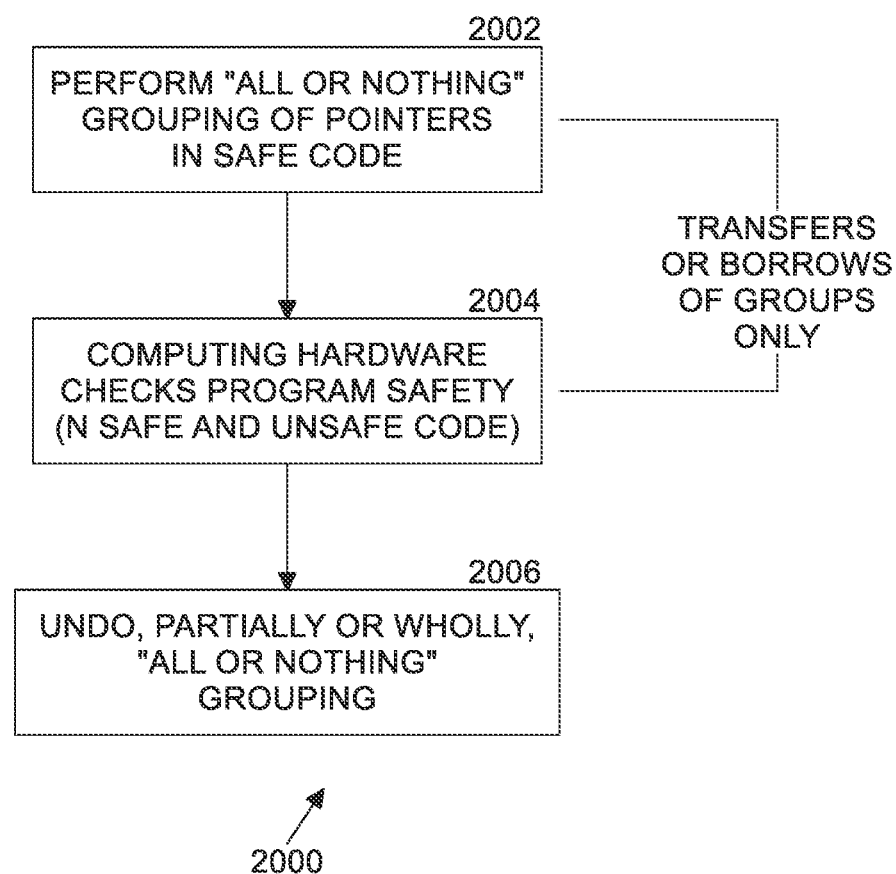
FIG. 20 illustrates phases of joining and dissolving of a group across safe code and unsafe code in one implementation.

FIG. 20 illustrates phases 2000 of joining and dissolving of a group across safe code and unsafe code in one implementation. At phase 2002, computing hardware performs "all or nothing" grouping of pointers in safe code. That is, once pointers are assigned to a group, any individual pointer cannot be borrowed or transferred. At phase 2004, computing hardware 200, such as memory safety check unit 220, checks program safety (in safe and unsafe code). During phases 2002 and 2004, transfers or borrows of pointers that are members of groups are permitted only by the groups, not by individual references. At phase 2006, the "all or nothing" grouping is undone, either partially or wholly.

A programmer writing the safe part of the code may have one or more purposes, three of which are set forth below, as well making debugging easier, making it possible to craft verifiable application program interface (API) crossing guarantees, etc.

One purpose may be to use the borrow-checking reinforced by hardware cryptographic provisions described above for a type of linkage in which the pointers providing the linkage are immutable because of the need to encode immutability of relationships (collections, groups, sets, hierarchies, etc.) between objects—such pointers may be created by a programmer, or by the compiler to keep track of relationships signaled to the compiler by a programmer through declarations, directives, etc. There is a distinction here between ordinary pointers that may be manipulated or mutated to perform various actions like reading and writing contents of what they point to, and pointers that exist to assert that, for example, an object X is part of a collection that also has some other object Y.

Another purpose may be to provide for modularity in program structure so that a programmer Alice, for example, can call a module that is written in another language (that is unsafe from the standpoint of Rust) or is written in CC-Rust but is not written by Alice, and where the called module is inscrutable to Alice. Alice may wish to constrain such a module from altering the transferability or immutability of a member of a collection of objects so that if the entire collection is non-transferable or treated as immutable from Alice's point of view, then the called module is prevented from altering the transferability (borrowability) of any member of it. Once control returns to Alice's program, then Alice may either: (1) no longer need to protect such collective immutability or transferability, or (2) may intend to protect the collection relationships across more such calls to the same or other modules not created by Alice nor scrutable to Alice, or (3) may need to take apart the collection, but only partially. That is, Alice may want to control the degree of freedom available to third-party modules when Alice invokes them, but then wants to allow herself the full freedom to take apart and restructure the collection within Alice's own program.

A further purpose may be to provide an efficient way to transfer ownerships or control mutability of many objects and collections of objects, which are related in purpose, but which are not all part of one monolithic data structure. For example, a programmer may wish to organize groups of objects by some property such as time of creation, but where they may not explicitly create a time-of-creation data structure. The programmer may then need to assert, for example, "I want all objects that were created in time window N to be (or, to not be) transferred together" instead of individually going to each object and making each object (or not making each object) transferrable.

The programmer may use the provisions of the CC-Rust language, along with procedures in a CC-Rust library or runtime, to signal such purpose or intent, and cause a set of auxiliary pointers (e.g., metarefs in FIG. 19) to come into being. Later, the programmer, when he/she changes their purpose or intent, can do the inverse—the point is that all this is in the control of the programmer, and therefore perfectly doable within safe code created by the programmer. However, just as Alice wanted to restrict third-party modules from doing something that would violate Alice's all-or-nothing intent over the collection that Alice created, if programmer Bob, for example, calls a module written by Alice, Bob would not want Alice's use of the technology described herein to interfere with Bob's "higher level" caller logic (that is, Alice's use of this technology is subject to limitations imposed by Bob calling Alice's module).

A new instruction is provided herein for joining a group, so that the ownerships of all joined elements of the group refer to the ownership at the root metaref (such as metaref 1904 of FIG. 19, for example); the computing hardware 202 treats the root metaref as a pointer on which borrow checking is done during phase 2004, and the computing hardware treats the group as immutable between joining and dissolving instructions. The joining and dissolving instructions can only be emitted by safe code.

Five additional instructions are included in ISA 202 of computing hardware 200 supporting borrow checking for pointers in groups: 1) Join, 2) Transfer Group Ownership, 3) Join Groups, 4) Is Joined, and 5) Dissolve.

The Join instruction binds together an open-ended number of pointers, although different implementations of a processor in computing hardware 200 may limit the maximum number of pointers so that the Join instruction can be completed within a deterministic maximum amount of time. A group of pointers bound together by a Join instruction is called a group. The Transfer Group Ownership instruction mirrors the Transfer Ownership instruction described above, except that the transfer applies to a whole group. The Join Groups instruction allows a group of groups to be joined together (e.g., to form a hierarchy of groups). The Is Joined instruction generates a true/false result—given a pointer, the instruction generates a true result if the pointer is part of a joined group, and false otherwise. The Dissolve instruction breaks up a grouping and dissolves the specified group. After a Dissolve instruction is executed, the pointers in the group can have their ownership transfers occur independently or become mutable independently. When a Dissolve instruction is applied to a group of groups, this dissolves their join at the top level but does not dissolve the sub-groups within the top-level group.

In one implementation, the Join instruction accepts three operands: 1) a pointer to a group record, the group record comprising an array and a metadata field. Each element of the array is a pointer that is to be joined into a group. The metadata field in the group record is where metadata, ownership and group bit are to be stored; 2) length of the array; and 3) flags. The third flags may be used to denote various options, such as whether the instruction sets or does not set the group bit in the group record pointer.

In one implementation, the Transfer Group Ownership instruction accepts three operands: 1) the group record pointer; 2) an ownership ID of either 0 or a new ownership ID; if the second operand is 0 (the default) then a random new ownership ID is to be created; 3) a flag used to override a group bit check, where such overriding is only performed from compiler-emitted code for recursive transfer of group ownership.

In one implementation, the Join Groups instruction accepts three operands similar to Join instruction. The first operand specifies the pointer to the group record whose members are group record pointers to be joined, the second operand specifies the length, and the third operand denotes various options, one of which is whether to set the group bit in the group record pointer for the joined group.

In one implementation, the Is Joined instruction accepts one operand, the pointer which is being checked to see if its GROUP bit is set or clear.

In one implementation, the Dissolve instruction accepts three operands: 1) a group record pointer for the group to be dissolved; 2) the number of pointers in the group to be dissolved; and 3) a field containing multiple items, such as a flag to denote whether to randomize the metadata field in the group record data structure after dissolving the group, and a field to denote options for transfer group operations.

Figure 21A:
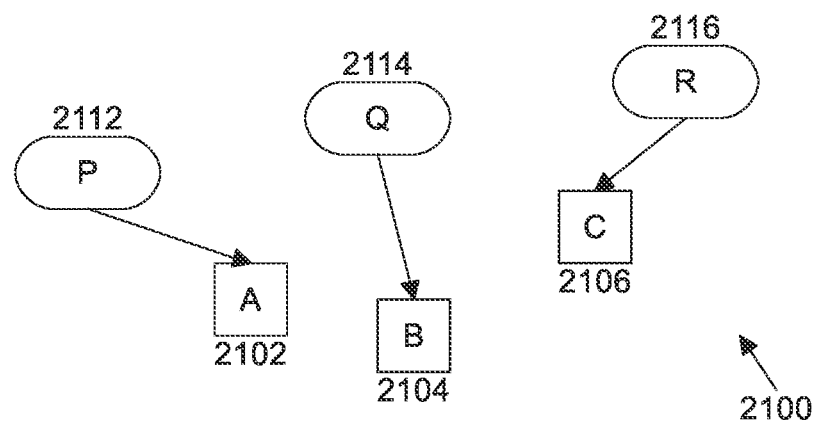
FIGS. 21A and 21B illustrate how multiple pointers are grouped according to a Join instruction in one implementation.
Figure 21B:
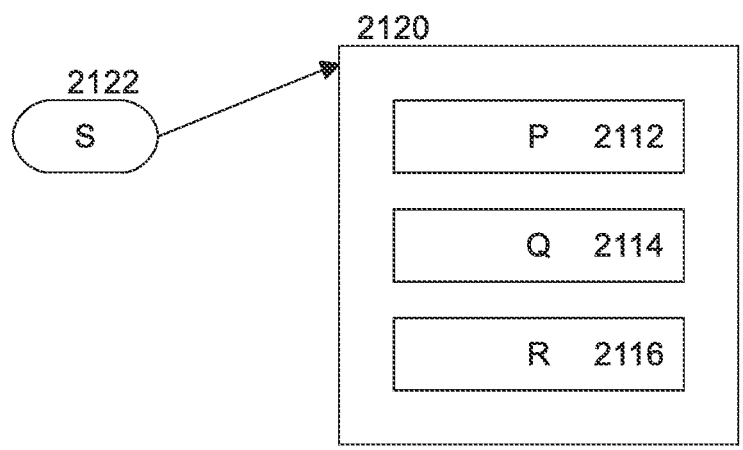

FIGS. 21A and 21B illustrate how multiple pointers are grouped 2100 according to a Join instruction in one implementation. In safe code, multiple pointers (such as P 2112 pointing to object A 2102, Q 2114 pointing to object B 2104, and R 2116 pointing to object C 2106) are placed in a contiguous data structure (e.g., a group record) 2120 and the address of that group record is given to the Join instruction (along with the length (the number of pointers in the group; in the above example, the length is three). Execution of the Join instruction iterates through this data structure (as pointed to by group pointer S 2122), and for each of the pointers, marks that pointer as part of a group.

Figure 22:
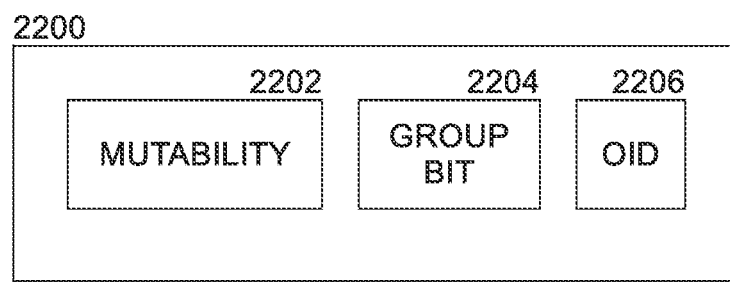
FIG. 22 illustrates a group bit in metadata of a pointer according to one implementation.

FIG. 22 illustrates a group bit 2204 in metadata of a pointer 2200 according to one implementation. A joined pointer has a group bit 2204 set in the metadata for its allocation. Group bit 2204 indicates to computing hardware 200 that the pointer is part of a joined group, so that the Transfer Ownership instruction or the Make Immutable instruction checks for the group bit along with other bits and denies the operation if the pointer is in a joined group (that is, if group bit 2204 is set). Pointer 2200 also includes mutability 2202 and OID 2206 as discussed above.

In addition, the Transfer Group Ownership instruction automatically makes the pointer S 2122 itself immutable so that group pointer S cannot be accidentally changed by program code (whether safe or unsafe). Effectively, group pointer S 2122 becomes a metaref that is created in the safe code for Join/Dissolve operations; and group pointer S can only be used in unsafe code for transfer of group ownerships.

Figure 23:
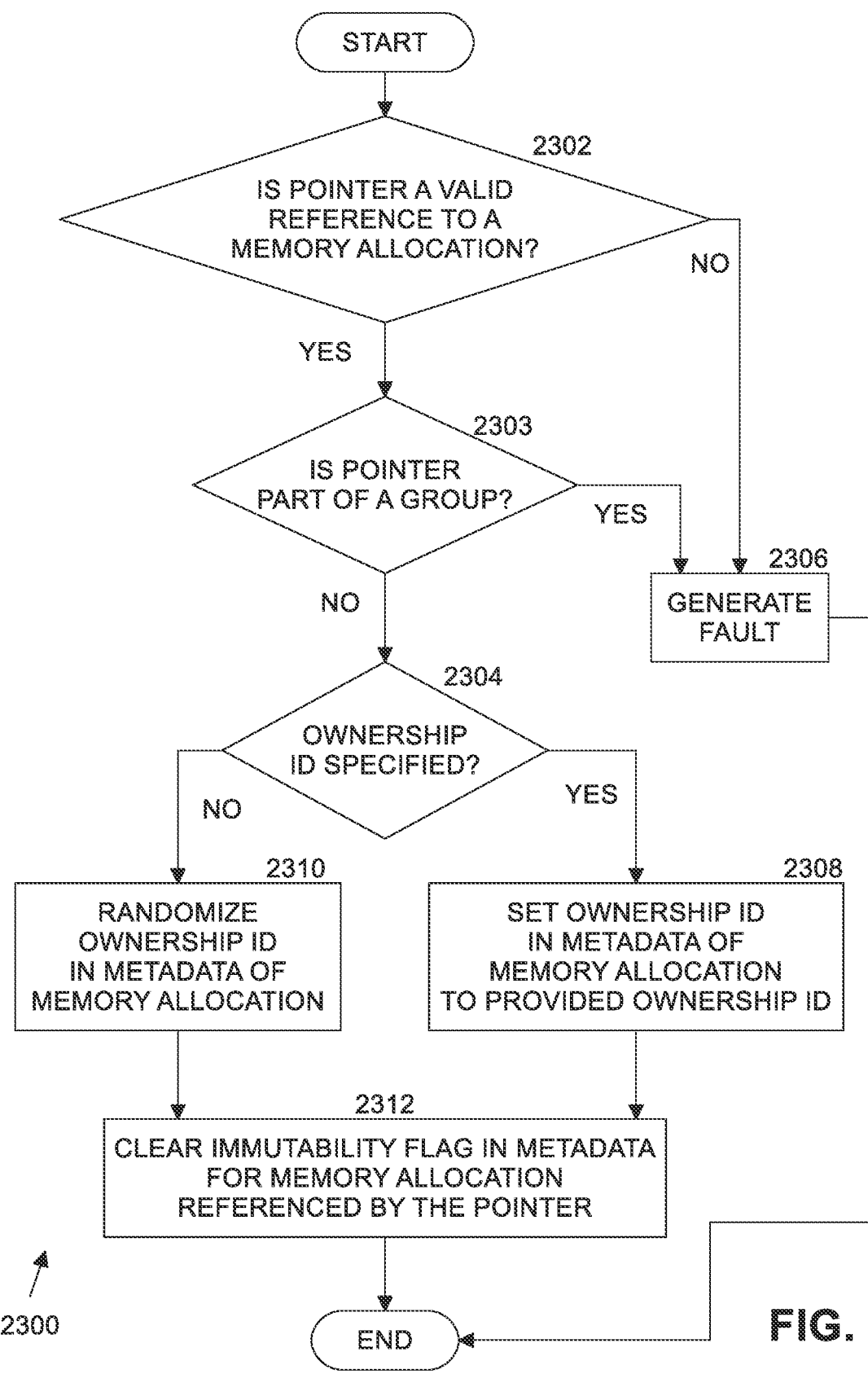
FIG. 23 is a flow diagram illustrating transfer ownership instruction processing according to one implementation.

The Transfer Ownership instruction described above is altered slightly with this extension. FIG. 23 is a flow diagram illustrating Transfer Ownership instruction processing 2300 according to one implementation. At block 2302, if the pointer is not a valid reference to a memory allocation (e.g., tag matches, ownership ID matches, and within bounds), then at block 2306 computing hardware 200 (e.g., memory safety check unit 220) generates a fault. At block 2302, if the pointer is a valid reference to a memory allocation, then at block 2303 computing hardware 200 determines if the pointer is part of a group. In one implementation, the determination is made by checking the group bit 2204 in the pointer. If the pointer is part of a group, this is an error condition because the pointer is not the root of a hierarchy and can neither be transferred as a leaf nor transferred as a subgroup in a hierarchy. Therefore, a fault is generated at block 2306. If the pointer is not part of a group at block 2303, then at block 2304 computing hardware 200 determines if the optional ownership ID is specified (e.g., as an additional operand to the Transfer Group Ownership instruction). If the ownership ID is provided, then at block 2308 computing hardware sets the ownership ID in metadata of the memory allocation to the provided ownership ID. If the ownership ID is not provided, then at block 2310 computing hardware 200 randomizes an ownership ID in the metadata of the memory allocation. In either case, at block 2312, computing hardware 200 clears an immutability flag in the metadata for the memory allocation referenced by the pointer. In one implementation, the checks at block 2302 and 2303 may be performed simultaneously.

Figure 24:
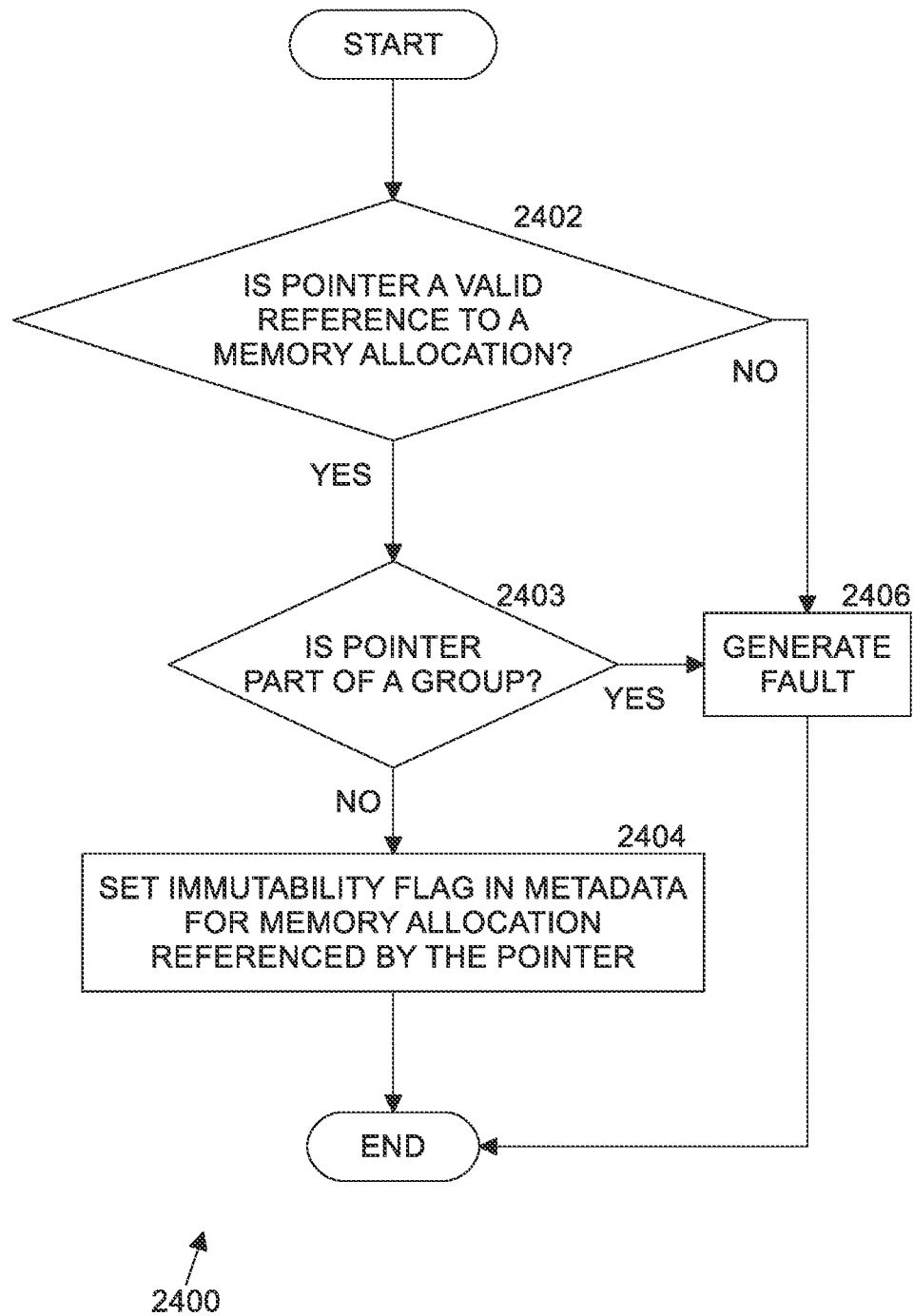
FIG. 24 is a flow diagram illustrating mark immutable instruction processing according to one implementation.

FIG. 24 is a flow diagram illustrating Mark Immutable instruction processing 2400 according to one implementation. At block 2402, if the pointer is not a valid reference to a memory allocation (e.g., tag matches, ownership ID matches, and within bounds), then at block 2406 computing hardware 200 generates a fault. At block 2402, if the pointer is a valid reference to a memory allocation, then at block 2403 computing hardware 200 determines if the pointer is part of a group. In one implementation, the determination is made by checking the group bit 2204 in the pointer. If the pointer is part of a group, this is an error condition because the pointer is not the root of a hierarchy and can neither be marked immutable as a leaf nor transferred as a subgroup in a hierarchy. Therefore, a fault is generated at block 2406. If the point is not part of a group at block 2403, then at block 2404 computing hardware 200 sets an immutability flag in metadata for the memory allocation referenced by the pointer.

Figure 25:
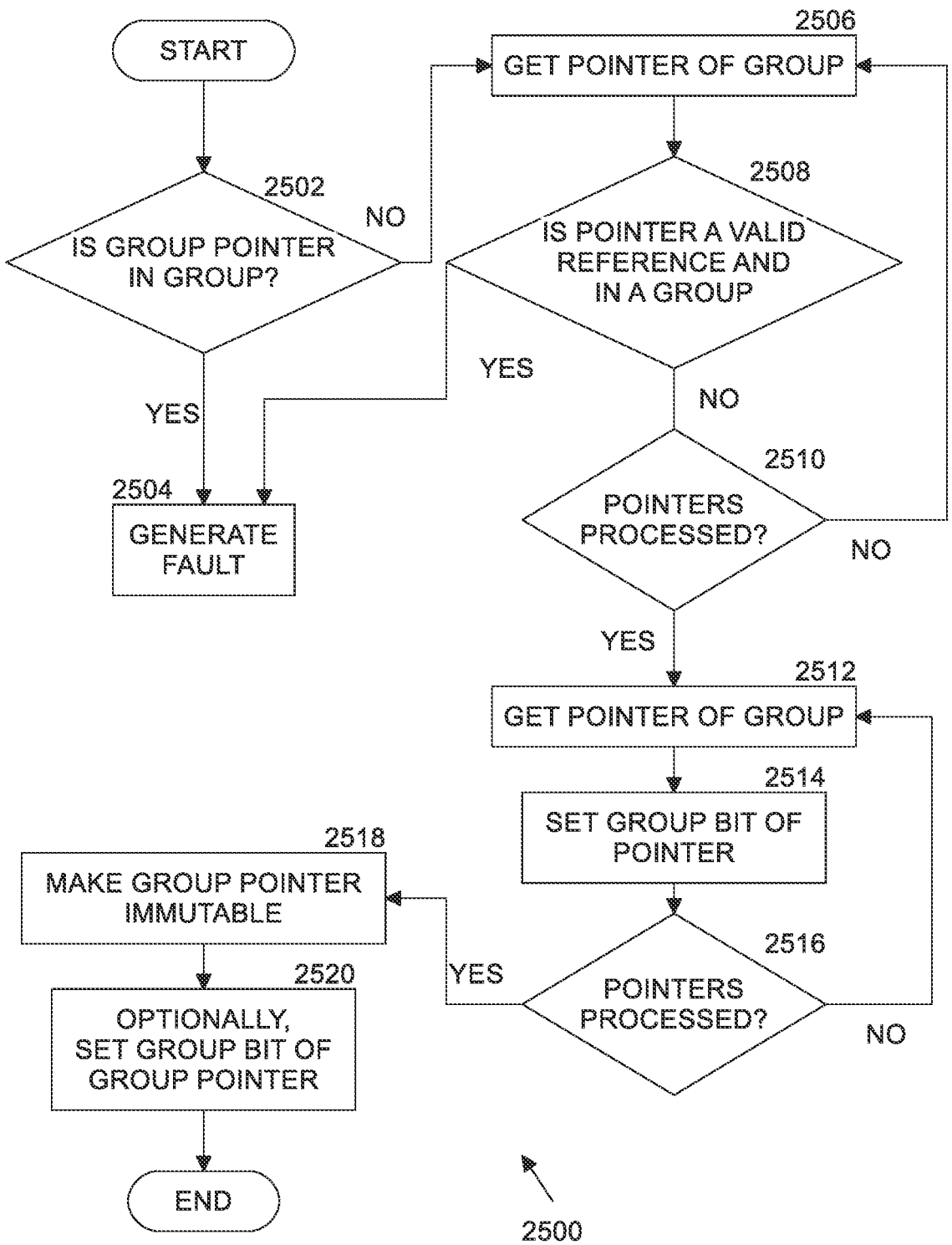
FIG. 25 is a flow diagram illustrating join instruction processing according to one implantation.

FIG. 25 is a flow diagram illustrating Join instruction processing 2500 according to one implementation. The Join instruction takes the structure that contains the individual pointers arranged in an array (e.g., the group record) and the length of the array (e.g., the number of pointers for the group). The Join instruction checks that the record pointer itself (the group pointer) is not joined—that is, someone is not trying to alter a previously joined group, or that a program is not calling Join when it should be calling Join Groups. Having established this, the instruction loops through the individual pointers in the group record in two stages. In the first stage, the instruction checks that each of the pointers being joined in the group is valid and is not joined. Then in the second stage, the instruction loops through and marks the group bits in the metadata for each pointer. Once that is done, the record pointer itself is marked as immutable and its join bit is set to true.

At block 2502, computing hardware 200 (e.g., memory safety check unit 220) determines if the group pointer (passed into the instruction as an operand) is in a group. In one implementation, this is performed by checking the group bit in the group pointer. If the group pointer is in a group, at block 2504 a fault is generated. Otherwise, at block 2506, computing hardware gets the first pointer in the group. At block 2508, if the pointer is a valid reference and the pointer is in a group (it's already a member of a group), then a fault is generated at block 2504. Otherwise, a check is made to determine if all pointers in the group have been processed (since the computing hardware is looping through all pointers in the group). If not, the next pointer in the group is obtained at block 2506. If all pointers have been processed for validity and group membership, at block 2512 computing hardware 200 again gets the first pointer in the group at sets the group bit of the current pointer at block 2514. At block 2516, a check is made to determine if all pointers in the group have been processed (since the computing hardware is looping through all pointers in the group). If not, the next pointer in the group is obtained at block 2512. If all pointers have been processed, then at block 2518 computing hardware makes the group pointer immutable. In one implementation this includes setting mutability 2202 bit in the group pointer. At block 2520, computing hardware optionally sets the group bit for the group pointer (for example, pointer S 2122 of FIG. 21B). Processing of this group pointer is complete and computing hardware continues processing of other instructions.

In one implementation, performance of block 2520 is optional according to the flag operand (e.g., the third operand) in the Join instruction. One rationale for such optionality is to make it possible to treat group record pointers themselves as leaf level pointers when CC-Rust creates some other compiler private data structure in which it may wish to place these group record pointers for compiler's own book-keeping. The default behavior is to set the group bit, but a non-default Flag operand may be used by CC-Rust to create its own data structures where CC-Rust wants more flexibility.

Figure 26:
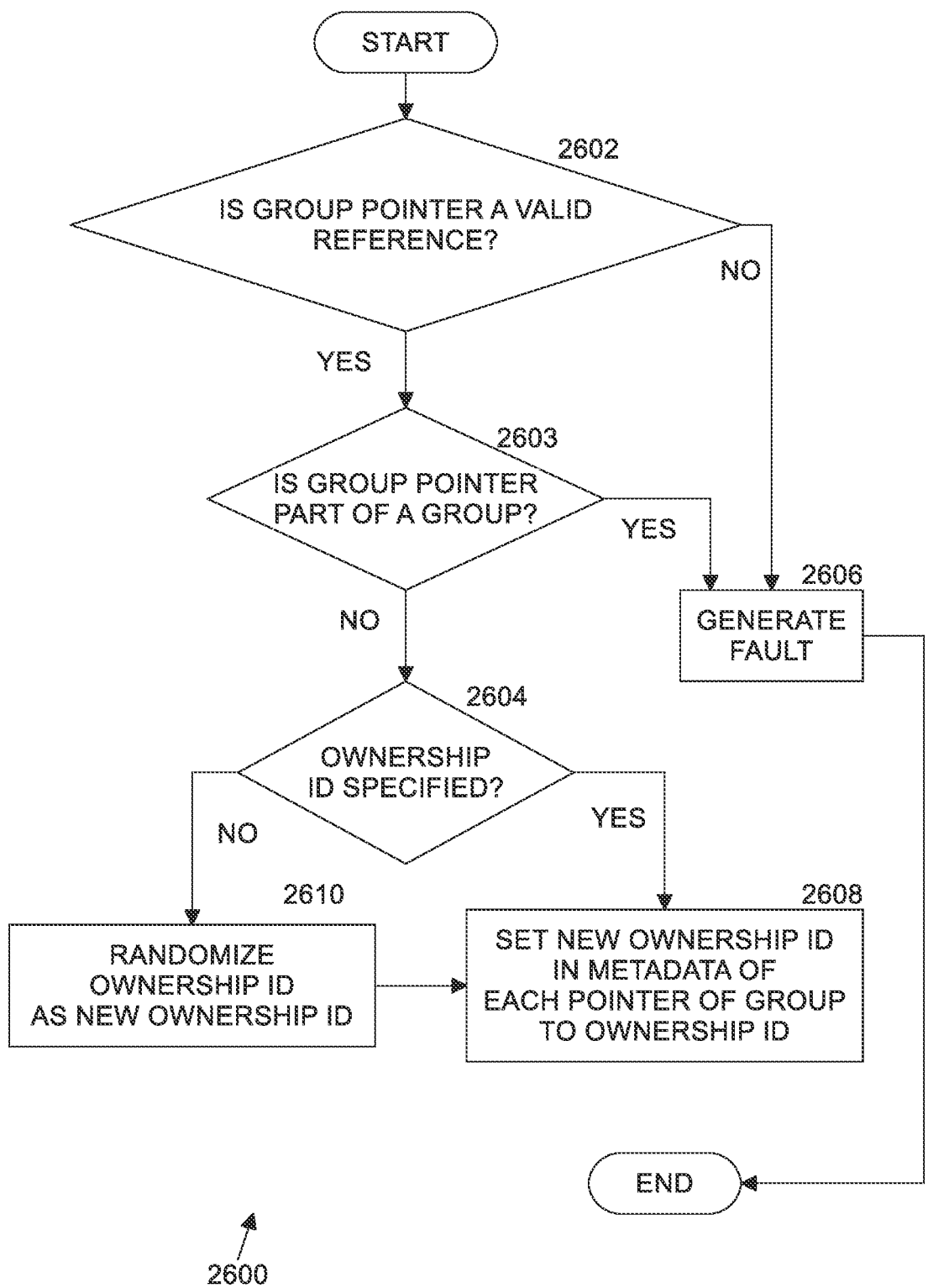
FIG. 26 is a flow diagram of transfer group ownership instruction processing according to one implementation.

FIG. 26 is a flow diagram of Transfer Group Ownership instruction processing 2600 according to one implementation. The Transfer Group Ownership instruction accepts a group pointer to a record that was used previously (as above) to perform a Join operation. The instruction then implements the Transfer Ownership instruction flow described above except that the instruction performs the transfer ownership flow over the entire group of pointers and uses the same new ownership identifier for all pointers of the group.

At block 2602, if the group pointer is not a valid reference to a memory allocation (e.g., tag matches, ownership ID matches, and within bounds), then at block 2606 computing hardware 200 (e.g., memory safety check unit 220), generates a fault. At block 2602, if the group pointer is a valid reference to a memory allocation, then at block 2603 computing hardware 200 determines if the pointer is part of a group. In one implementation, the determination is made by checking the group bit 2204 in the group pointer. When the Flag operand is a default value (that is, 0), then, if the group pointer is part of a group, this is an error condition because the group pointer is not the root of a hierarchy and can neither be transferred as a leaf nor transferred as a subgroup pointer. Therefore, a fault is generated at block 2606. Otherwise, when the Flag operand is a non-default value (that is, 1), then block 2603 is skipped and control proceeds to block 2604. If the group pointer is not part of a group at block 2603 (or if such check is suppressed), then at block 2604 computing hardware 200 determines if the optional ownership ID is specified (e.g., as an additional operand to the Transfer Group Ownership instruction). If the ownership ID is provided, then at block 2608 computing hardware sets the ownership ID in metadata of each pointer of the group to the provided ownership ID. If the ownership ID is not provided, then at block 2610 computing hardware 200 randomizes an ownership ID as the new ownership ID and then performs block 2608. In one implementation, the checks at block 2602 and 2603 may be performed simultaneously when the Flag operand has a default value (that is, 0).

In general, an implementation of a transfer group ownership operation supports recursive descent through hierarchies of groups that have been joined together. While in theory this can be done in either hardware or software logic, interpreting when a pointer is pointing to a group and when the pointer is pointing to a group member, and then recursing through group pointers, is too much of a burden to place upon computing hardware. In practice, transferring ownerships recursively over groups of groups (of groups . . . ) is not something that should happen frequently anyway, therefore it is not necessary to implement this entirely in computing hardware 200. Instead, it is proposed that CC compiler 104, which already knows the types of groups being handled, be responsible for performing the recursion through compiler emitted recursive calls at each level of descent, so that the computing hardware only needs to deal with compact arrays of pointers that comprise a group record (as shown in the example of FIG. 21B). For such recursive descent, the CC compiler may emit a non-default Flag operand so that processing can descend through subgroup pointers during recursion.

The Dissolve processing flow is not illustrated herein as the Dissolve processing flow is very similar to the Join flow except that Dissolve will accept a flag. The flag combines two options. In one option, Dissolve will treat the record being given to the Dissolve instruction as a record with nesting depth of more than one—that is, the Dissolve instruction is dissolving subgroups from the top-level group. In this case, this leaves the individual pointers (which are to subgroups) as joined (group bit=1) while releasing the top-level record in the join so that it can be mutated. Similarly, the Join Groups instruction is similar to the Join processing flow except that the Join Groups instruction verifies that each of the subgroups it is asked to join is itself a pointer with group bit=1 and marked immutable and fails the operation otherwise. Finally, the Is Joint instruction is a test on the group bit of a pointer.

Figure 27:
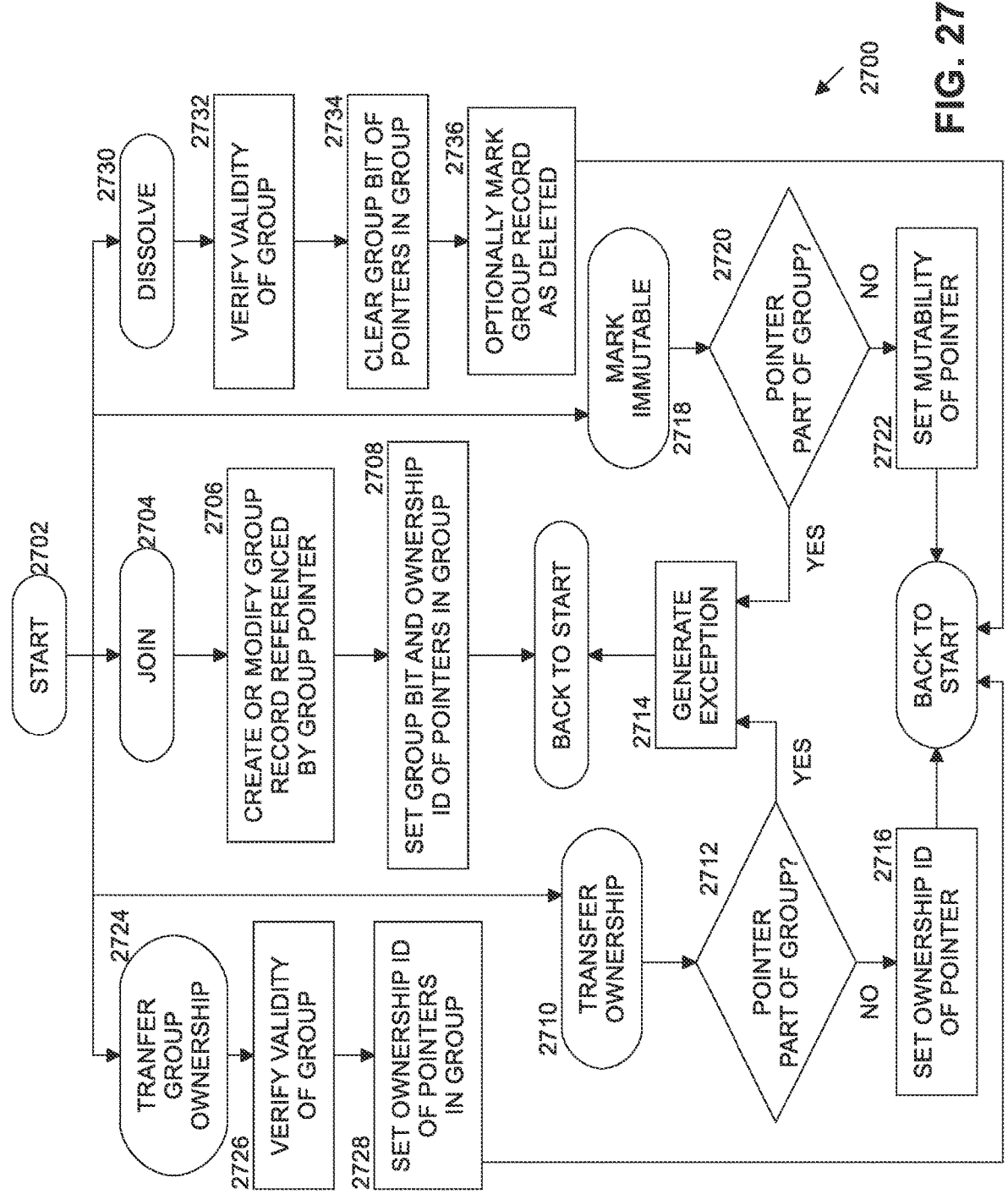
FIG. 27 is a flow diagram of pointer group processing according to one implementation.

FIG. 27 is a flow diagram of pointer group processing 2700 according to one implementation. At start block 2702, memory safety check unit 220 of computing hardware 200 may be directed by ISA 202 to perform instruction processing supporting borrow checking of a group of pointers. When a current instruction to be processed is a Join instruction at block 2704, memory safety check unit 220 creates or modifies a group record (e.g., group record 2120 of FIG. 21B) referenced by a group pointer (e.g., group pointer 2122 of FIG. 21B) at block 2706. At block 2708, memory safety check unit 220 sets the group bit and the ownership ID in the pointers of the group. The group of pointers is now active. Instruction processing goes back to start 2702 to process a next instruction.

When the current instruction to be processed is a Transfer Ownership instruction at block 2724, memory safety check unit 220 determines if the pointer (specified in the Transfer Ownership instruction) is part of a group at block 2712. If the pointer is part of a group, the ownership of the pointer cannot be transferred apart from the group, so an exception is generated at block 2714 and instruction processing goes back to start 2702 to process the next instruction. In an embodiment, determining whether the pointer is part of the group includes checking if the group bit 2204 of the pointer is set. If the pointer is not part of a group, then at block 2716 memory safety check unit 220 sets the ownership ID (OID) 2206 of the pointer. Instruction processing goes back to start 2702 to process a next instruction.

When the current instruction to be processed is a Mark Immutable instruction at block 2718, memory safety check unit 220 determines if the pointer (specified in the Mark Immutable instruction) is part of a group at block 2720. If the pointer is part of a group, the immutability of the pointer cannot be set apart from the group, so an exception is generated at block 2714 and instruction processing goes back to start 2702 to process the next instruction. In an embodiment, determining whether the pointer is part of the group includes checking if the group bit 2204 of the pointer is set. If the pointer is not part of a group, then at block 2722 memory safety check unit 220 sets the mutability 2202 of the pointer. Instruction processing goes back to start 2702 to process a next instruction.

When the current instruction to be processed is a Transfer Group Ownership instruction at block 2724, memory safety check unit 220 verifies the validity of the group at block 2726. If the group is valid, at block 2728, memory safety check unit 220 sets the ownership ID (OID) 2206 bit of pointers in the group. If the group is invalid, an exception is generated and instruction processing goes back to start 2702 to process the next instruction. In this case, block 2728 is not performed.

When the current instruction to be processed is a Dissolve instruction at block 2730, memory safety check unit 220 verifies the validity of the group at block 2732. If the group is valid, at block 2734, memory safety check unit 220 clears the group bit 2204 of pointers in the group. At block 2736, memory safety check unit 220 optionally marks the group record as deleted. Instruction processing goes back to start 2702 to process the next instruction. If the group is invalid, an exception is generated and instruction processing goes back to start 2702 to process the next instruction. In this case, blocks 2734 and 2735 are not performed.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 28:
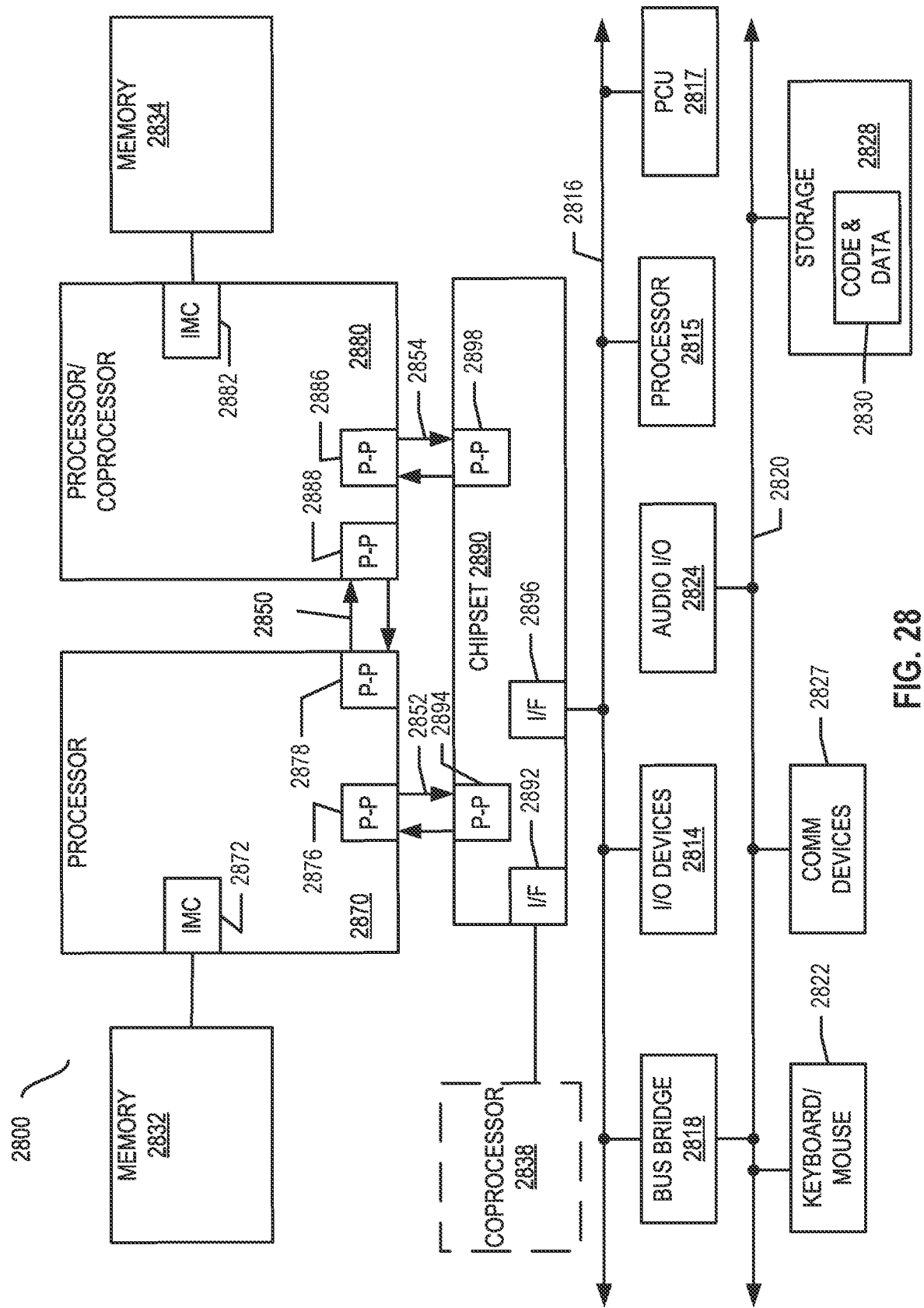
FIG. 28 illustrates an exemplary system.

FIG. 28 illustrates an exemplary system. Multiprocessor system 2800 is a point-to-point interconnect system and includes a plurality of processors including a first processor 2870 and a second processor 2880 coupled via a point-to-point interconnect 2850. In some examples, the first processor 2870 and the second processor 2880 are homogeneous. In some examples, first processor 2870 and the second processor 2880 are heterogenous.

Processors 2870 and 2880 are shown including integrated memory controller (IMC) unit circuitry 2872 and 2882, respectively. Processor 2870 also includes as part of its interconnect controller unit point-to-point (P-P) interfaces 2876 and 2878; similarly, second processor 2880 includes P-P interfaces 2886 and 2888. Processors 2870, 2880 may exchange information via the point-to-point (P-P) interconnect 2850 using P-P interface circuits 2878, 2888. IMCs 2872 and 2882 couple the processors 2870, 2880 to respective memories, namely a memory 2832 and a memory 2834, which may be portions of main memory locally attached to the respective processors.

Processors 2870, 2880 may each exchange information with a chipset 2890 via individual P-P interconnects 2852, 2854 using point to point interface circuits 2876, 2894, 2886, 2898. Chipset 2890 may optionally exchange information with a coprocessor 2838 via a high performance interface 2892. In some examples, the coprocessor 2838 is a special-purpose processor, such as, for example, a high throughput processor, a network or communication processor, compression engine, graphics processor, general purpose graphics processing unit (GPGPU), embedded processor, or the like.

A shared cache (not shown) may be included in either processor 2870, 2880 or outside of both processors, yet connected with the processors via P-P interconnect, such that either or both processors' local cache information may be stored in the shared cache if a processor is placed into a low power mode.

Chipset 2890 may be coupled to a first interconnect 2816 via an interface 2896. In some examples, first interconnect 2816 may be a Peripheral Component Interconnect (PCI) interconnect, or an interconnect such as a PCI Express interconnect or another I/O interconnect. In some examples, one of the interconnects couples to a power control unit (PCU) 2817, which may include circuitry, software, and/or firmware to perform power management operations with regard to the processors 2870, 2880 and/or co-processor 2838. PCU 2817 provides control information to a voltage regulator (not shown) to cause the voltage regulator to generate the appropriate regulated voltage. PCU 2817 also provides control information to control the operating voltage generated. In various examples, PCU 2817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2817 is illustrated as being present as logic separate from the processor 2870 and/or processor 2880. In other cases, PCU 2817 may execute on a given one or more of cores (not shown) of processor 2870 or 2880. In some cases, PCU 2817 may be implemented as a microcontroller (dedicated or general-purpose) or other control logic configured to execute its own dedicated power management code, sometimes referred to as P-code. In yet other examples, power management operations to be performed by PCU 2817 may be implemented externally to a processor, such as by way of a separate power management integrated circuit (PMIC) or another component external to the processor. In yet other examples, power management operations to be performed by PCU 2817 may be implemented within BIOS or other system software.

Various I/O devices 2814 may be coupled to first interconnect 2816, along with a bus bridge 2818 which couples first interconnect 2816 to a second interconnect 2820. In some examples, one or more additional processor(s) 2815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interconnect 2816. In some examples, second interconnect 2820 may be a low pin count (LPC) interconnect. Various devices may be coupled to second interconnect 2820 including, for example, a keyboard and/or mouse 2822, communication devices 2827 and a storage circuitry 2828. Storage circuitry 2828 may be a disk drive or other mass storage device which may include instructions/ code and data 2830, in some examples. Further, an audio I/O 2824 may be coupled to second interconnect 2820. Note that other architectures than the point-to-point architecture described above are possible. For example, instead of the point-to-point architecture, a system such as multiprocessor system 2800 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 29:
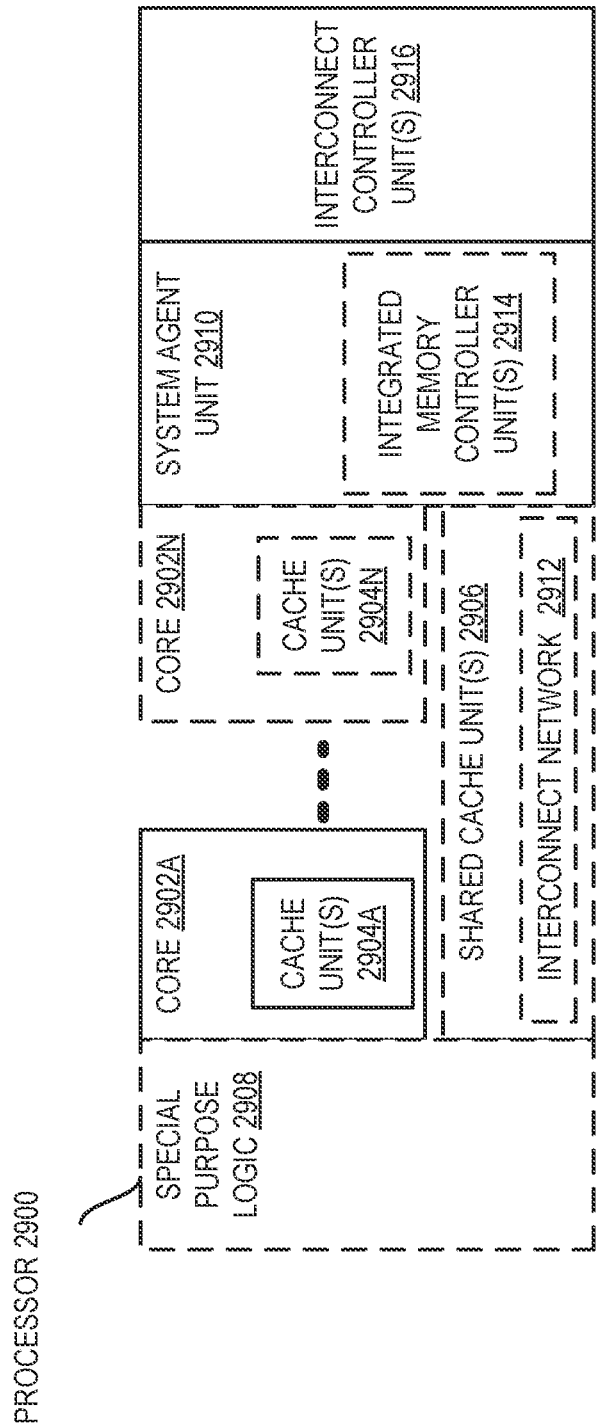
FIG. 29 illustrates a block diagram of an example processor that may have more than one core and an integrated memory controller.

FIG. 29 illustrates a block diagram of an example processor 2900 that may have more than one core and an integrated memory controller. The solid lined boxes illustrate a processor 2900 with a single core 2902A, a system agent 2910, a set of one or more interconnect controller unit(s) circuitry 2916, while the optional addition of the dashed lined boxes illustrates an alternative processor 2900 with multiple cores 2902(A)-(N), a set of one or more integrated memory controller unit(s) circuitry 2914 in the system agent unit circuitry 2910, and special purpose logic 2908, as well as a set of one or more interconnect controller units circuitry 2916. Note that the processor 2900 may be one of the processors 2870 or 2880, or co-processor 2838 or 2815 of FIG. 28.

Thus, different implementations of the processor 2900 may include: 1) a CPU with the special purpose logic 2908 being integrated graphics and/or scientific (throughput) logic (which may include one or more cores, not shown), and the cores 2902(A)-(N) being one or more general purpose cores (e.g., general purpose in-order cores, general purpose out-of-order cores, or a combination of the two); 2) a coprocessor with the cores 2902(A)-(N) being a large number of special purpose cores intended primarily for graphics and/or scientific (throughput); and 3) a coprocessor with the cores 2902(A)-(N) being a large number of general purpose in-order cores. Thus, the processor 2900 may be a general-purpose processor, coprocessor or special-purpose processor, such as, for example, a network or communication processor, compression engine, graphics processor, GPGPU (general purpose graphics processing unit circuitry), a high throughput many integrated core (MIC) coprocessor (including 30 or more cores), embedded processor, or the like. The processor may be implemented on one or more chips. The processor 2900 may be a part of and/or may be implemented on one or more substrates using any of a number of process technologies, such as, for example, bipolar complementary metal oxide semiconductor (CMOS) (BiCMOS), CMOS, or N-type metal oxide semiconductor (NMOS).

A memory hierarchy includes one or more levels of cache unit(s) circuitry 2904(A)-(N) within the cores 2902(A)-(N), a set of one or more shared cache unit(s) circuitry 2906, and external memory (not shown) coupled to the set of integrated memory controller unit(s) circuitry 2914. The set of one or more shared cache unit(s) circuitry 2906 may include one or more mid-level caches, such as level 2 (L2), level 3 (L3), level 4 (L4), or other levels of cache, such as a last level cache (LLC), and/or combinations thereof. While in some examples ring-based interconnect network circuitry 2912 interconnects the special purpose logic 2908 (e.g., integrated graphics logic), the set of shared cache unit(s) circuitry 2906, and the system agent unit circuitry 2910, alternative examples use any number of well-known techniques for interconnecting such units. In some examples, coherency is maintained between one or more of the shared cache unit(s) circuitry 2906 and cores 2902(A)-(N).

In some examples, one or more of the cores 2902(A)-(N) are capable of multi-threading. The system agent unit circuitry 2910 includes those components coordinating and operating cores 2902(A)-(N). The system agent unit circuitry 2910 may include, for example, power control unit (PCU) circuitry and/or display unit circuitry (not shown). The PCU may be or may include logic and components needed for regulating the power state of the cores 2902(A)-(N) and/or the special purpose logic 2908 (e.g., integrated graphics logic). The display unit circuitry is for driving one or more externally connected displays.

The cores 2902(A)-(N) may be homogenous or heterogeneous in terms of architecture instruction set architecture (ISA); that is, two or more of the cores 2902(A)-(N) may be capable of executing the same ISA, while other cores may be capable of executing only a subset of that ISA or a ISA.

Exemplary Core Architectures—In-Order and Out-of-Order Core Block Diagram.

Figure 30A:
FIG. 30(A) is a block diagram illustrating both an exemplary in-order pipeline and an exemplary register renaming, out-of-order issue/execution pipeline according to examples.
Figure 30B:
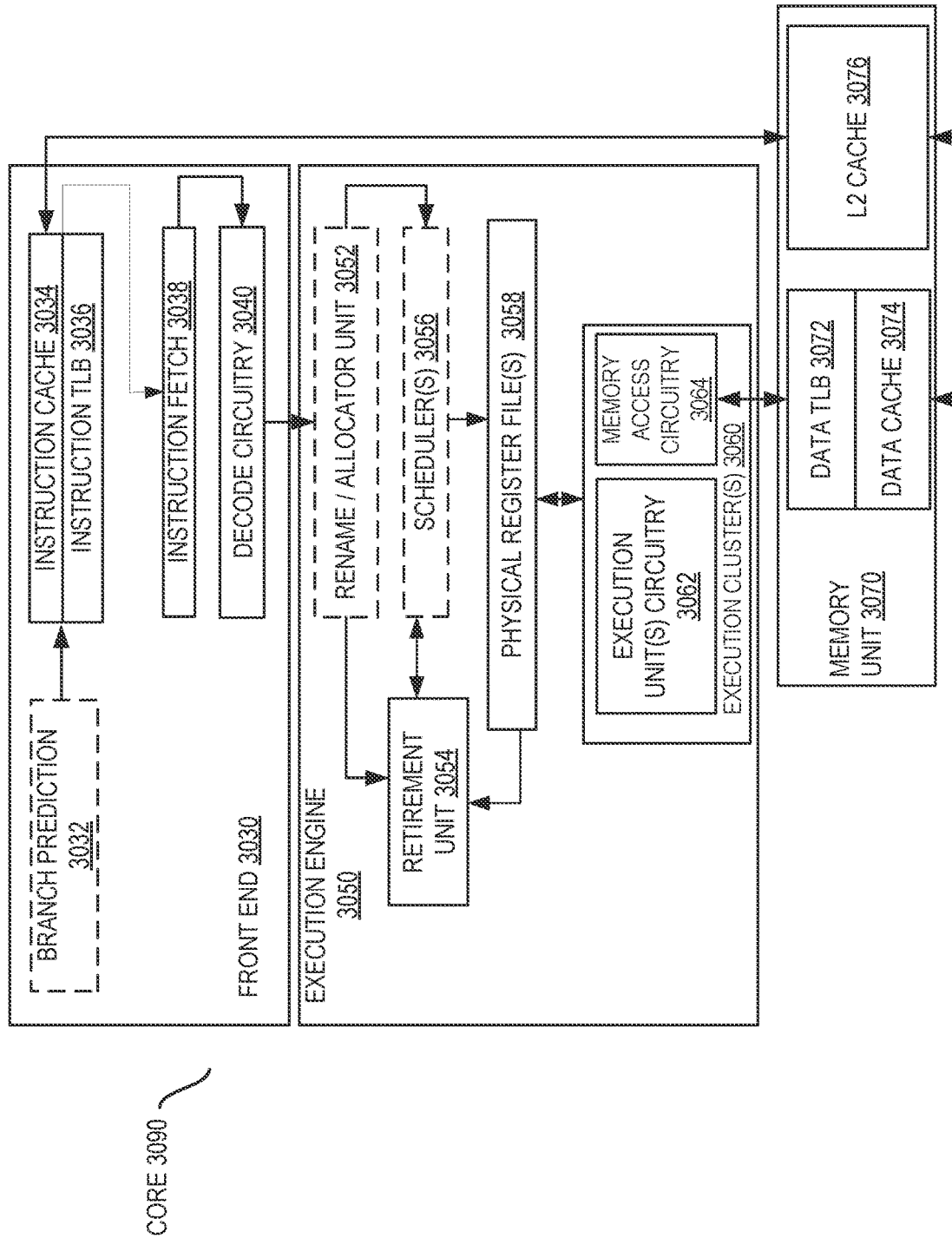
FIG. 30(B) is a block diagram illustrating both an exemplary example of an in-order architecture core and an exemplary register renaming, out-of-order issue/execution architecture core to be included in a processor according to examples.

FIG. 30(A) is a block diagram illustrating both an exemplary in-order pipeline and an exemplary register renaming, out-of-order issue/execution pipeline according to examples. FIG. 30(B) is a block diagram illustrating both an exemplary example of an in-order architecture core and an exemplary register renaming, out-of-order issue/execution architecture core to be included in a processor according to examples. The solid lined boxes in FIGS. 30(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 30(A), a processor pipeline 3000 includes a fetch stage 3002, an optional length decoding stage 3004, a decode stage 3006, an optional allocation (Alloc) stage 3008, an optional renaming stage 3010, a schedule (also known as a dispatch or issue) stage 3012, an optional register read/memory read stage 3014, an execute stage 3016, a write back/memory write stage 3018, an optional exception handling stage 3022, and an optional commit stage 3024. One or more operations can be performed in each of these processor pipeline stages. For example, during the fetch stage 3002, one or more instructions are fetched from instruction memory, during the decode stage 3006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 3006 and the register read/memory read stage 3014 may be combined into one pipeline stage. In one example, during the execute stage 3016, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution core architecture may implement the pipeline 3000 as follows: 1) the instruction fetch 3038 performs the fetch and length decoding stages 3002 and 3004; 2) the decode circuitry 3040 performs the decode stage 3006; 3) the rename/allocator unit circuitry 3052 performs the allocation stage 3008 and renaming stage 3010; 4) the scheduler(s) circuitry 3056 performs the schedule stage 3012; 5) the physical register file(s) circuitry 3058 and the memory unit circuitry 3070 perform the register read/memory read stage 3014; the execution cluster(s) 3060 perform the execute stage 3016; 6) the memory unit circuitry 3070 and the physical register file(s) circuitry 3058 perform the write back/memory write stage 3018; 7) various circuitry may be involved in the exception handling stage 3022; and 8) the retirement unit circuitry 3054 and the physical register file(s) circuitry 3058 perform the commit stage 3024.

FIG. 30(B) shows processor core 3090 including front-end unit circuitry 3030 coupled to an execution engine unit circuitry 3050, and both are coupled to a memory unit circuitry 3070. The core 3090 may be a reduced instruction set architecture computing (RISC) core, a complex instruction set architecture computing (CISC) core, a very long instruction word (VLIW) core, or a hybrid or alternative core type. As yet another option, the core 3090 may be a special-purpose core, such as, for example, a network or communication core, compression engine, coprocessor core, general purpose computing graphics processing unit (GPGPU) core, graphics core, or the like.

The front end unit circuitry 3030 may include branch prediction circuitry 3032 coupled to an instruction cache circuitry 3034, which is coupled to an instruction translation lookaside buffer (TLB) 3036, which is coupled to instruction fetch circuitry 3038, which is coupled to decode circuitry 3040. In one example, the instruction cache circuitry 3034 is included in the memory unit circuitry 3070 rather than the front-end circuitry 3030. The decode circuitry 3040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 3040 may further include an address generation unit circuitry (AGU, not shown). In one example, the AGU generates an LSU address using forwarded register ports, and may further perform branch forwarding (e.g., immediate offset branch forwarding, LR register branch forwarding, etc.). The decode circuitry 3040 may be implemented using various different mechanisms. Examples of suitable mechanisms include, but are not limited to, look-up tables, hardware implementations, programmable logic arrays (PLAs), microcode read only memories (ROMs), etc. In one example, the core 3090 includes a microcode ROM (not shown) or other medium that stores microcode for certain macroinstructions (e.g., in decode circuitry 3040 or otherwise within the front end circuitry 3030). In one example, the decode circuitry 3040 includes a micro-operation (micro-op) or operation cache (not shown) to hold/cache decoded operations, micro-tags, or micro-operations generated during the decode or other stages of the processor pipeline 3000. The decode circuitry 3040 may be coupled to rename/allocator unit circuitry 3052 in the execution engine circuitry 3050.

The execution engine circuitry 3050 includes the rename/allocator unit circuitry 3052 coupled to a retirement unit circuitry 3054 and a set of one or more scheduler(s) circuitry 3056. The scheduler(s) circuitry 3056 represents any number of different schedulers, including reservations stations, central instruction window, etc. In some examples, the scheduler(s) circuitry 3056 can include arithmetic logic unit (ALU) scheduler/scheduling circuitry, ALU queues, arithmetic generation unit (AGU) scheduler/scheduling circuitry, AGU queues, etc. The scheduler(s) circuitry 3056 is coupled to the physical register file(s) circuitry 3058. Each of the physical register file(s) circuitry 3058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 3058 includes vector registers unit circuitry, writemask registers unit circuitry, and scalar register unit circuitry. These register units may provide architectural vector registers, vector mask registers, general-purpose registers, etc. The physical register file(s) circuitry 3058 is overlapped by the retirement unit circuitry 3054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 3054 and the physical register file(s) circuitry 3058 are coupled to the execution cluster(s) 3060. The execution cluster(s) 3060 includes a set of one or more execution unit(s) circuitry 3062 and a set of one or more memory access circuitry 3064. The execution unit(s) circuitry 3062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 3056, physical register file(s) circuitry 3058, and execution cluster(s) 3060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 3064). It should also be understood that where separate pipelines are used, one or more of these pipelines may be out-of-order issue/execution and the rest in-order.

In some examples, the execution engine unit circuitry 3050 may perform load store unit (LSU) address/data pipelining to an Advanced Microcontroller Bus (AMB) interface (not shown), and address phase and writeback, data phase load, store, and branches.

The set of memory access circuitry 3064 is coupled to the memory unit circuitry 3070, which includes data TLB circuitry 3072 coupled to a data cache circuitry 3074 coupled to a level 2 (L2) cache circuitry 3076. In one exemplary example, the memory access circuitry 3064 may include a load unit circuitry, a store address unit circuit, and a store data unit circuitry, each of which is coupled to the data TLB circuitry 3072 in the memory unit circuitry 3070. The instruction cache circuitry 3034 is further coupled to a level 2 (L2) cache circuitry 3076 in the memory unit circuitry 3070. In one example, the instruction cache 3034 and the data cache 3074 are combined into a single instruction and data cache (not shown) in L2 cache circuitry 3076, a level 3 (L3) cache circuitry (not shown), and/or main memory. The L2 cache circuitry 3076 is coupled to one or more other levels of cache and eventually to a main memory.

The core 3090 may support one or more instructions sets (e.g., the x86 instruction set architecture (with some extensions that have been added with newer versions); the MIPS instruction set architecture; the ARM instruction set architecture (with optional additional extensions such as NEON)), including the instruction(s) described herein. In one example, the core 3090 includes logic to support a packed data instruction set architecture extension (e.g., AVX1, AVX2), thereby allowing the operations used by many multimedia applications to be performed using packed data.

Exemplary Execution Unit(s) Circuitry.

Figure 31:
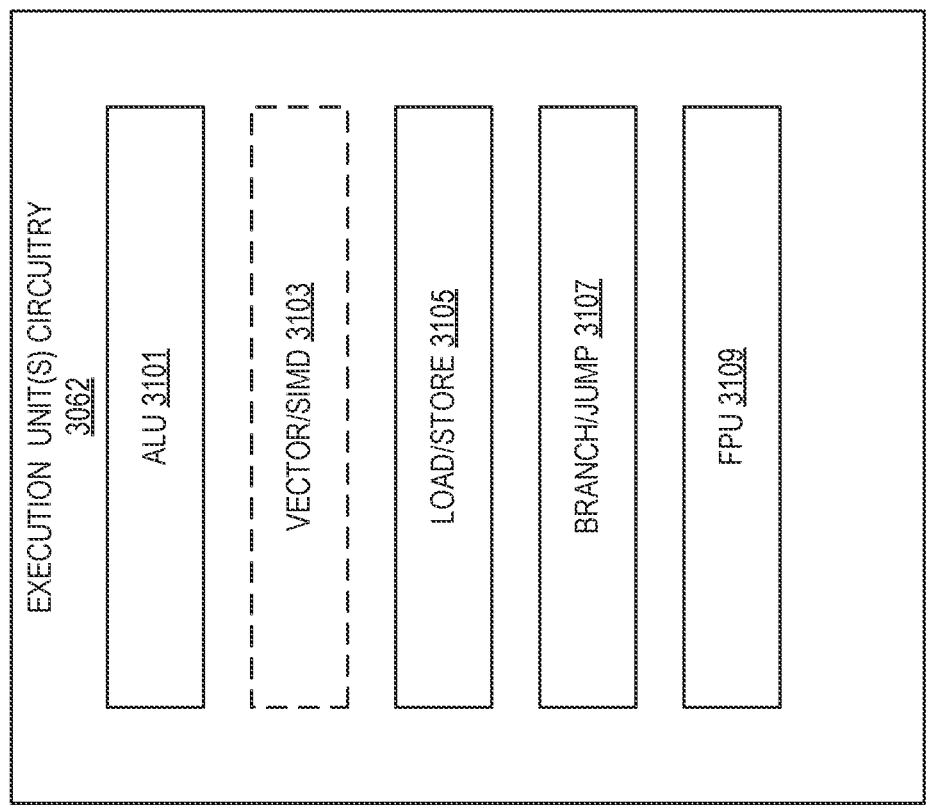
FIG. 31 illustrates examples of execution unit(s) circuitry, such as the execution unit(s) circuitry of FIG. 30(B).

FIG. 31 illustrates examples of execution unit(s) circuitry, such as execution unit(s) circuitry 3062 of FIG. 30(B). As illustrated, execution unit(s) circuity 3062 may include one or more ALU circuits 3101, vector/single instruction multiple data (SIMD) circuits 3103, load/store circuits 3105, and/or branch/jump circuits 3107. ALU circuits 3101 perform integer arithmetic and/or Boolean operations. Vector/SIMD circuits 3103 perform vector/SIMD operations on packed data (such as SIMD/vector registers). Load/store circuits 3105 execute load and store instructions to load data from memory into registers or store from registers to memory. Load/store circuits 3105 may also generate addresses. Branch/jump circuits 3107 cause a branch or jump to a memory address depending on the instruction. Floating-point unit (FPU) circuits 3109 perform floating-point arithmetic. The width of the execution unit(s) circuitry 3062 varies depending upon the example and can range from 16-bit to 1,024-bit. In some examples, two or more smaller execution units are logically combined to form a larger execution unit (e.g., two 128-bit execution units are logically combined to form a 256-bit execution unit).

Exemplary Register Architecture

Figure 32:
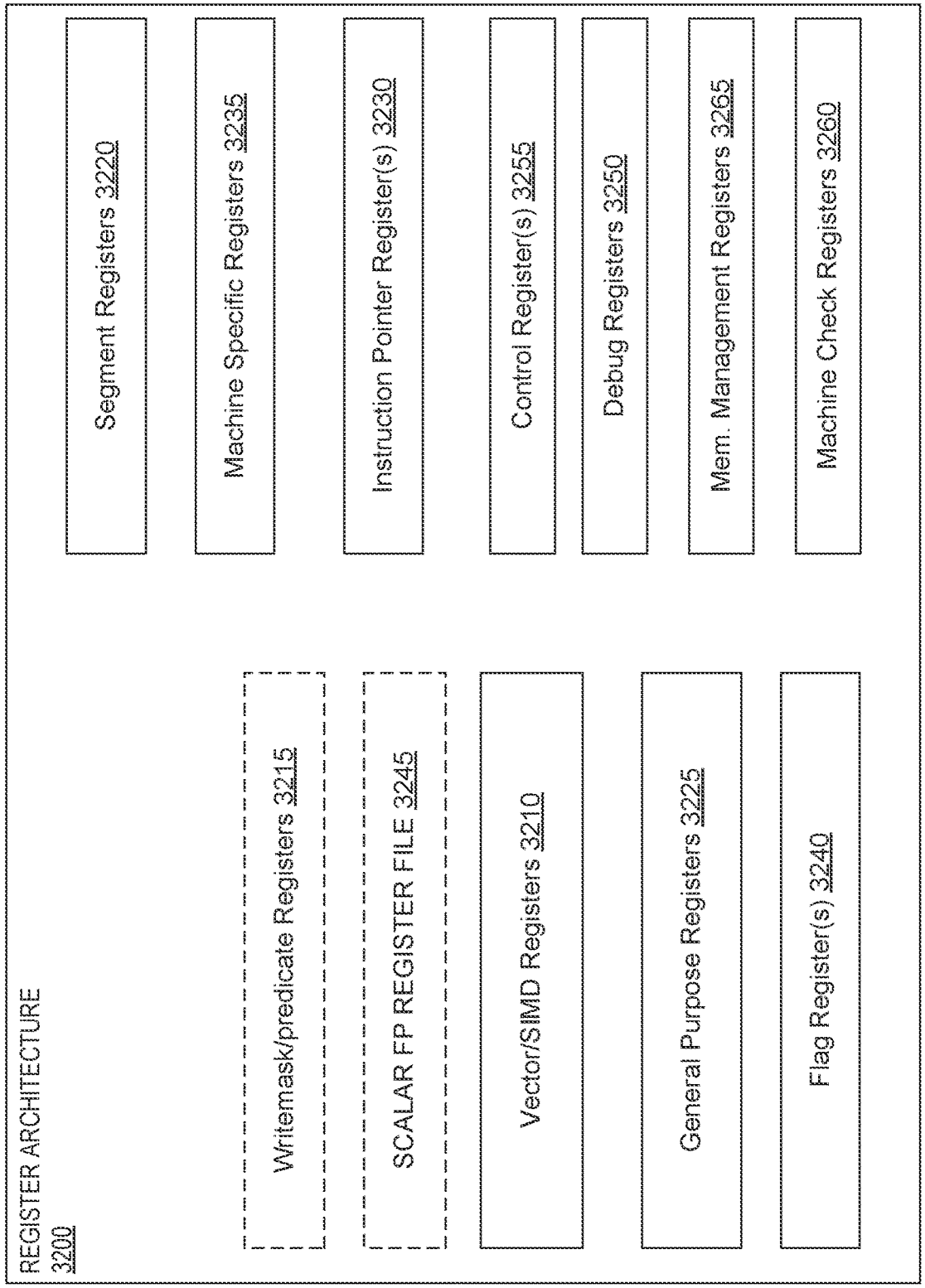
FIG. 32 is a block diagram of a register architecture according to some examples.

FIG. 32 is a block diagram of a register architecture 3200 according to some examples. As illustrated, there are vector/SIMD registers 3210 that vary from 128-bit to 1,024 bits width. In some examples, the vector/SIMD registers 3210 are physically 512-bits and, depending upon the mapping, only some of the lower bits are used. For example, in some examples, the vector/SIMD registers 3210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 3200 includes writemask/predicate registers 3215. For example, in some examples, there are 8 writemask/predicate registers (sometimes called k0 through k7) that are each 16-bit, 32-bit, 64-bit, or 128-bit in size. Writemask/predicate registers 3215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 3215 corresponds to a data element position of the destination. In other examples, the writemask/predicate registers 3215 are scalable and consists of a set number of enable bits for a given vector element (e.g., 8 enable bits per 64-bit vector element).

The register architecture 3200 includes a plurality of general-purpose registers 3225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 3200 includes scalar floating-point (FP) register 3245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 3240 (e.g., EFLAGS, RFLAGS, etc.) store status and control information for arithmetic, compare, and system operations. For example, the one or more flag registers 3240 may store condition code information such as carry, parity, auxiliary carry, zero, sign, and overflow. In some examples, the one or more flag registers 3240 are called program status and control registers.

Segment registers 3220 contain segment points for use in accessing memory. In some examples, these registers are referenced by the names CS, DS, SS, ES, FS, and GS.

Machine specific registers (MSRs) 3235 control and report on processor performance. Most MSRs 3235 handle system-related functions and are not accessible to an application program. Machine check registers 3260 consist of control, status, and error reporting MSRs that are used to detect and report on hardware errors.

One or more instruction pointer register(s) 3230 store an instruction pointer value. Control register(s) 3255 (e.g., CR0-CR4) determine the operating mode of a processor (e.g., processor 2870, 2880, 2838, 2815, and/or 2900) and the characteristics of a currently executing task. Debug registers 3250 control and allow for the monitoring of a processor or core's debugging operations.

Memory (mem) management registers 3265 specify the locations of data structures used in protected mode memory management. These registers may include a GDTR, IDRT, task register, and a LDTR register.

Alternative examples may use wider or narrower registers. Additionally, alternative examples may use more, less, or different register files and registers.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 33:
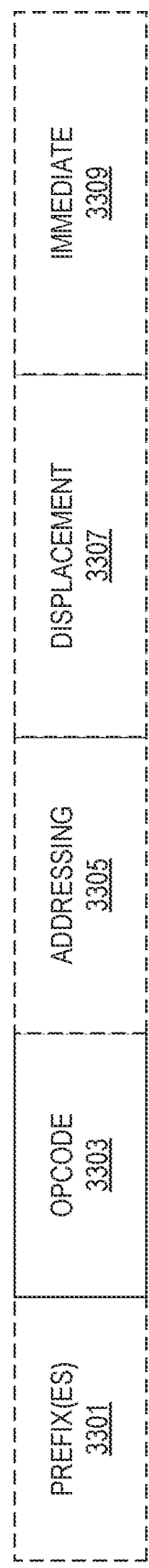
FIG. 33 illustrates examples of an instruction format.

FIG. 33 illustrates examples of an instruction format. As illustrated, an instruction may include multiple components including, but not limited to, one or more fields for: one or more prefixes 3301, an opcode 3303, addressing information 3305 (e.g., register identifiers, memory addressing information, etc.), a displacement value 3307, and/or an immediate value 3309. Note that some instructions utilize some or all of the fields of the format whereas others may only use the field for the opcode 3303. In some examples, the order illustrated is the order in which these fields are to be encoded, however, it should be appreciated that in other examples these fields may be encoded in a different order, combined, etc.

The prefix(es) field(s) 3301, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 3303 is used to at least partially define the operation to be performed upon a decoding of the instruction. In some examples, a primary opcode encoded in the opcode field 3303 is one, two, or three bytes in length. In other examples, a primary opcode can be a different length. An additional 3-bit opcode field is sometimes encoded in another field.

Figure 34:
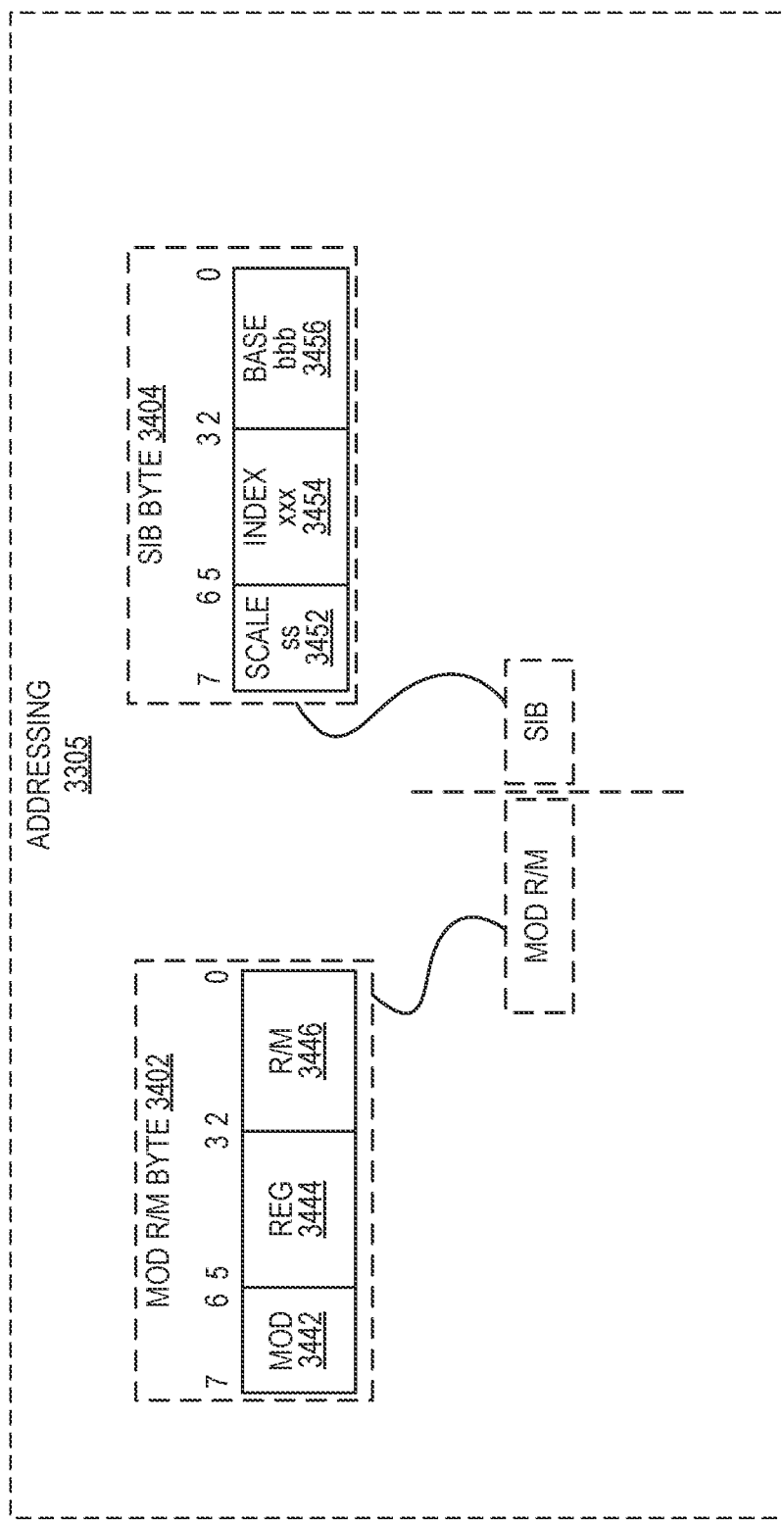
FIG. 34 illustrates examples of an addressing field.

The addressing field 3305 is used to address one or more operands of the instruction, such as a location in memory or one or more registers. FIG. 34 illustrates examples of the addressing field 3305. In this illustration, an optional ModR/M byte 3402 and an optional Scale, Index, Base (SIB) byte 3404 are shown. The ModR/M byte 3402 and the SIB byte 3404 are used to encode up to two operands of an instruction, each of which is a direct register or effective memory address. Note that each of these fields are optional in that not all instructions include one or more of these fields. The MOD R/M byte 3402 includes a MOD field 3442, a register (reg) field 3444, and R/M field 3446.

The content of the MOD field 3442 distinguishes between memory access and non-memory access modes. In some examples, when the MOD field 3442 has a value of b11, a register-direct addressing mode is utilized, and otherwise register-indirect addressing is used.

The register field 3444 may encode either the destination register operand or a source register operand or may encode an opcode extension and not be used to encode any instruction operand. The content of register index field 3444, directly or through address generation, specifies the locations of a source or destination operand (either in a register or in memory). In some examples, the register field 3444 is supplemented with an additional bit from a prefix (e.g., prefix 3301) to allow for greater addressing.

The R/M field 3446 may be used to encode an instruction operand that references a memory address or may be used to encode either the destination register operand or a source register operand. Note the R/M field 3446 may be combined with the MOD field 3442 to dictate an addressing mode in some examples.

The SIB byte 3404 includes a scale field 3452, an index field 3454, and a base field 3456 to be used in the generation of an address. The scale field 3452 indicates scaling factor. The index field 3454 specifies an index register to use. In some examples, the index field 3454 is supplemented with an additional bit from a prefix (e.g., prefix 3301) to allow for greater addressing. The base field 3456 specifies a base register to use. In some examples, the base field 3456 is supplemented with an additional bit from a prefix (e.g., prefix 3301) to allow for greater addressing. In practice, the content of the scale field 3452 allows for the scaling of the content of the index field 3454 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some examples, a displacement 3307 provides this value. Additionally, in some examples, a displacement factor usage is encoded in the MOD field of the addressing field 3305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 3307.

In some examples, an immediate field 3309 specifies an immediate value for the instruction. An immediate value may be encoded as a 1-byte value, a 2-byte value, a 4-byte value, etc.

FIG. 35 illustrates examples of a first prefix 3301(A). In some examples, the first prefix 3301(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 3301(A) may specify up to three registers using 3-bit fields depending on the format: 1) using the reg field 3444 and the R/M field 3446 of the Mod R/M byte 3402; 2) using the Mod R/M byte 3402 with the SIB byte 3404 including using the reg field 3444 and the base field 3456 and index field 3454; or 3) using the register field of an opcode.

In the first prefix 3301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 3444 and MOD R/M R/M field 3446 alone can each only address 8 registers.

In the first prefix 3301(A), bit position 2 (R) may an extension of the MOD R/M reg field 3444 and may be used to modify the ModR/M reg field 3444 when that field encodes a general purpose register, a 64-bit packed data register (e.g., a SSE register), or a control or debug register. R is ignored when Mod R/M byte 3402 specifies other registers or defines an extended opcode.

Bit position 1 (X) X bit may modify the SIB byte index field 3454.

Bit position B (B) B may modify the base in the Mod R/M R/M field 3446 or the SIB byte base field 3456; or it may modify the opcode register field used for accessing general purpose registers (e.g., general purpose registers 3225).

FIGS. 36(A)-(D) illustrate examples of how the R, X, and B fields of the first prefix 3301(A) are used. FIG. 36(A) illustrates R and B from the first prefix 3301(A) being used to extend the reg field 3444 and R/M field 3446 of the MOD R/M byte 3402 when the SIB byte 3404 is not used for memory addressing. FIG. 36(B) illustrates R and B from the first prefix 3301(A) being used to extend the reg field 3444 and R/M field 3446 of the MOD R/M byte 3402 when the SIB byte 3404 is not used (register-register addressing). FIG. 36(C) illustrates R, X, and B from the first prefix 3301(A) being used to extend the reg field 3444 of the MOD R/M byte 3402 and the index field 3454 and base field 3456 when the SIB byte 3404 being used for memory addressing. FIG. 36(D) illustrates B from the first prefix 3301(A) being used to extend the reg field 3444 of the MOD R/M byte 3402 when a register is encoded in the opcode 3303.

Figure 37A:
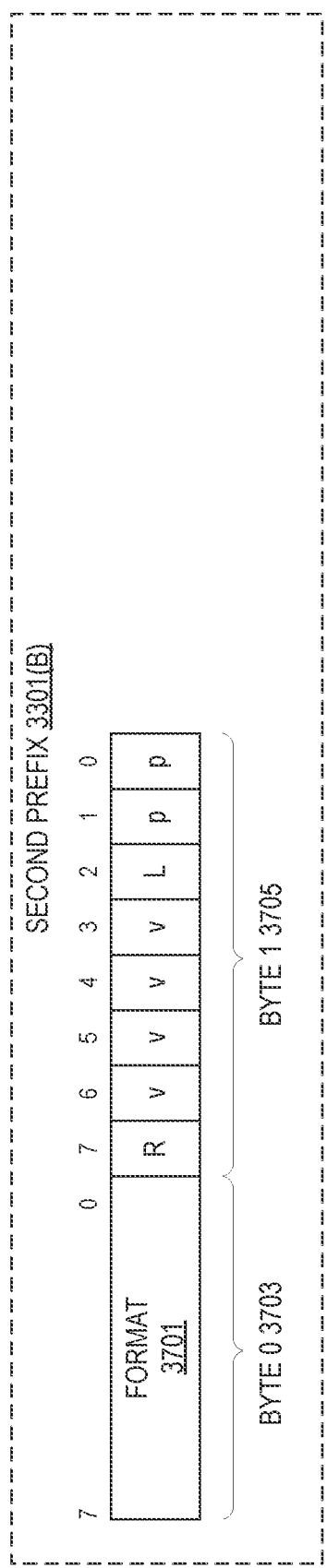
FIGS. 37(A)-(B) illustrate examples of a second prefix.
Figure 37B:
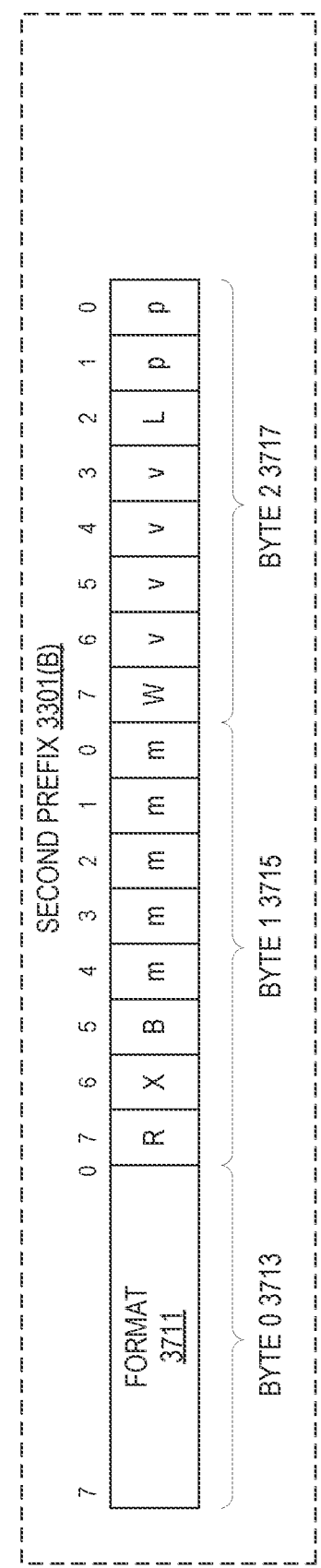

FIGS. 37(A)-(B) illustrate examples of a second prefix 3301(B). In some examples, the second prefix 3301(B) is an example of a VEX prefix. The second prefix 3301(B) encoding allows instructions to have more than two operands, and allows SIMD vector registers (e.g., vector/SIMD registers 3210) to be longer than 64-bits (e.g., 128-bit and 256-bit). The use of the second prefix 3301(B) provides for three-operand (or more) syntax. For example, previous two-operand instructions performed operations such as A=A+B, which overwrites a source operand. The use of the second prefix 3301(B) enables operands to perform nondestructive operations such as A=B+C.

In some examples, the second prefix 3301(B) comes in two forms—a two-byte form and a three-byte form. The two-byte second prefix 3301(B) is used mainly for 128-bit, scalar, and some 256-bit instructions; while the three-byte second prefix 3301(B) provides a compact replacement of the first prefix 3301(A) and 3-byte opcode instructions.

FIG. 37(A) illustrates examples of a two-byte form of the second prefix 3301(B). In one example, a format field 3701 (byte 0 3703) contains the value C5H. In one example, byte 1 3705 includes a "R" value in bit[7]. This value is the complement of the same value of the first prefix 3301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3446 to encode the instruction operand that references a memory address or encode either the destination register operand or a source register operand.

Instructions that use this prefix may use the Mod R/M reg field 3444 to encode either the destination register operand or a source register operand, be treated as an opcode extension and not used to encode any instruction operand.

For instruction syntax that support four operands, vvvv, the Mod R/M R/M field 3446 and the Mod R/M reg field 3444 encode three of the four operands. Bits[7:4] of the immediate 3309 are then used to encode the third source register operand.

FIG. 37(B) illustrates examples of a three-byte form of the second prefix 3301(B). in one example, a format field 3711 (byte 0 3713) contains the value C4H. Byte 1 3715 includes in bits[7:5] "R," "X," and "B" which are the complements of the same values of the first prefix 3301(A). Bits[4:0] of byte 1 3715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 3717 is used similar to W of the first prefix 3301(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3446 to encode the instruction operand that references a memory address or encode either the destination register operand or a source register operand.

Instructions that use this prefix may use the Mod R/M reg field 3444 to encode either the destination register operand or a source register operand, be treated as an opcode extension and not used to encode any instruction operand.

For instruction syntax that support four operands, vvvv, the Mod R/M R/M field 3446, and the Mod R/M reg field 3444 encode three of the four operands. Bits[7:4] of the immediate 3309 are then used to encode the third source register operand.

Figure 38:
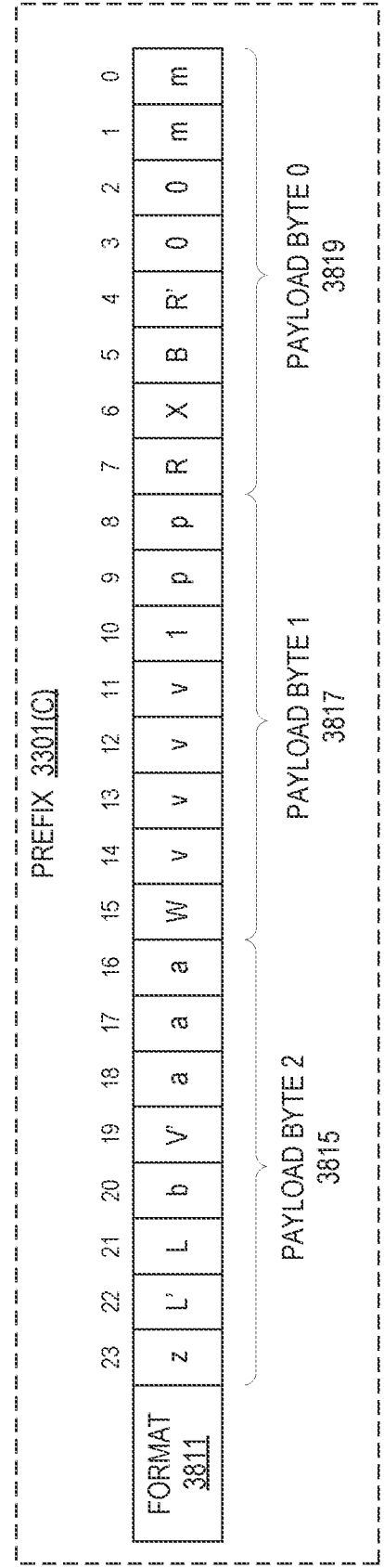
FIG. 38 illustrates examples of a third prefix.

FIG. 38 illustrates examples of a third prefix 3301(C). In some examples, the first prefix 3301(A) is an example of an EVEX prefix. The third prefix 3301(C) is a four-byte prefix.

The third prefix 3301(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 32) or predication utilize this prefix. Opmask register allow for conditional processing or selection control. Opmask instructions, whose source/destination operands are opmask registers and treat the content of an opmask register as a single value, are encoded using the second prefix 3301(B).

The third prefix 3301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 3301(C) is a format field 3811 that has a value, in one example, of 62H. Subsequent bytes are referred to as payload bytes 3815-3819 and collectively form a 24-bit value of P[23:0] providing specific capability in the form of one or more fields (detailed herein).

In some examples, P[1:0] of payload byte 3819 are identical to the low two mmmmm bits. P[3:2] are reserved in some examples. Bit P[4] (R') allows access to the high 16 vector register set when combined with P[7] and the ModR/M reg field 3444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 3444 and ModR/M R/M field 3446. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 3301(A) and second prefix 3311(B) and may serve as an opcode extension bit or operand size promotion.

P[18:16] specify the index of a register in the opmask (writemask) registers (e.g., writemask/predicate registers 3215). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 3301(C) are detailed in the following tables.

TABLE 1

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |

TABLE 2-continued

Encoding Register Specifiers in 32-bit Mode

|  | [2:0] | REG. TYPE | COMMON USAGES |
|---|---|---|---|
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

|  | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 39:
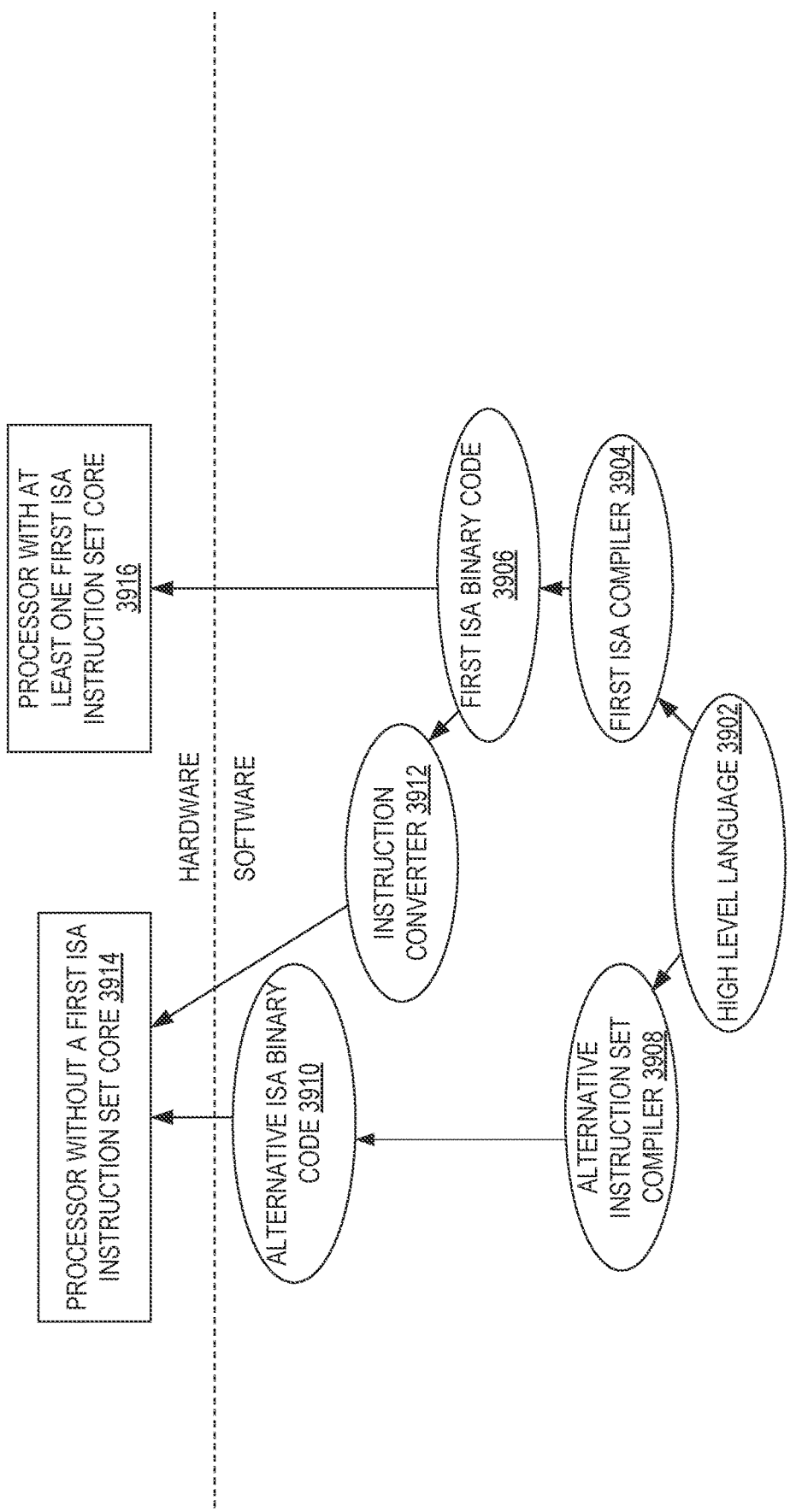
FIG. 39 illustrates a block diagram contrasting the use of a software instruction converter to convert binary instructions in a source instruction set architecture to binary instructions in a target instruction set architecture according to examples.

FIG. 39 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 39 shows a program in a high-level language 3902 may be compiled using a first ISA compiler 3904 to generate first ISA binary code 3906 that may be natively executed by a processor with at least one first instruction set architecture core 3916. The processor with at least one first ISA instruction set architecture core 3916 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 3904 represents a compiler that is operable to generate first ISA binary code 3906 (e.g., object code) that can, with or without additional linkage processing, be executed on the processor with at least one first ISA instruction set architecture core 3916. Similarly, FIG. 39 shows the program in the high-level language 3902 may be compiled using an alternative instruction set architecture compiler 3908 to generate alternative instruction set architecture binary code 3910 that may be natively executed by a processor without a first ISA instruction set architecture core 3914. The instruction converter 3912 is used to convert the first ISA binary code 3906 into code that may be natively executed by the processor without a first ISA instruction set architecture core 3914. This converted code is not likely to be the same as the alternative instruction set architecture binary code 3910 because an instruction converter capable of this is difficult to make; however, the converted code will accomplish the general operation and be made up of instructions from the alternative instruction set architecture. Thus, the instruction converter 3912 represents software, firmware, hardware, or a combination thereof that, through emulation, simulation or any other process, allows a processor or other electronic device that does not have a first ISA instruction set architecture processor or core to execute the first ISA binary code 3906.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

Example Embodiment

The following examples pertain to further embodiments. Specifics in the examples may be used anywhere in one or more embodiments. Example 1 is an apparatus including a memory to store a plurality of allocated objects, an allocated object referenced by a pointer; and a processor to execute a join instruction to create a group of pointers, by creating a group record for the group referenced by a group pointer and setting a group bit and ownership identifier (ID) of pointers of the group; and execute a transfer group ownership instruction to transfer ownership of the group, including pointers of the group, by verifying validity of the group and setting the ownership ID of pointers of the group when the group is valid.

In Example 2, the subject matter of Example 1 can optionally include the processor to execute a dissolve instruction to dissolve the group of pointers by verifying validity of the group and clearing the group bit of pointers of the group when the group is valid. In Example 3, the subject matter of Example 2 can optionally include the processor to execute the dissolve instruction by marking the group record as deleted. In Example 4, the subject matter of Example 1 can optionally include the processor to execute a transfer ownership instruction to transfer ownership of the pointer by determining if the pointer is part of the group and setting the ownership ID of the pointer when the pointer is not part of the group. In Example 5, the subject matter of Example 4 can optionally include the processor to generate an exception when the pointer is part of the group. In Example 6, the subject matter of Example 1 can optionally include the processor to execute a mark immutable instruction to mark a pointer as immutable by determining if the pointer is part of the group and setting an immutability flag when then pointer is not part of the group. In Example 7, the subject matter of Example 6 can optionally include the processor to generate an exception when the pointer is part of the group. In Example 8, the subject matter of Example 1 can optionally include wherein the ownership ID is stored in a tag field in the pointer.

In Example 9, the subject matter of Example 1 can optionally include wherein the group is immutable. In Example 10, the subject matter of Example 1 can optionally include wherein the group pointer is immutable. In Example 11, the subject matter of Example 1 can optionally include the processor to execute a join groups instruction to create a group of groups of pointers. In Example 12, the subject matter of Example 11 can optionally include the processor to execute a dissolve instruction to dissolve the group of groups of pointers by verifying validity of the group of groups of pointers and clearing the group bit of pointers of the group of groups of pointers when the group of groups of pointers is valid. In Example 13, the subject matter of Example 1 can optionally include wherein the ownership ID and group bit are stored in metadata in a pointer. In Example 14, the subject matter of Example 1 can optionally include the processor to perform borrow checking on the group.

Example 15 is a method including executing a join instruction to create a group of pointers, pointers referencing allocated objects in a memory, by creating a group record for the group referenced by a group pointer and setting a group bit and ownership identifier (ID) of pointers of the group; and executing a transfer group ownership instruction to transfer ownership of the group, including pointers of the group, by verifying validity of the group and setting the ownership ID of pointers of the group when the group is valid. In Example 16, the subject matter of Example 15 can optionally include executing a dissolve instruction to dissolve the group of pointers by verifying validity of the group and clearing the group bit of pointers of the group when the group is valid. In Example 17, the subject matter of Example 16 can optionally include executing the dissolve instruction by marking the group record as deleted. In Example 18, the subject matter of Example 15 can optionally include executing a transfer ownership instruction to transfer ownership of the pointer by determining if the pointer is part of the group and setting the ownership ID of the pointer when the pointer is not part of the group. In Example 19, the subject matter of Example 18 can optionally include generating an exception when the pointer is part of the group. In Example 20, the subject matter of Example 15 can optionally include executing a mark immutable instruction to mark a pointer as immutable by determining if the pointer is part of the group and setting an immutability flag when then pointer is not part of the group. In Example 21, the subject matter of Example 20 can optionally include generating an exception when the pointer is part of the group.

Example 22 is at least one non-transitory machine-readable storage medium including instructions that, when executed, cause a processor to at least: execute a join instruction to create a group of pointers, pointers referencing allocated objects in a memory, by creating a group record for the group referenced by a group pointer and setting a group bit and ownership identifier (ID) of pointers of the group; and execute a transfer group ownership instruction to transfer ownership of the group, including pointers of the group, by verifying validity of the group and setting the ownership ID of pointers of the group when the group is valid. In Example 23, the subject matter of Example 22 can optionally include instructions for the processor to execute a dissolve instruction to dissolve the group of pointers by verifying validity of the group and clearing the group bit of pointers of the group when the group is valid. In Example 24, the subject matter of Example 23 can optionally include instructions for the processor to execute the dissolve instruction by marking the group record as deleted. In Example 25, the subject matter of Example 22 can optionally include instructions for the processor to execute a transfer ownership instruction to transfer ownership of the pointer by determining if the pointer is part of the group and setting the ownership ID of the pointer when the pointer is not part of the group. In Example 26, the subject matter of Example 55 can optionally include instructions for the processor to generate an exception when the pointer is part of the group. In Example 27, the subject matter of Example 22 can optionally include instructions for the processor to execute a mark immutable instruction to mark a pointer as immutable by determining if the pointer is part of the group and setting an immutability flag when then pointer is not part of the group. In Example 28, the subject matter of Example 27 can optionally include instructions for the processor to generate an exception when the pointer is part of the group.

Example 28 is an apparatus operative to perform the method of any one of Examples 15 to 21. Example 29 is an apparatus that includes means for performing the method of any one of Examples 15 to 21. Example 30 is an apparatus that includes any combination of modules and/or units and/or logic and/or circuitry and/or means operative to perform the method of any one of Examples 15 to 21. Example 31 is an optionally non-transitory and/or tangible machine-readable medium, which optionally stores or otherwise provides instructions that if and/or when executed by a computer system or other machine are operative to cause the machine to perform the method of any one of Examples 15 to 21.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
    a memory to store a plurality of allocated objects, an allocated object referenced by a pointer; and
    a processor to
        execute a join instruction to create a group of pointers, by creating a group record for the group referenced by a group pointer and setting a group bit and ownership identifier (ID) of pointers of the group;
        execute a transfer group ownership instruction to transfer ownership of the group, including pointers of the group, by verifying validity of the group and setting the ownership ID of pointers of the group when the group is valid; and
        execute a mark immutable instruction to mark a pointer as immutable by determining if the pointer is part of the group and setting an immutability flag when the pointer is not part of the group.

2. The apparatus of claim 1, comprising the processor to execute a dissolve instruction to dissolve the group of pointers by verifying validity of the group and clearing the group bit of pointers of the group when the group is valid.

3. The apparatus of claim 2, comprising the processor to execute the dissolve instruction by marking the group record as deleted.

4. The apparatus of claim 1, comprising the processor to execute a transfer ownership instruction to transfer ownership of the pointer by determining if the pointer is part of the group and setting the ownership ID of the pointer when the pointer is not part of the group.

5. The apparatus of claim 4, comprising the processor to generate an exception when the pointer is part of the group.

6. The apparatus of claim 1, comprising the processor to generate an exception when the pointer is part of the group.

7. The apparatus of claim 1, wherein the ownership ID is stored in a tag field in the pointer.

8. The apparatus of claim 1, wherein the group is immutable.

9. The apparatus of claim 1, wherein the group pointer is immutable.

10. The apparatus of claim 1, comprising the processor to execute a join groups instruction to create a group of groups of pointers.

11. The apparatus of claim 10, comprising the processor to execute a dissolve instruction to dissolve the group of groups of pointers by verifying validity of the group of groups of pointers and clearing the group bit of pointers of the group of groups of pointers when the group of groups of pointers is valid.

12. The apparatus of claim 1, wherein the ownership ID and group bit are stored in metadata in a pointer.

13. The apparatus of claim 1, comprising the processor to perform borrow checking on the group.

14. A method comprising:
    executing a join instruction to create a group of pointers, pointers referencing allocated objects in a memory, by creating a group record for the group referenced by a group pointer and setting a group bit and ownership identifier (ID) of pointers of the group;
    executing a transfer group ownership instruction to transfer ownership of the group, including pointers of the group, by verifying validity of the group and setting the ownership ID of pointers of the group when the group is valid; and
    executing a mark immutable instruction to mark a pointer as immutable by determining if the pointer is part of the group and setting an immutability flag when the pointer is not part of the group.

15. The method of claim 14, comprising executing a dissolve instruction to dissolve the group of pointers by verifying validity of the group and clearing the group bit of pointers of the group when the group is valid.

16. The method of claim 15, comprising executing the dissolve instruction by marking the group record as deleted.

17. The method of claim 14, comprising executing a transfer ownership instruction to transfer ownership of the pointer by determining if the pointer is part of the group and setting the ownership ID of the pointer when the pointer is not part of the group.

18. The method of claim 17, comprising generating an exception when the pointer is part of the group.

19. The method of claim 14, comprising generating an exception when the pointer is part of the group.

20. At least one non-transitory machine-readable storage medium comprising instructions that, when executed, cause a processor to at least:
    execute a join instruction to create a group of pointers, pointers referencing allocated objects in a memory, by creating a group record for the group referenced by a group pointer and setting a group bit and ownership identifier (ID) of pointers of the group;
    execute a transfer group ownership instruction to transfer ownership of the group, including pointers of the group, by verifying validity of the group and setting the ownership ID of pointers of the group when the group is valid; and
    execute a mark immutable instruction to mark a pointer as immutable by determining if the pointer is part of the group and setting an immutability flag when the pointer is not part of the group.

21. The at least one non-transitory machine-readable storage medium of claim 20, comprising instructions for the processor to execute a dissolve instruction to dissolve the group of pointers by verifying validity of the group and clearing the group bit of pointers of the group when the group is valid.

22. The at least one non-transitory machine-readable storage medium of claim 21, comprising instructions for the processor to execute the dissolve instruction by marking the group record as deleted.

23. The at least one non-transitory machine-readable storage medium of claim 20, comprising instructions for the processor to execute a transfer ownership instruction to transfer ownership of the pointer by determining if the pointer is part of the group and setting the ownership ID of the pointer when the pointer is not part of the group.

* * * * *